(12) United States Patent
Chong

(10) Patent No.: US 10,856,374 B2
(45) Date of Patent: Dec. 1, 2020

(54) METHOD AND SYSTEM FOR CONTROLLING AN ELECTRONIC DEVICE HAVING SMART IDENTIFICATION FUNCTION

(71) Applicant: Tit Tsang Chong, Hong Kong (CN)

(72) Inventor: Tit Tsang Chong, Hong Kong (CN)

(73) Assignee: Tit Tsang Chong, Hong Kong (CN)

( * ) Notice: Subject to any disclaimer, the term of this patent is extended or adjusted under 35 U.S.C. 154(b) by 0 days.

(21) Appl. No.: 16/609,845

(22) PCT Filed: Aug. 21, 2017

(86) PCT No.: PCT/CN2017/098338
§ 371 (c)(1),
(2) Date: Oct. 31, 2019

(87) PCT Pub. No.: WO2019/036858
PCT Pub. Date: Feb. 28, 2019

(65) Prior Publication Data
US 2020/0077474 A1 Mar. 5, 2020

(51) Int. Cl.
*H05B 37/02* (2006.01)
*H05B 33/00* (2006.01)
(Continued)

(52) U.S. Cl.
CPC ........... *H05B 45/00* (2020.01); *H05B 47/175* (2020.01); *H05B 47/19* (2020.01); *H05B 47/21* (2020.01); *H05B 47/22* (2020.01)

(58) Field of Classification Search
CPC ......... H04W 4/02; H04W 4/029; H04W 4/80; H04W 12/06; H04W 88/02; G06Q 20/206; G06Q 20/325; G06Q 30/0267; G07C 9/29; H04L 63/0853; H05B 33/0842; H05B 45/00; H05B 47/18; H05B 47/19; H05B 47/22; H05B 33/08; H05B 47/185; H05B 47/175; H05B 47/21; H05B 47/127; G08C 23/04; G08C 17/02
See application file for complete search history.

(56) References Cited

U.S. PATENT DOCUMENTS 7,652,576 B1 * 1/2010 Crossno ................. G06Q 30/02
340/539.1
8,193,729 B2 * 6/2012 Liao ....................... H05B 47/19
315/291
(Continued)

FOREIGN PATENT DOCUMENTS

CN  101258781 A  9/2008
CN  101485233 A  7/2009
(Continued)

*Primary Examiner* — Vibol Tan

(57) ABSTRACT

Disclosed are a method and system for controlling an electronic device, having a smart identification function, and the method includes: outputting, by a master device, an access signal to an electronic device; receiving, by the electronic device, the access signal, and outputting, by the electronic device, a corresponding action signal according to the access signal; detecting, by the master device, the action signal which is outputted by the electronic device, and identifying, by the master device, sequence information and/or position information of the electronic device according to the action signal.

21 Claims, 74 Drawing Sheets

(51) Int. Cl.
*H05B 45/00* (2020.01)
*H05B 47/19* (2020.01)
*H05B 47/175* (2020.01)
*H05B 47/21* (2020.01)

(56) References Cited

U.S. PATENT DOCUMENTS

| | | |
|---|---|---|
| 2008/0218087 A1 | 9/2008 | Crouse et al. |
| 2009/0051624 A1 | 2/2009 | Finney et al. |
| 2011/0074312 A1 | 3/2011 | Liao |
| 2011/0101889 A1 | 5/2011 | Lys |
| 2012/0146804 A1 | 6/2012 | Kim et al. |
| 2019/0236866 A1* | 8/2019 | Leonard .................. G07C 9/29 |

FOREIGN PATENT DOCUMENTS

| | | | |
|---|---|---|---|
| CN | 102090144 A | 6/2011 | |
| CN | 106658854 A | 5/2017 | |
| WO | WO-2016140984 A1 * | 9/2016 | .............. H04W 4/70 |

* cited by examiner

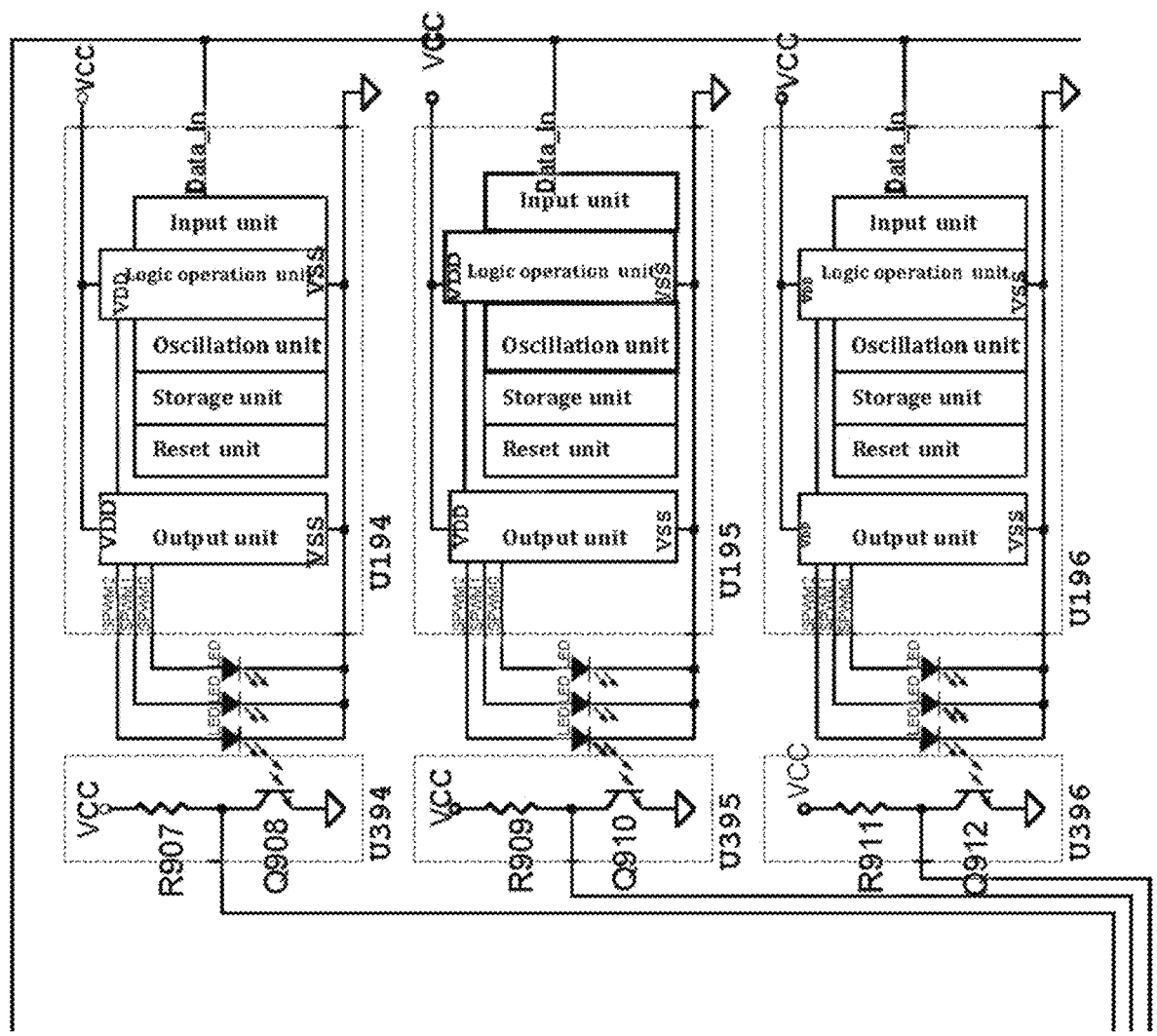
Fig.5a(1)

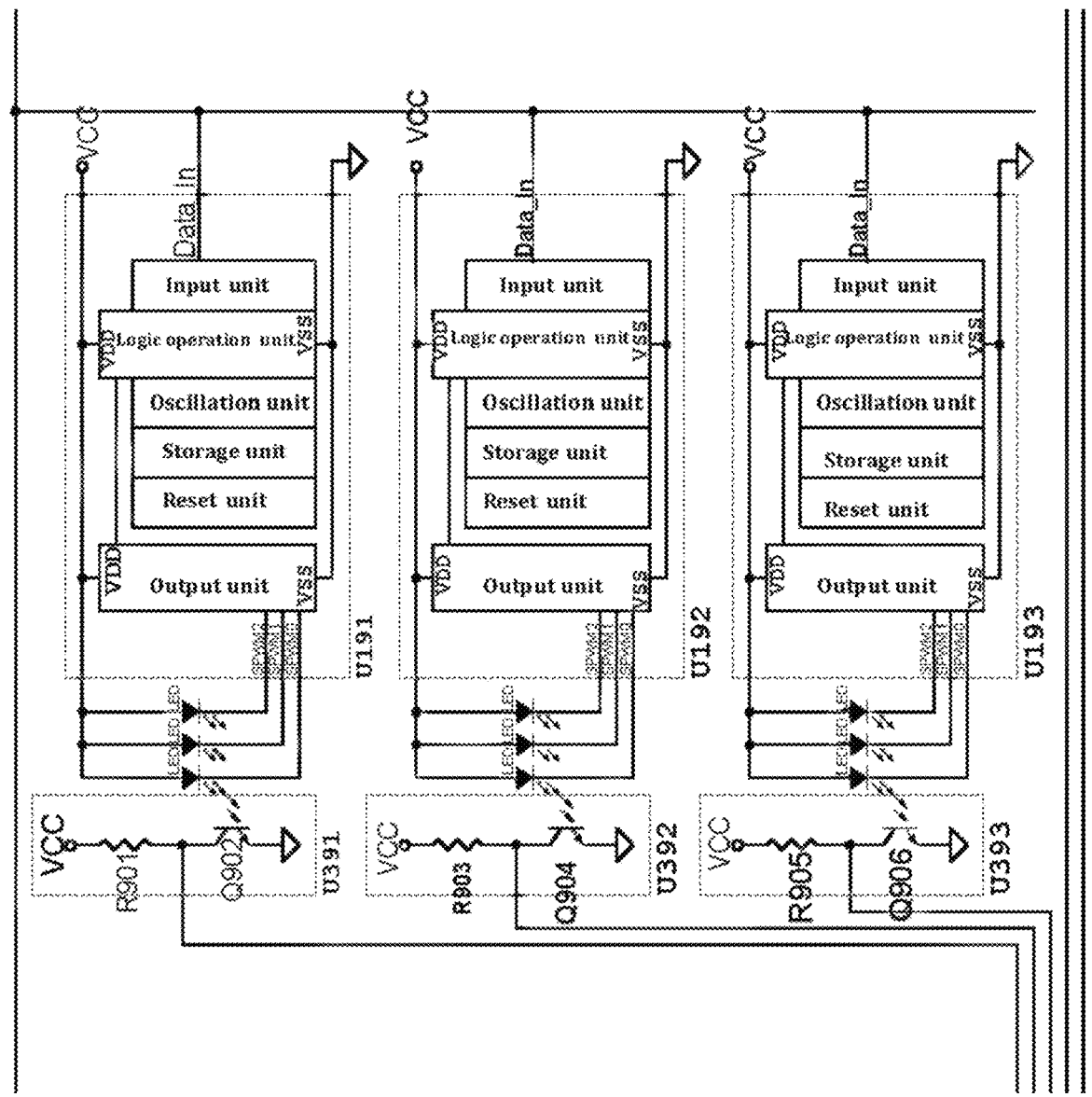
Fig.5a(2)

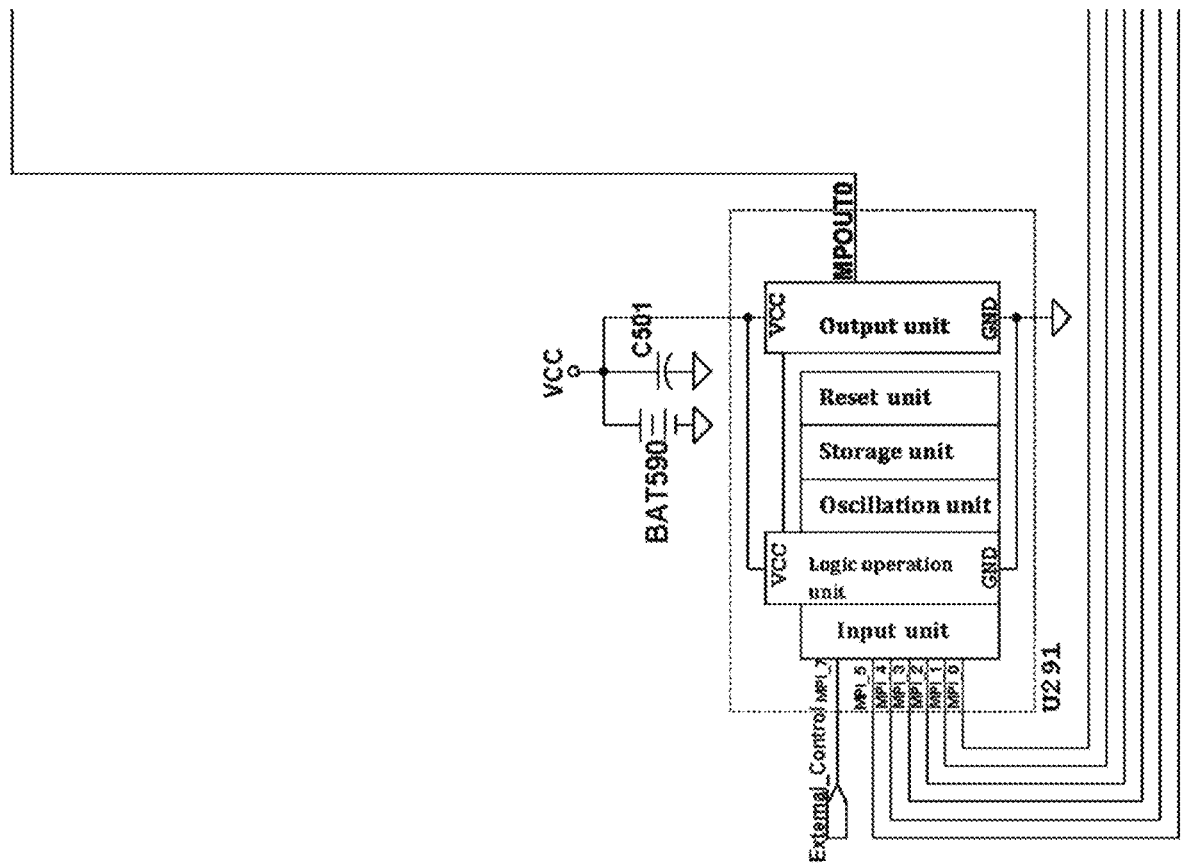
Fig.5a(3)

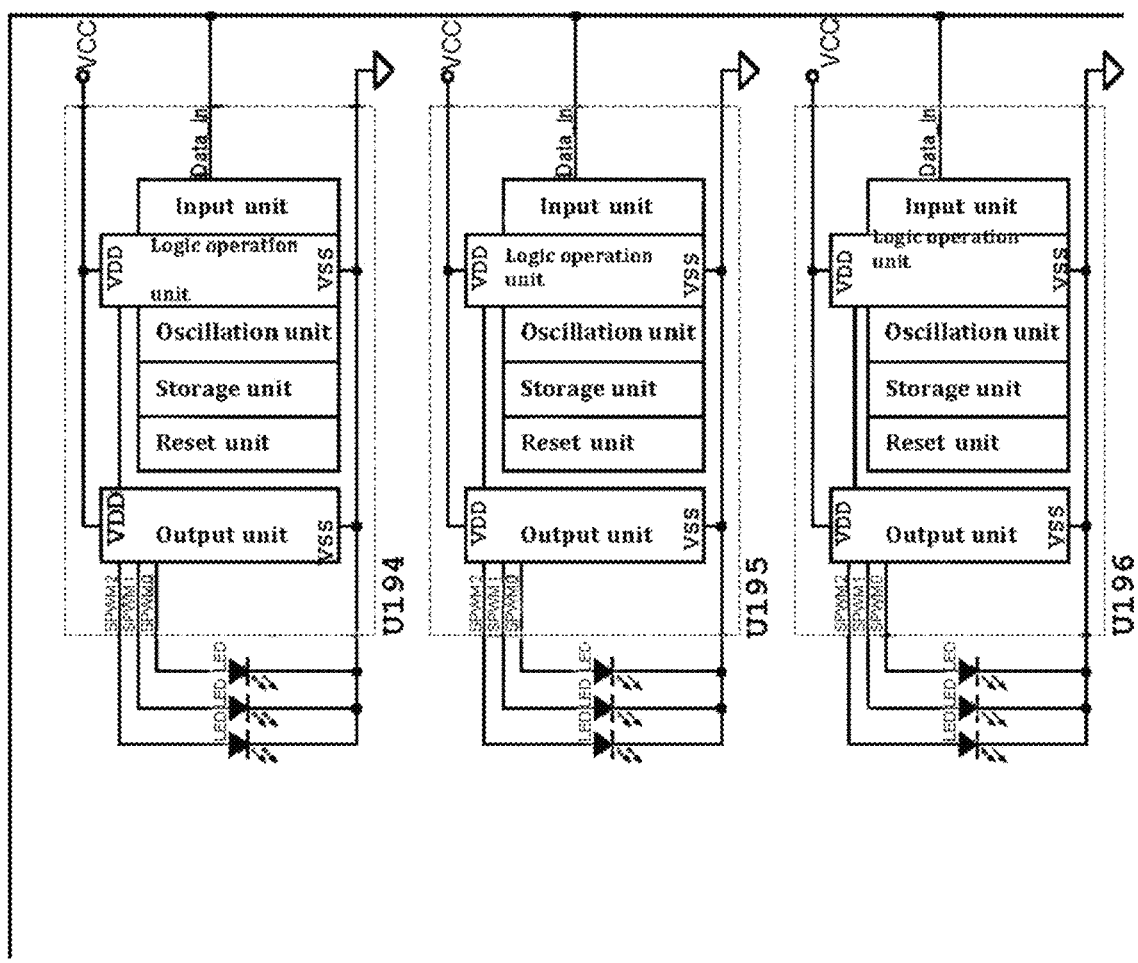
Fig.5b(1)

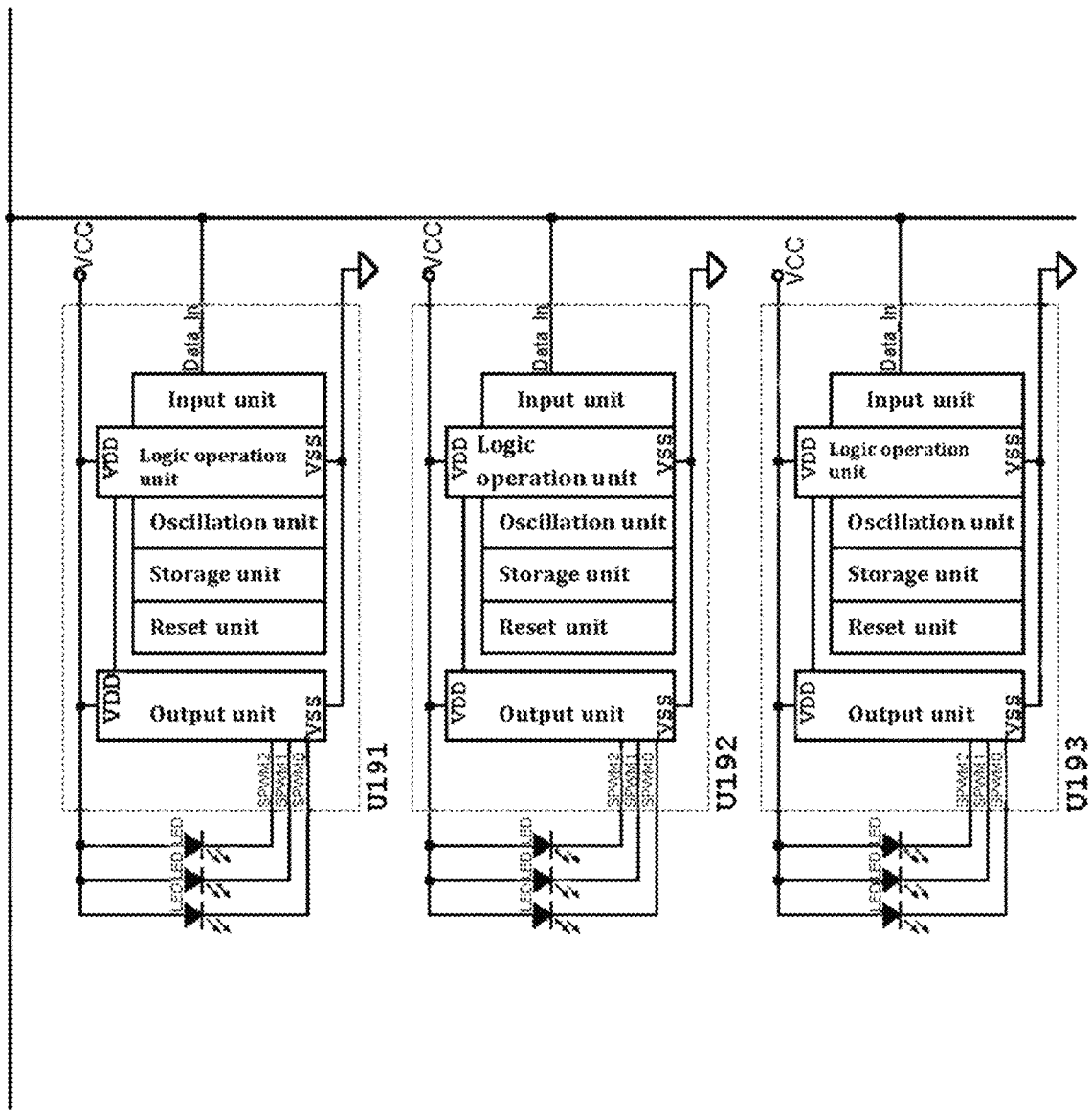
Fig.5b(2)

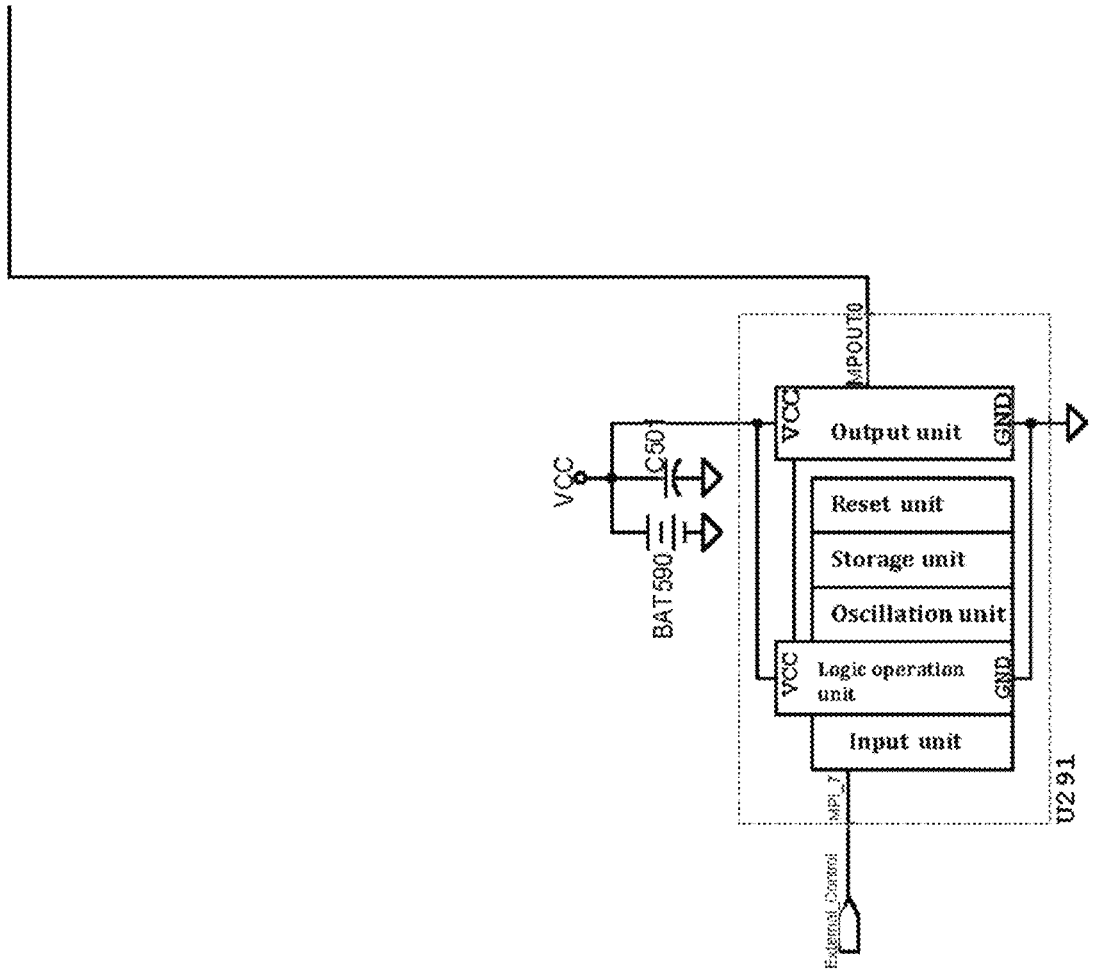
Fig.5b(3)

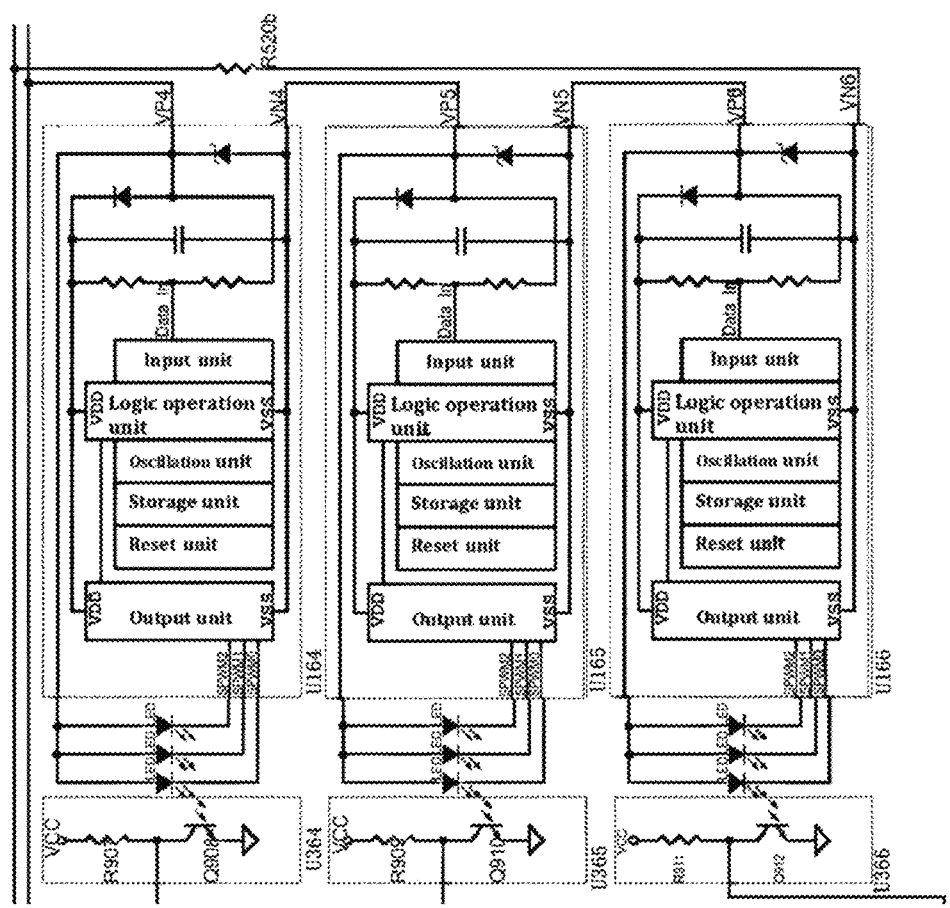
Fig.8a(1)

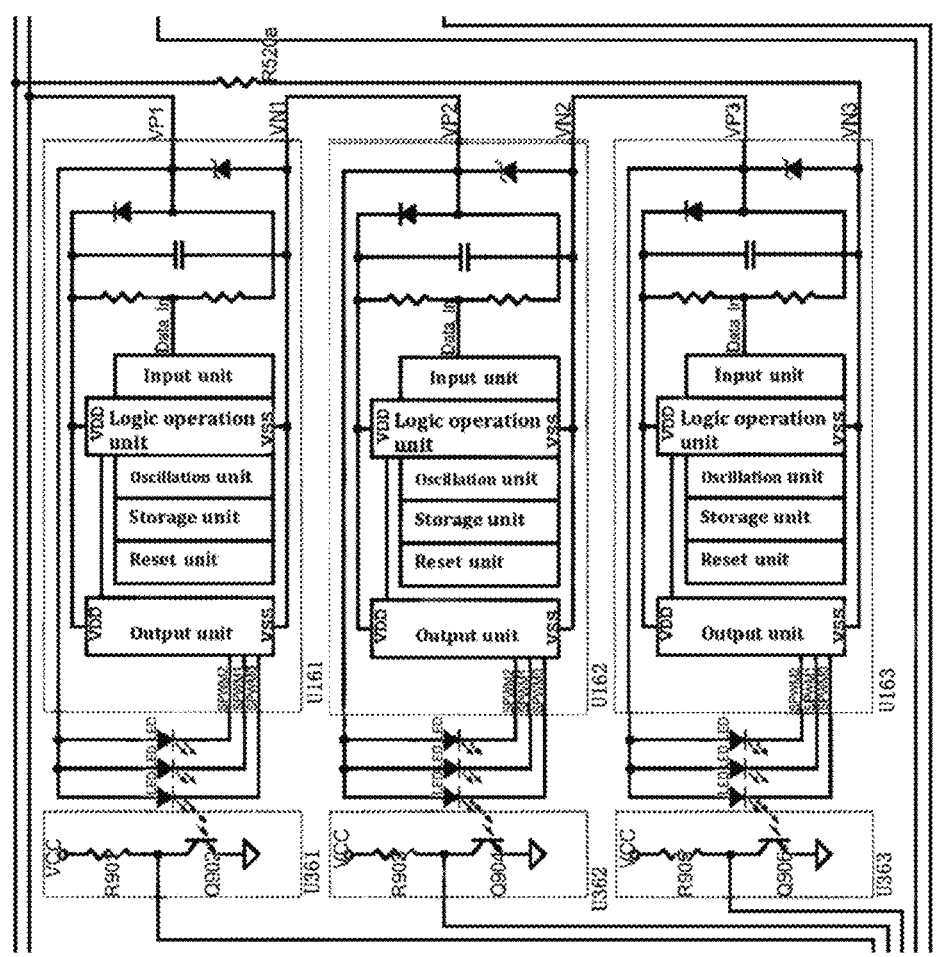
Fig.8a(2)

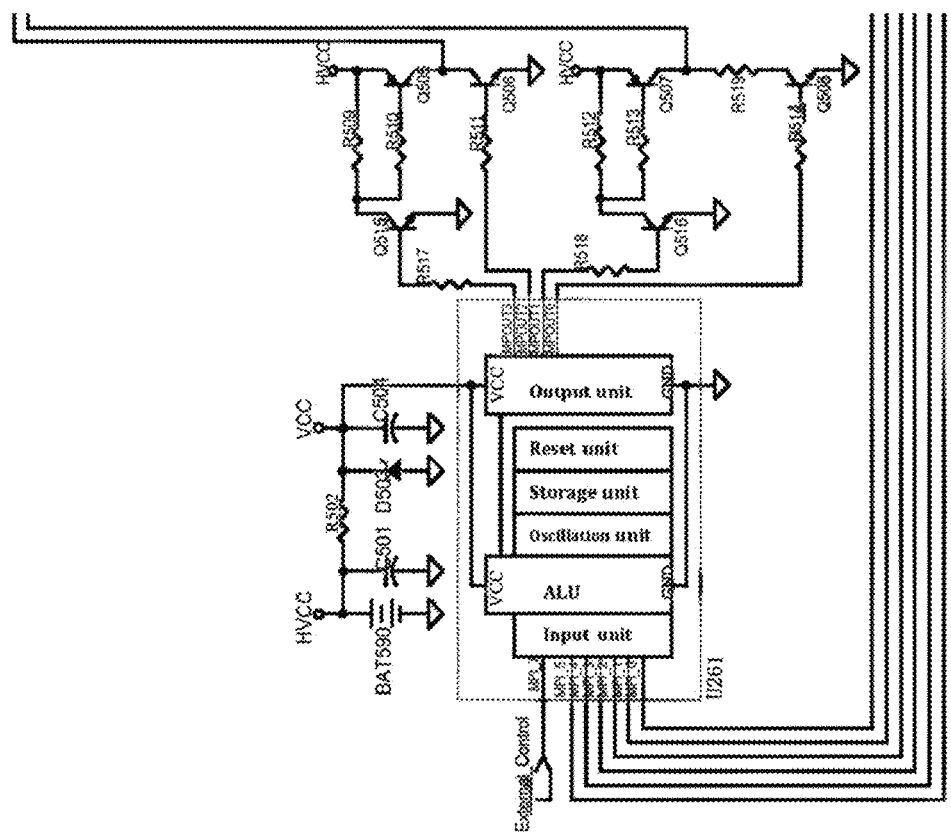
Fig.8a(3)

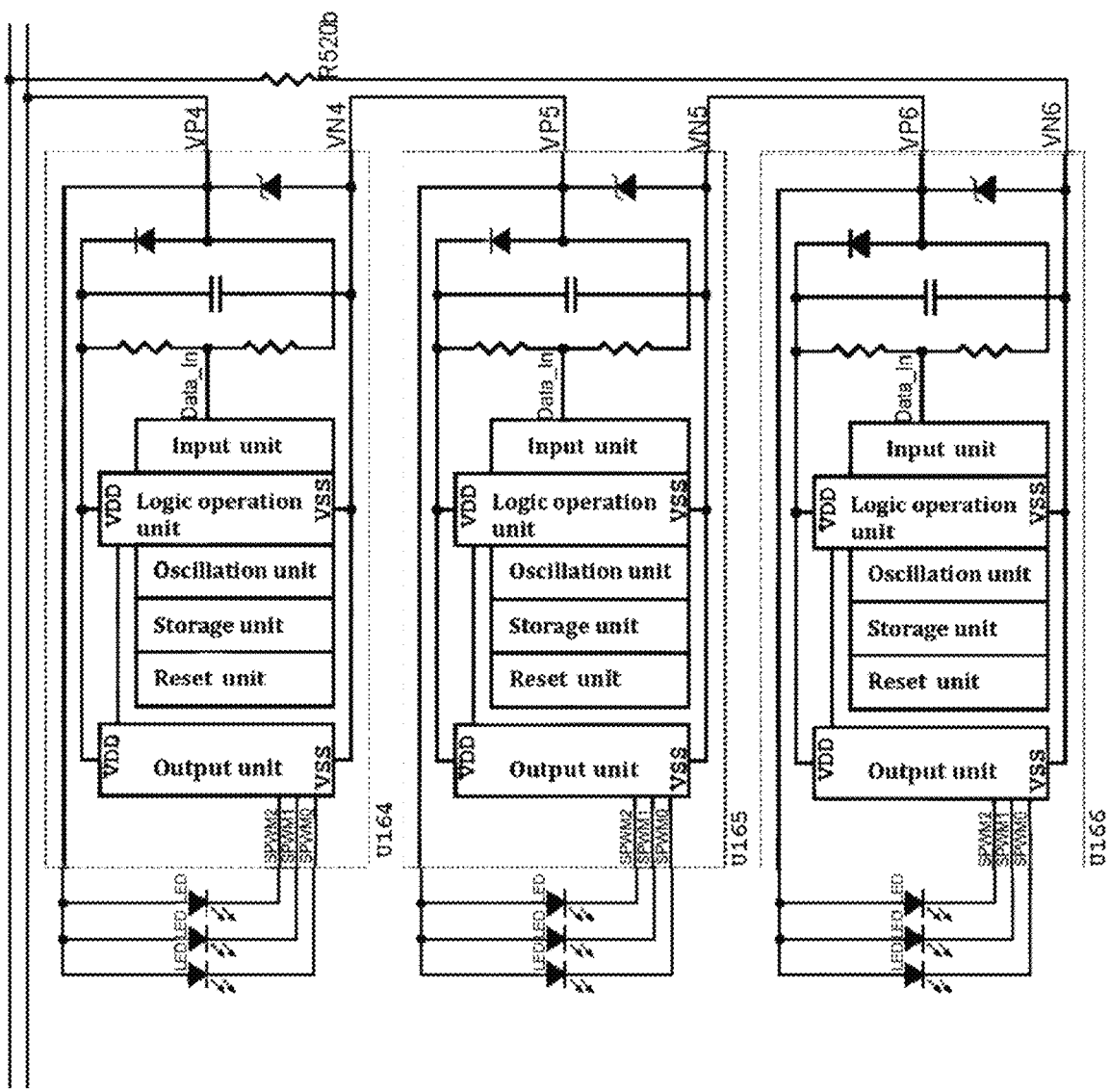
Fig.8b(1)

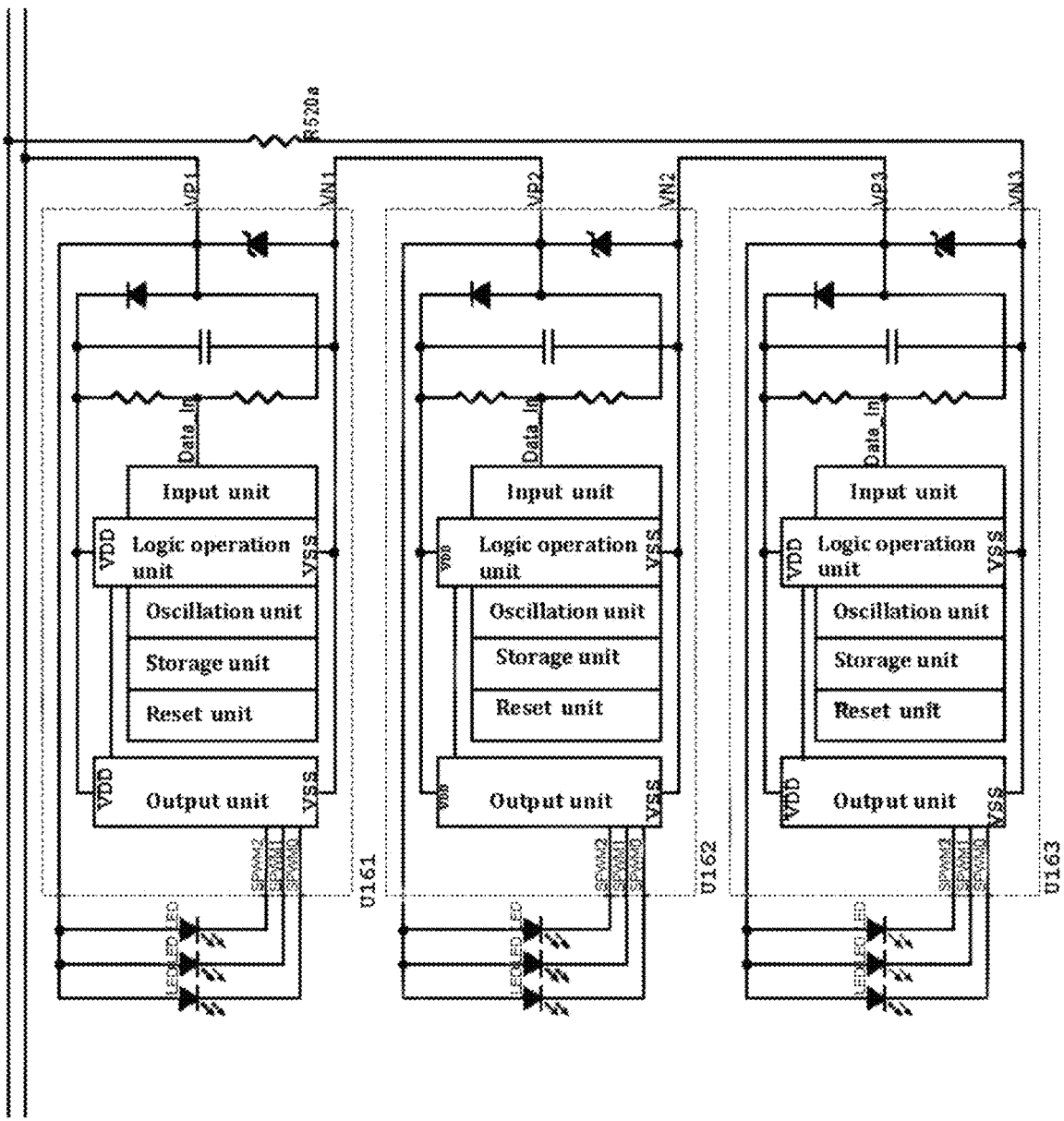
Fig.8b(2)

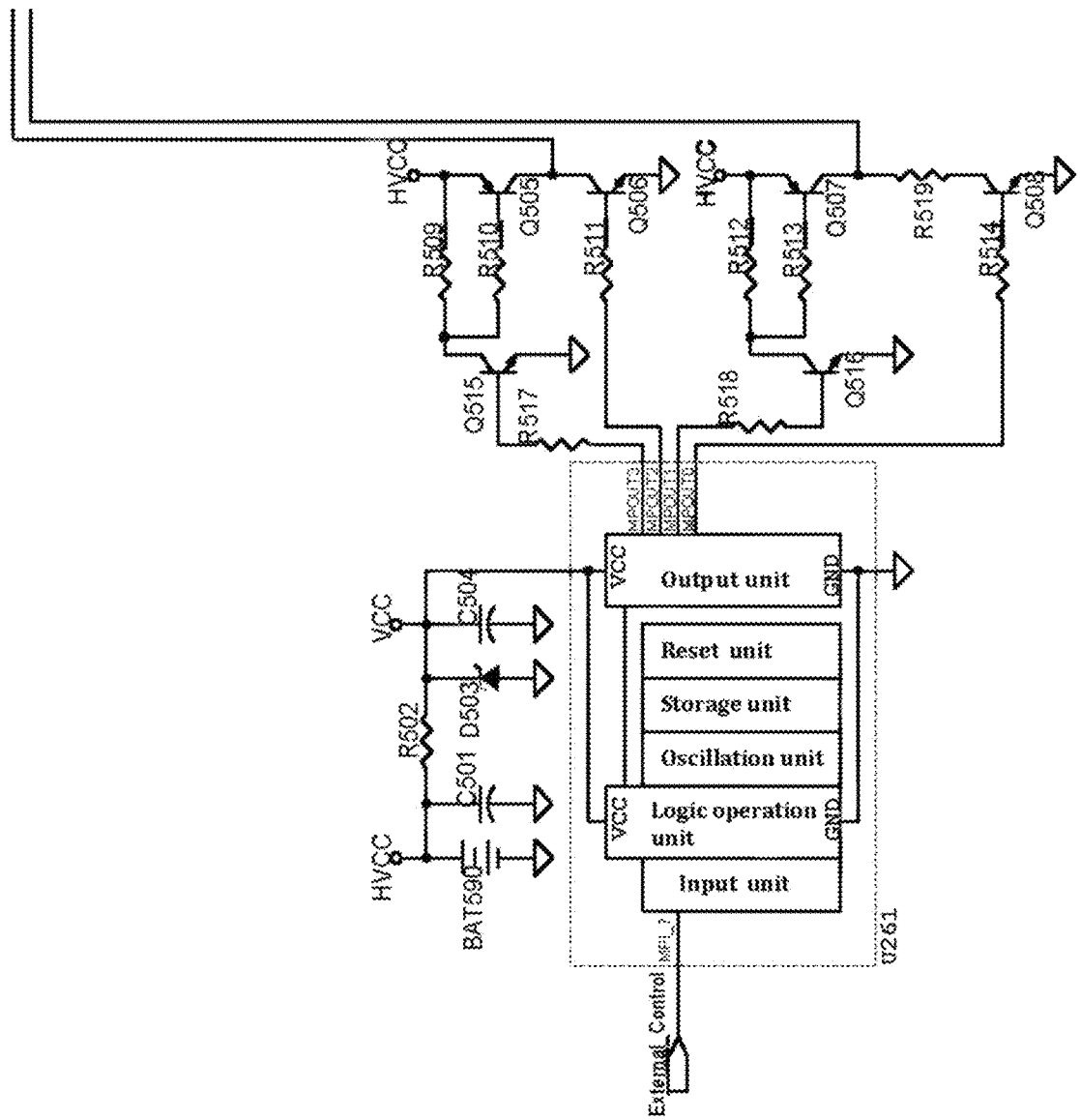
Fig.8b(3)

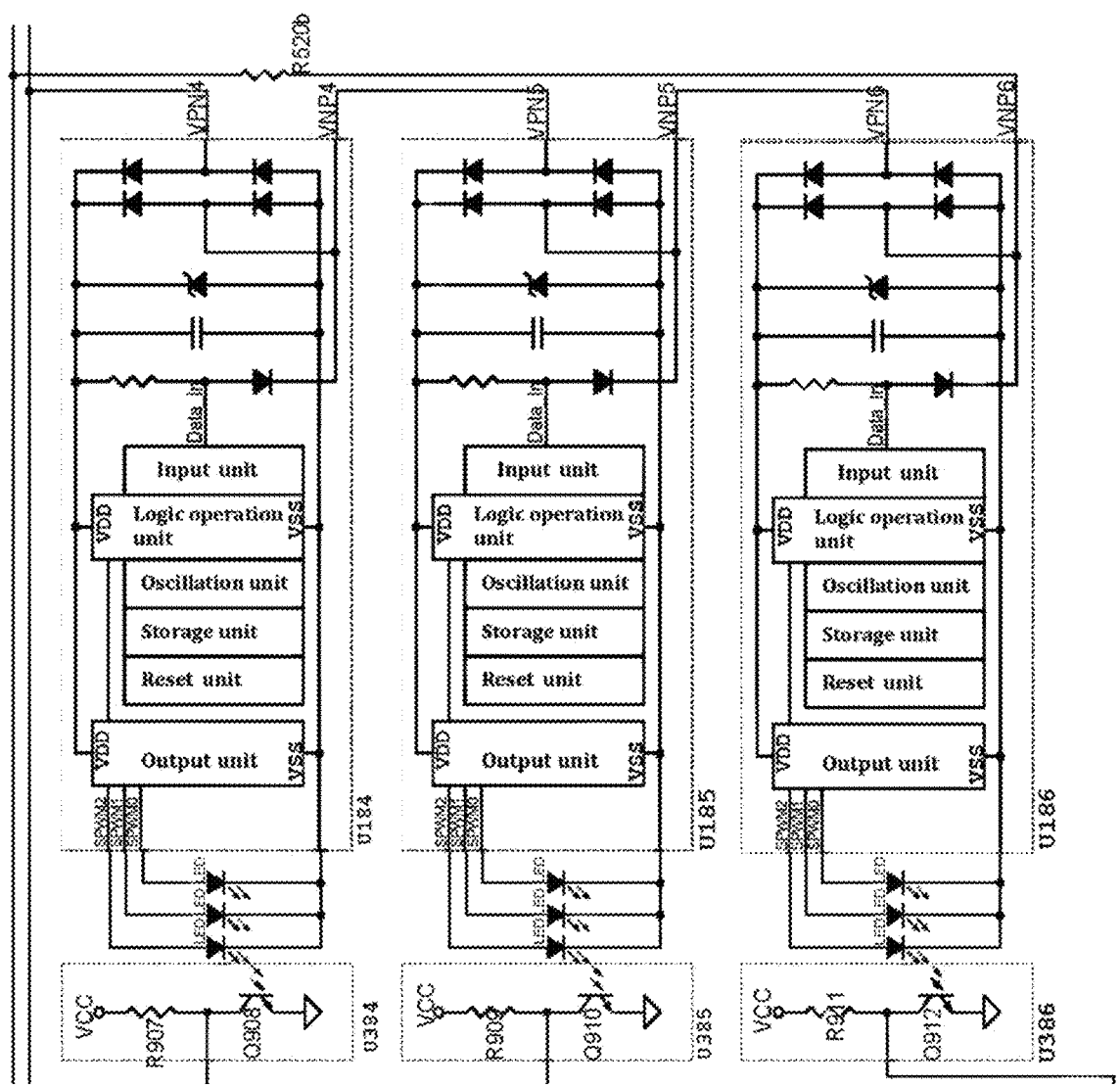
Fig.11a(1)

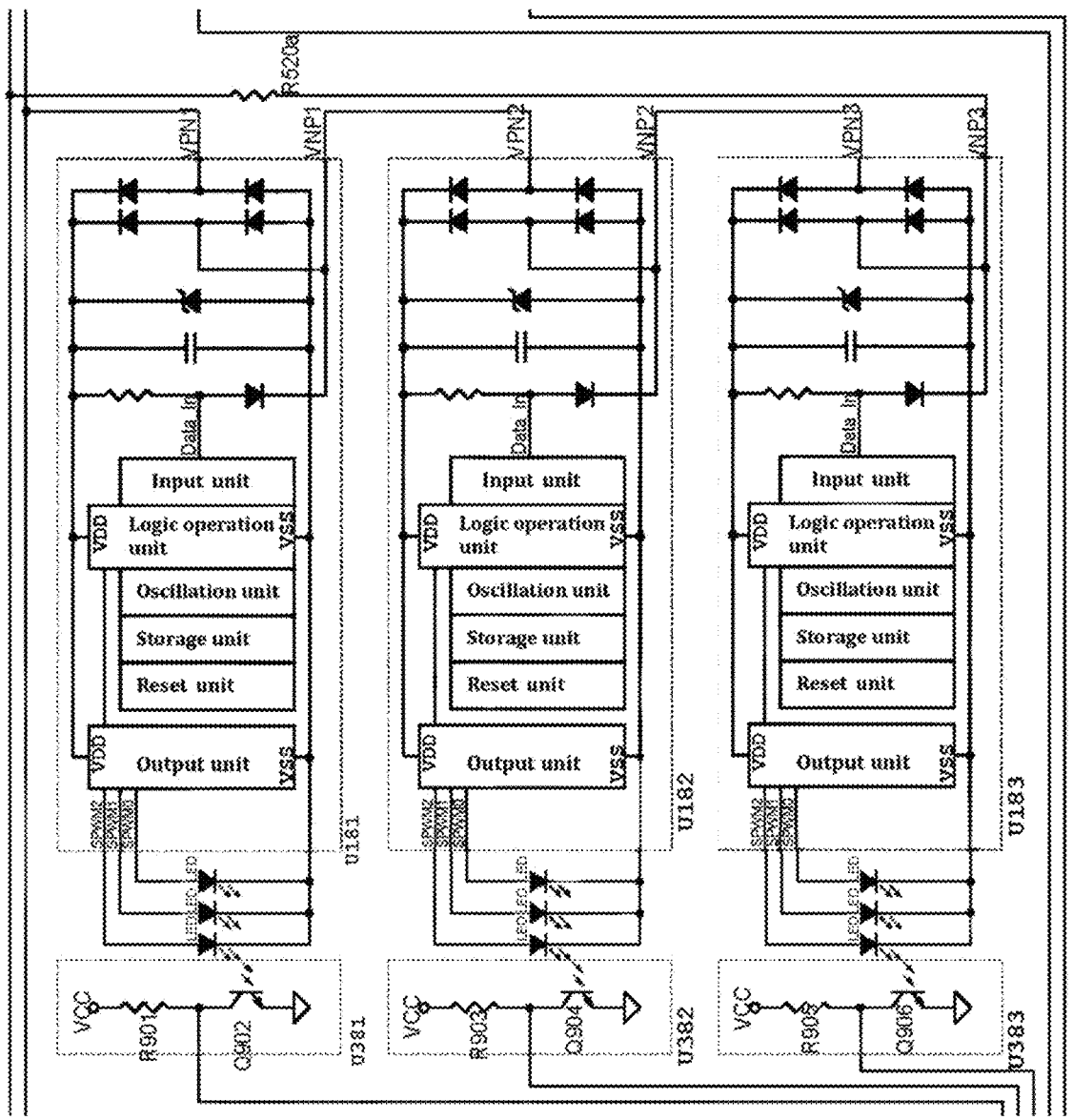
Fig.11a(2)

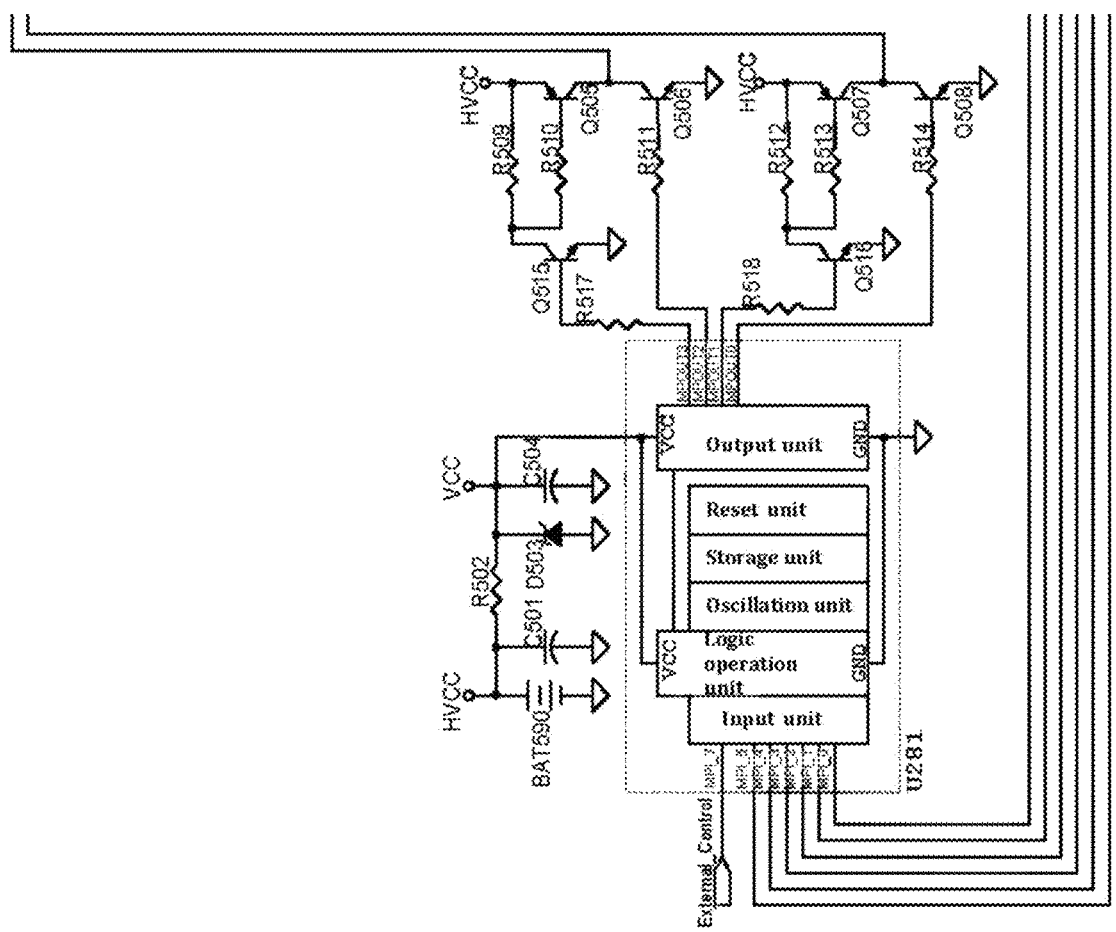
Fig.11a(3)

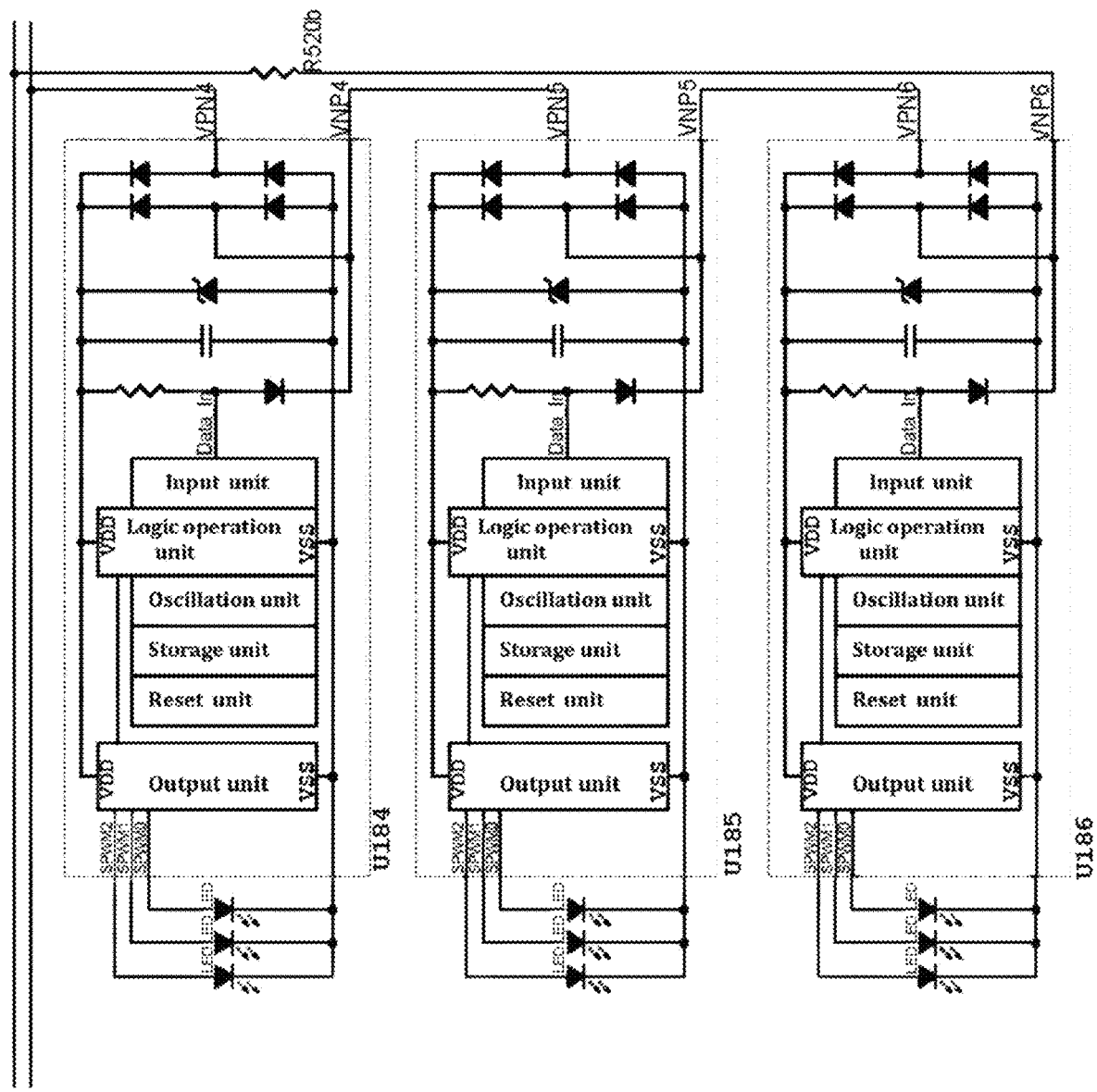
Fig.11b(1)

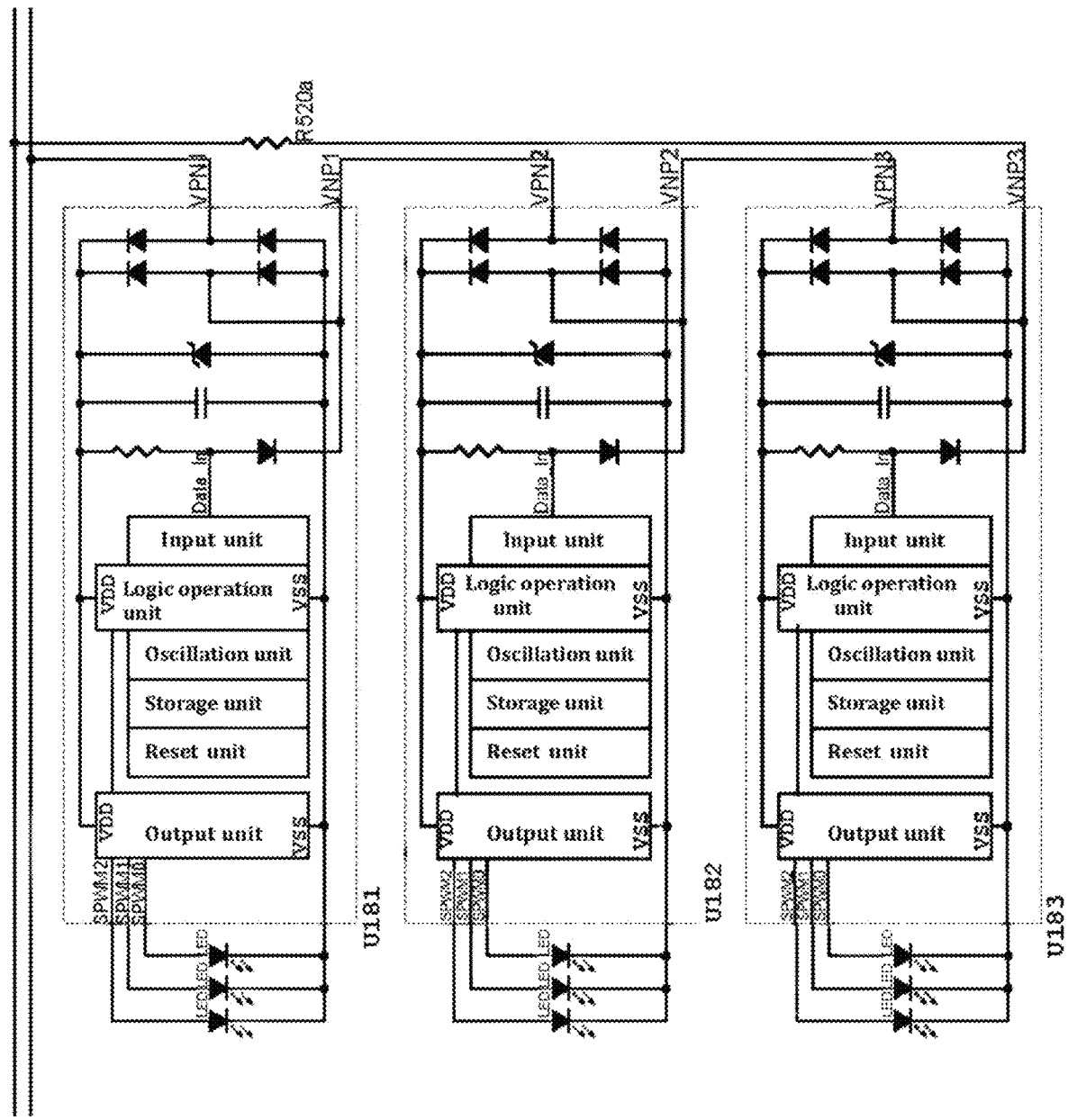
Fig.11b(2)

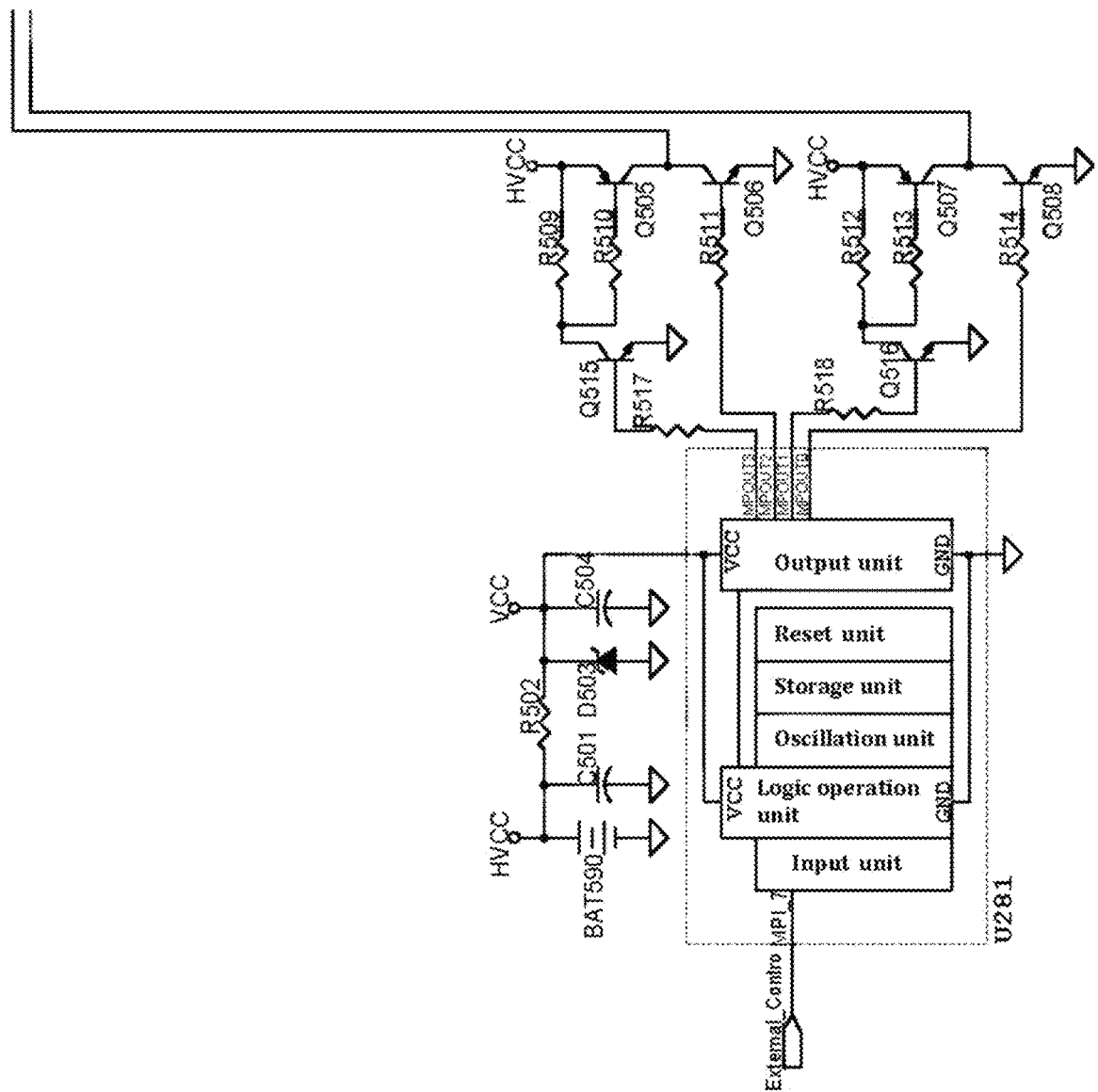
Fig.11b(3)

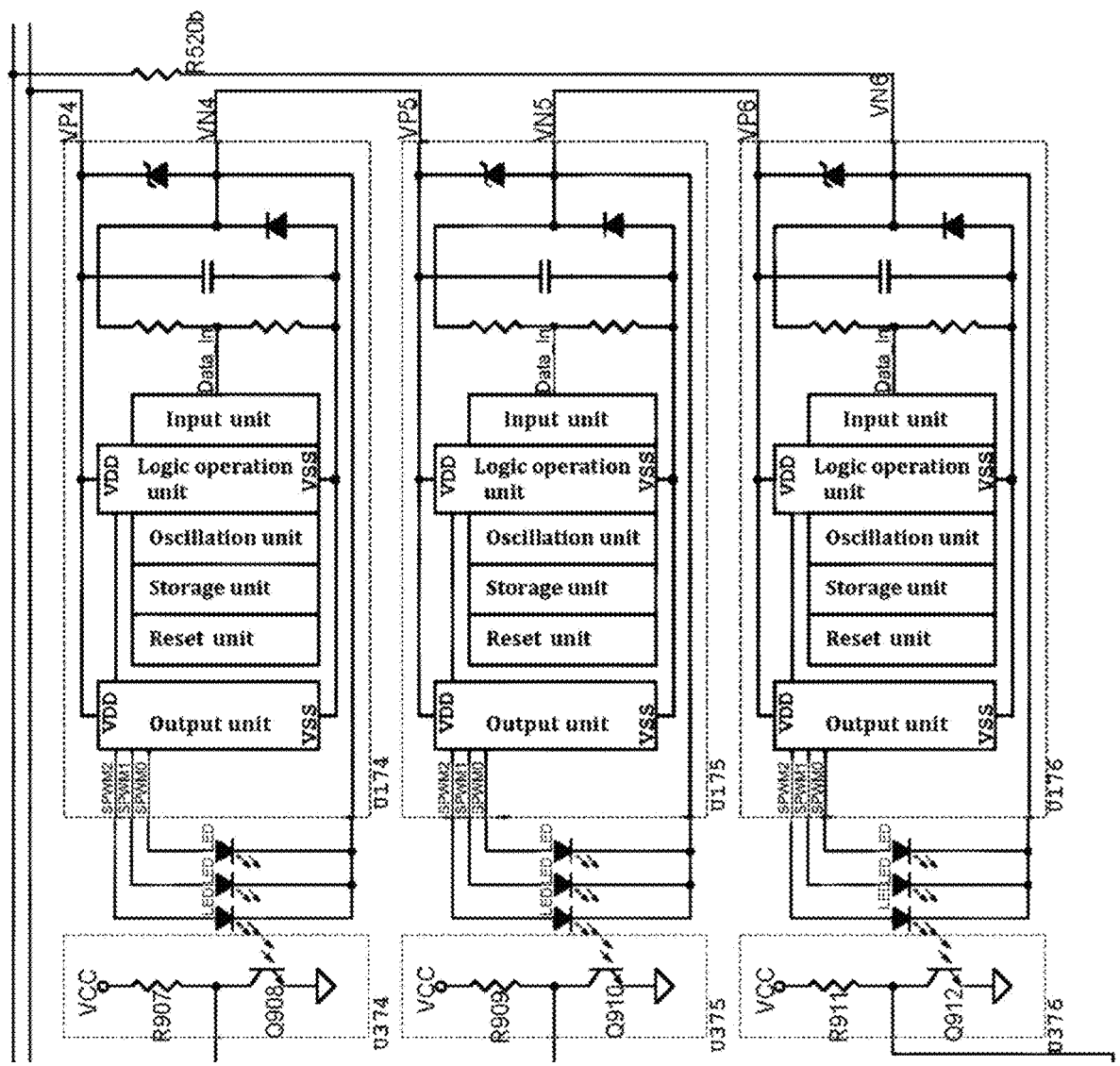
Fig.14a(1)

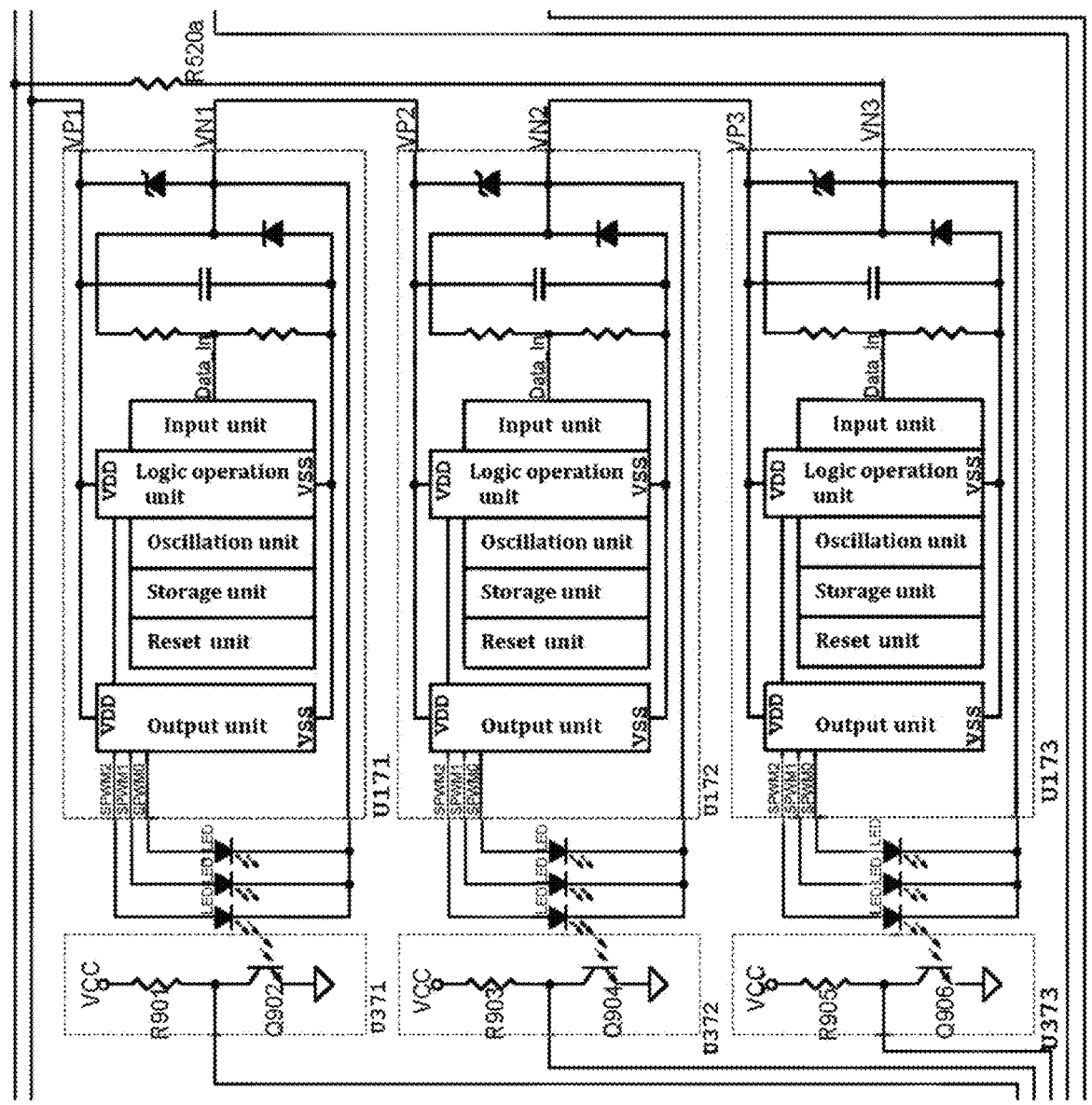
Fig.14a(2)

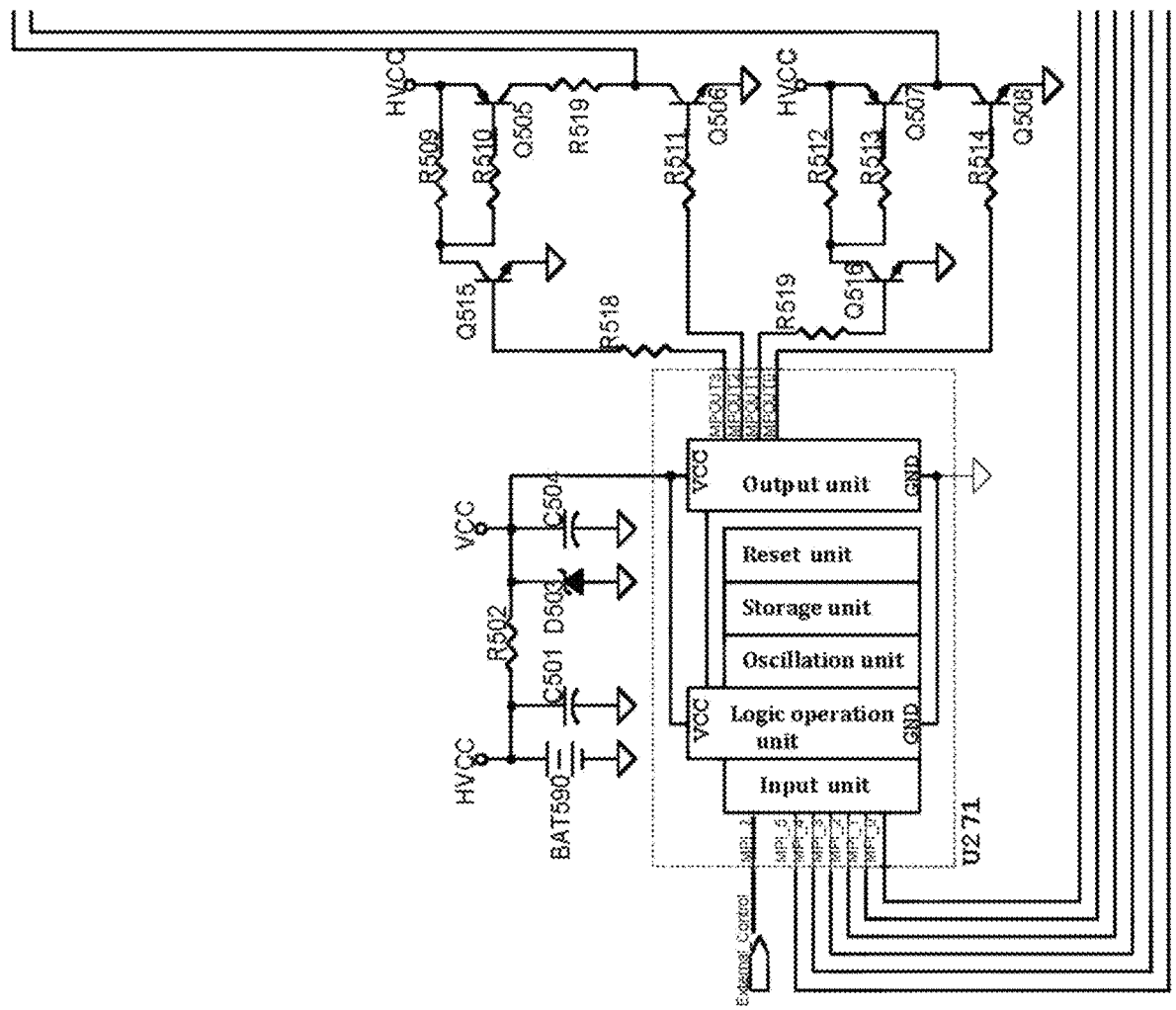
Fig.14a(3)

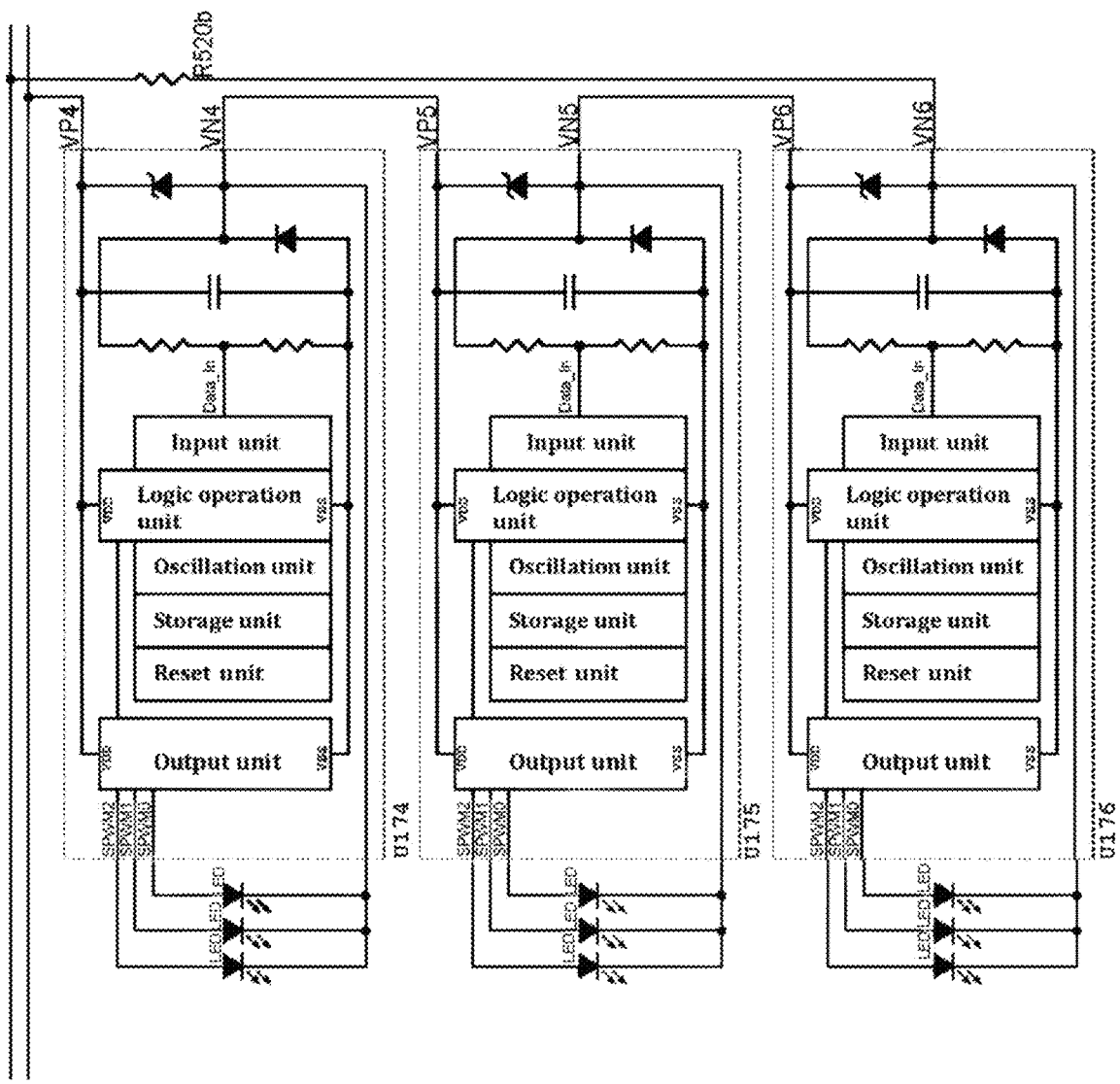
Fig.14b(1)

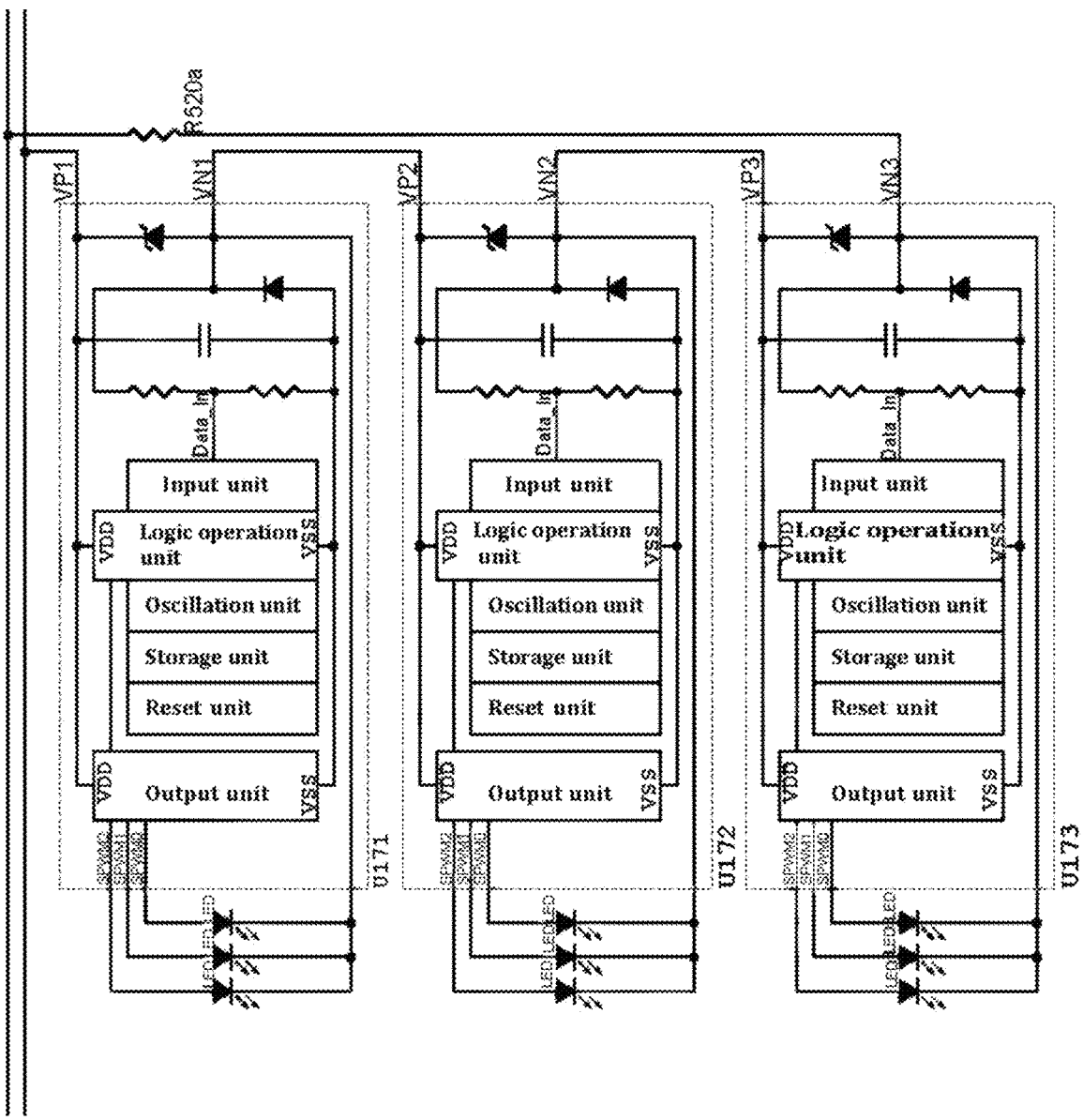
Fig.14b(2)

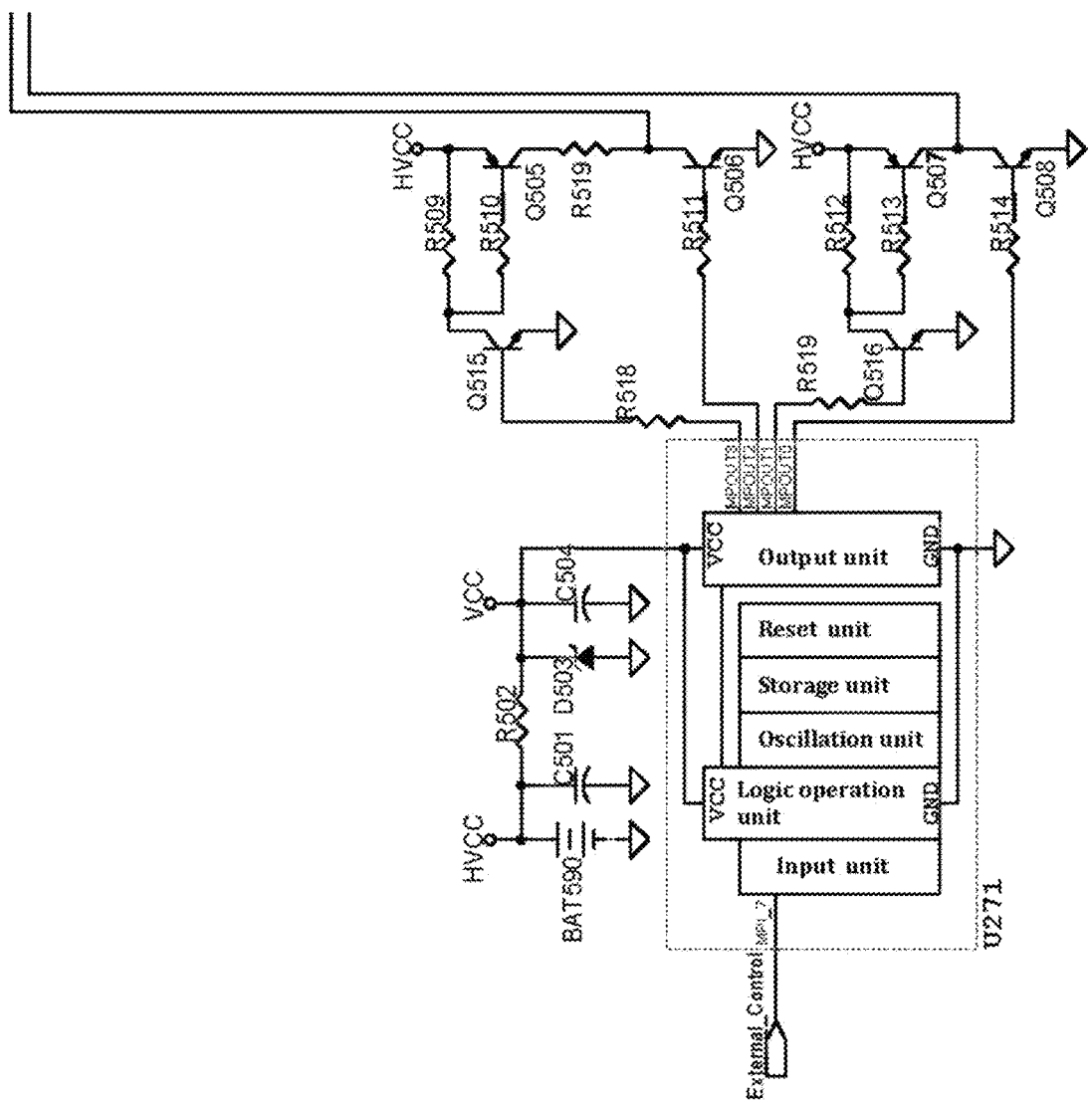
Fig.14b(3)

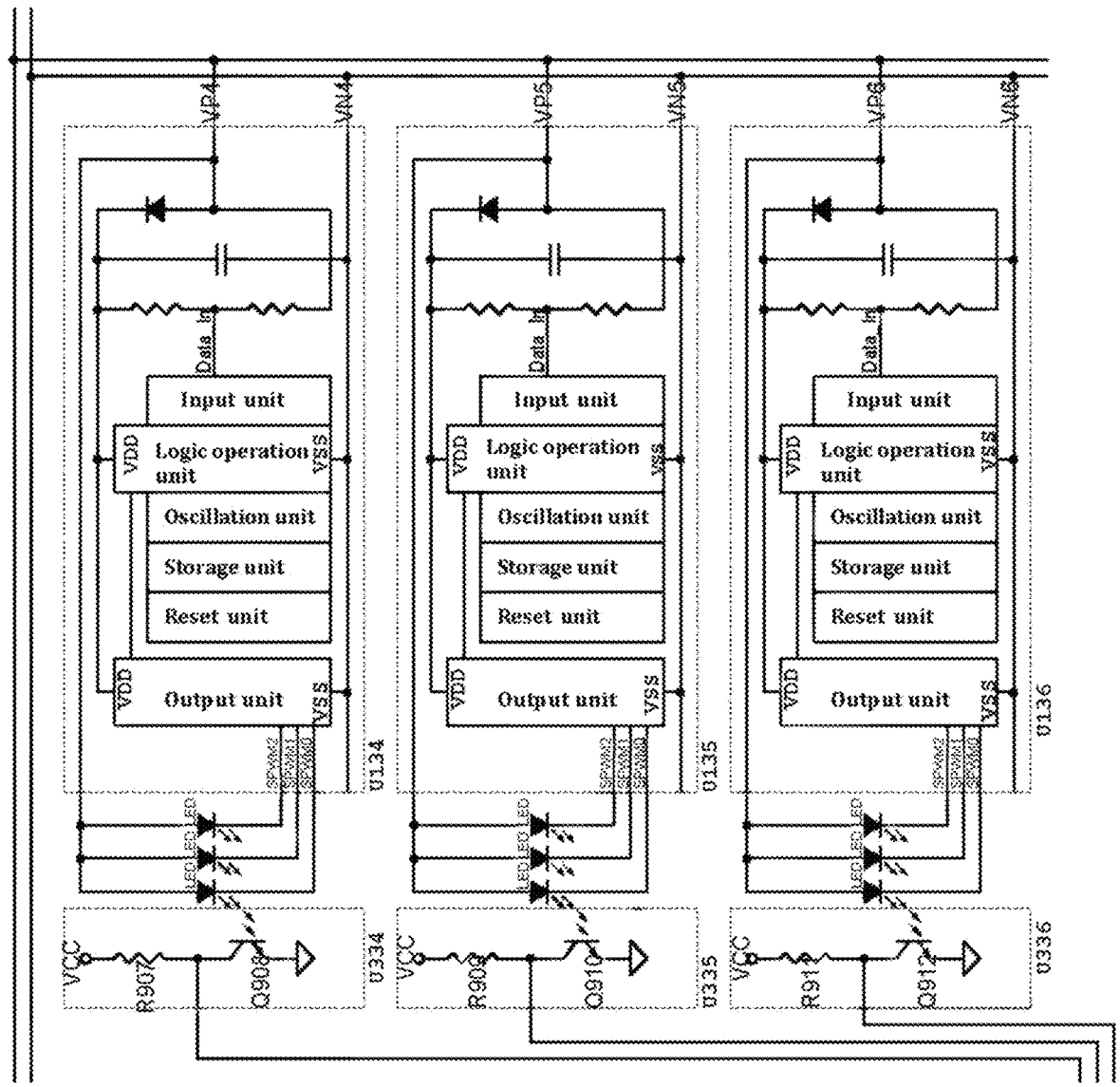
Fig.17a(1)

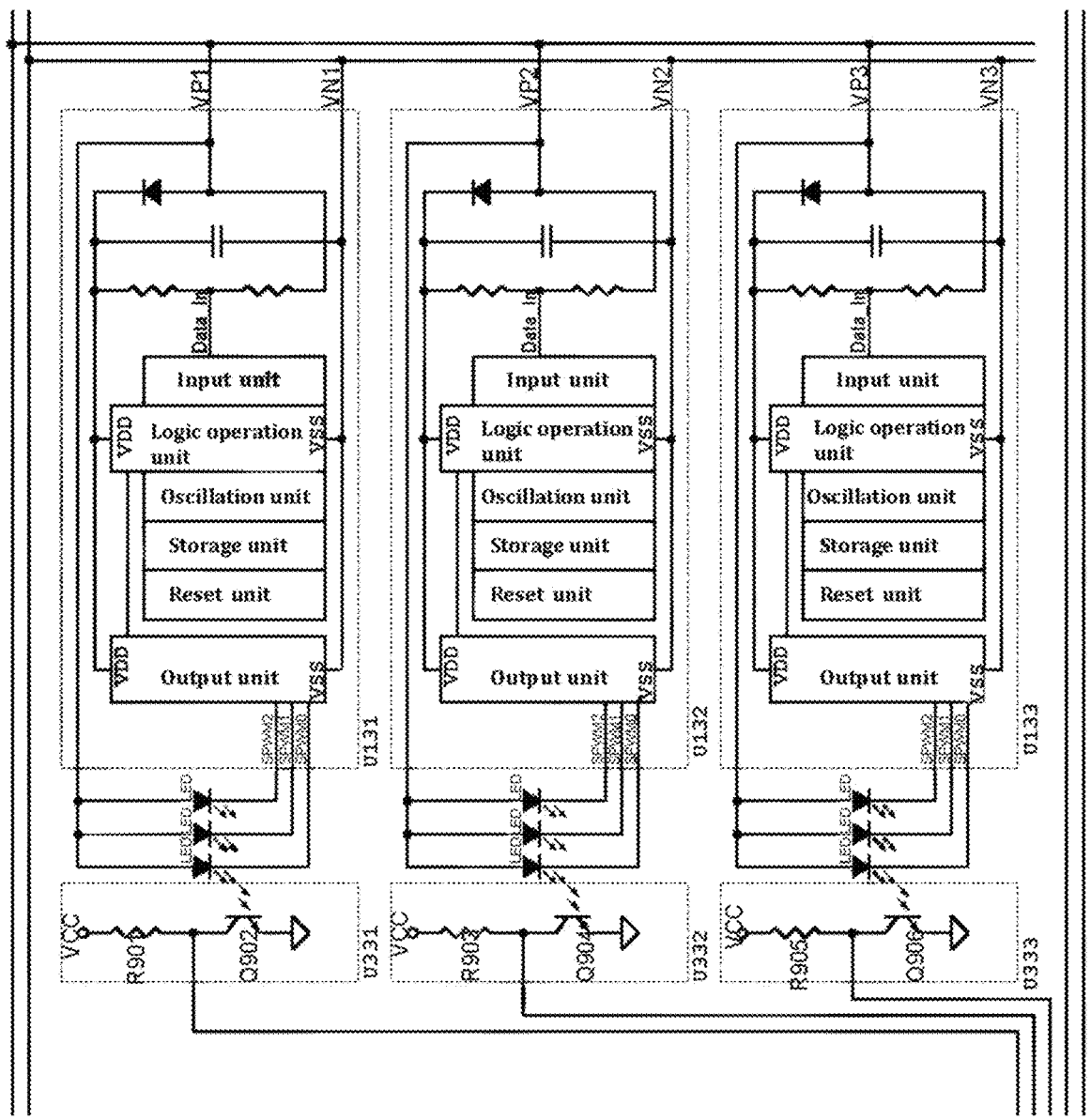
Fig.17a(2)

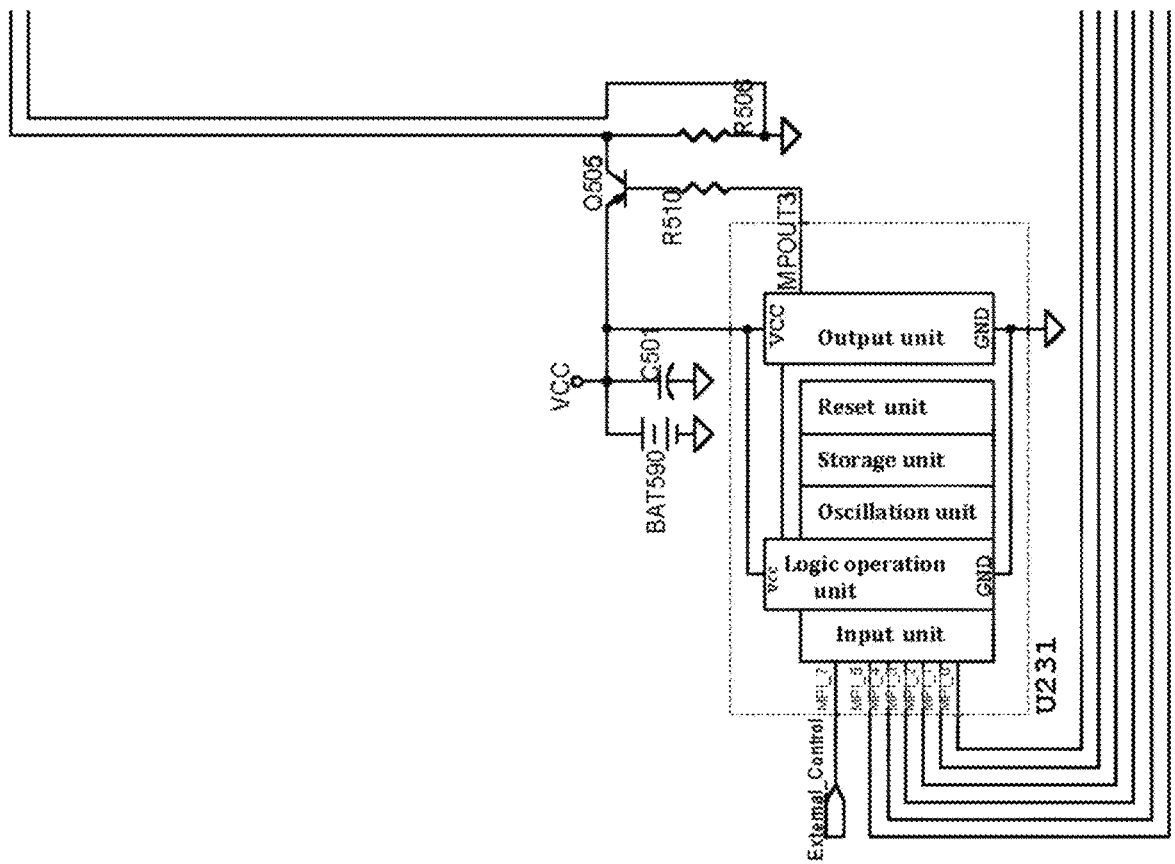
Fig.17a(3)

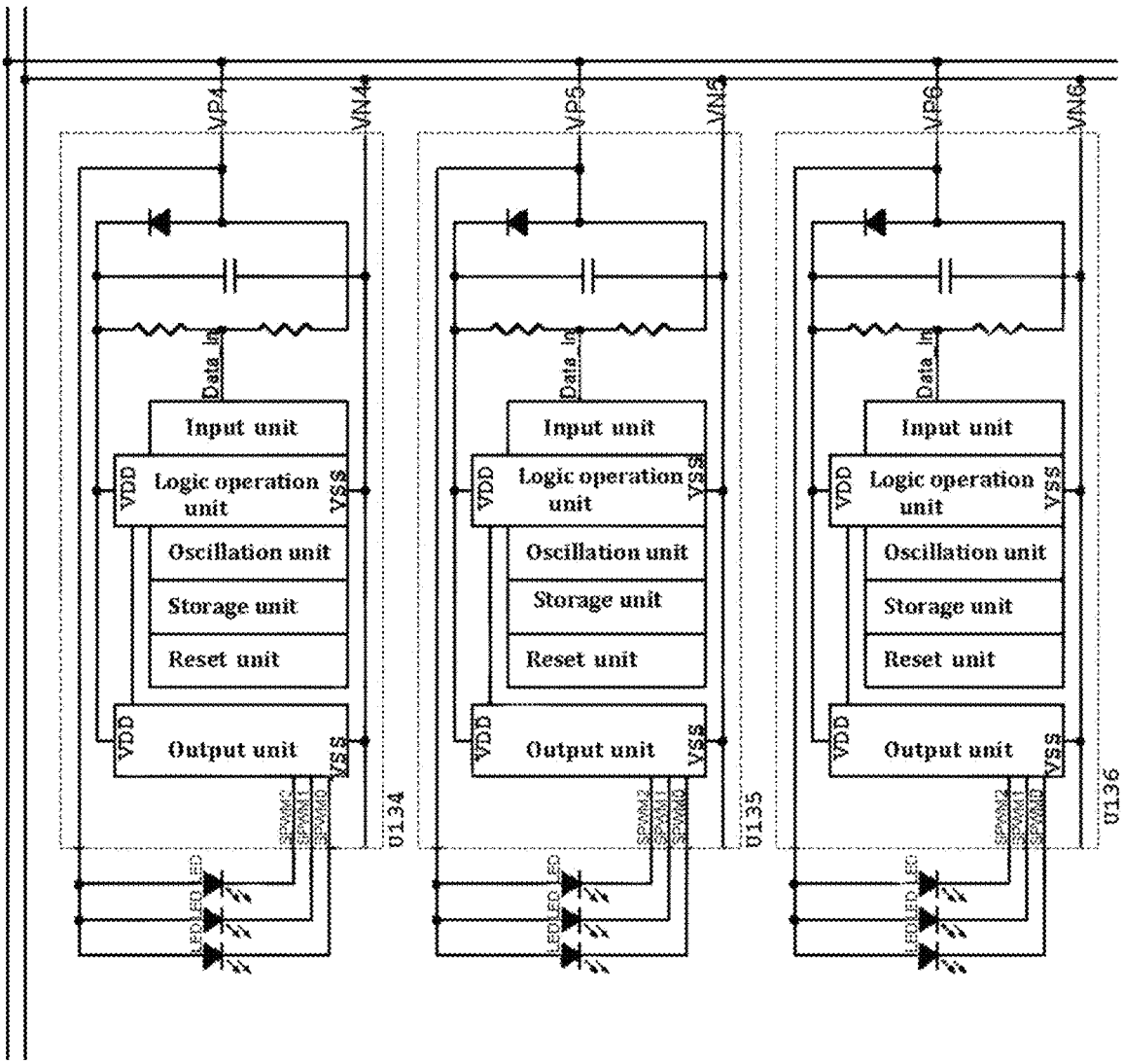
Fig.17b(1)

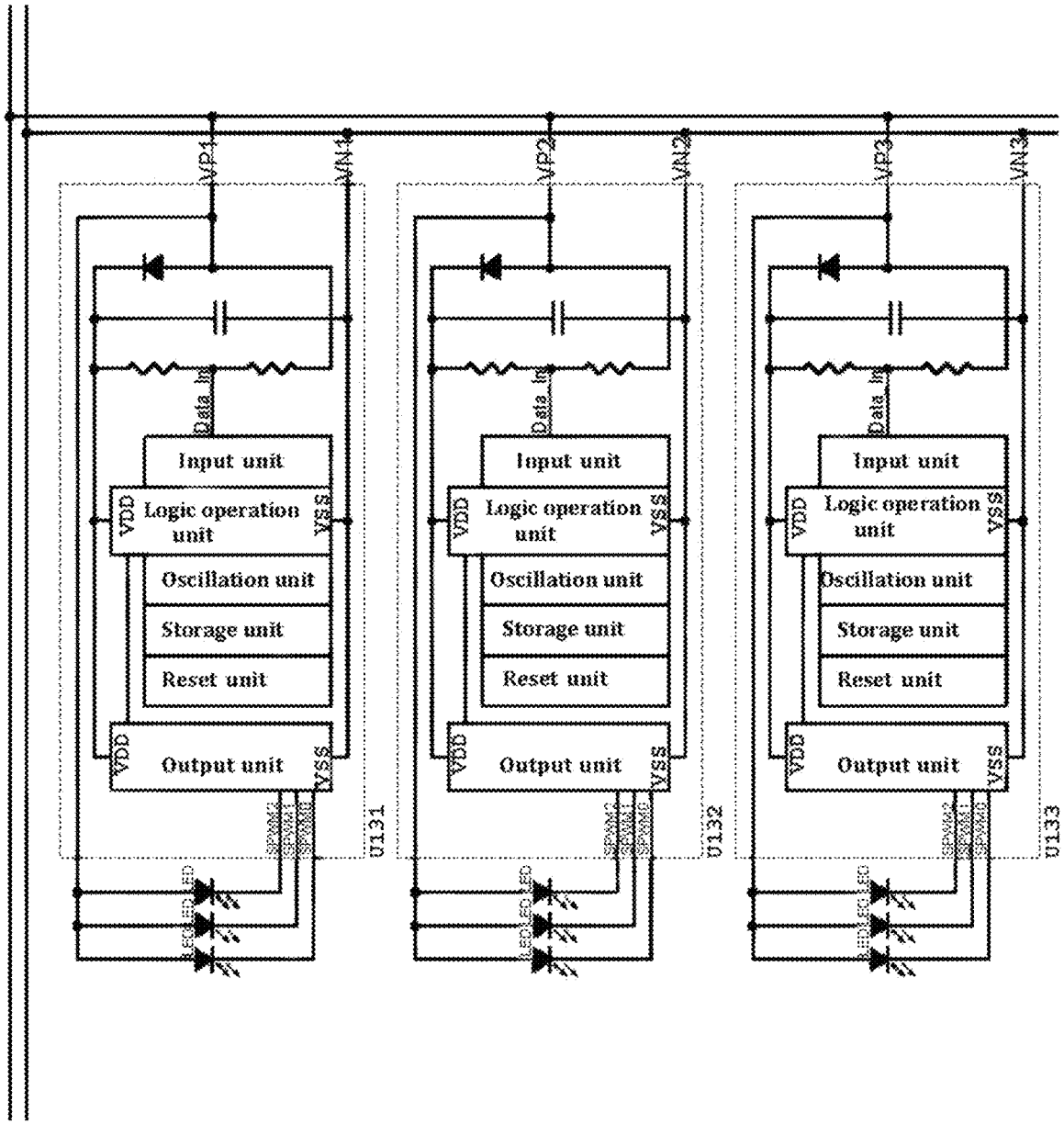
Fig.17b(2)

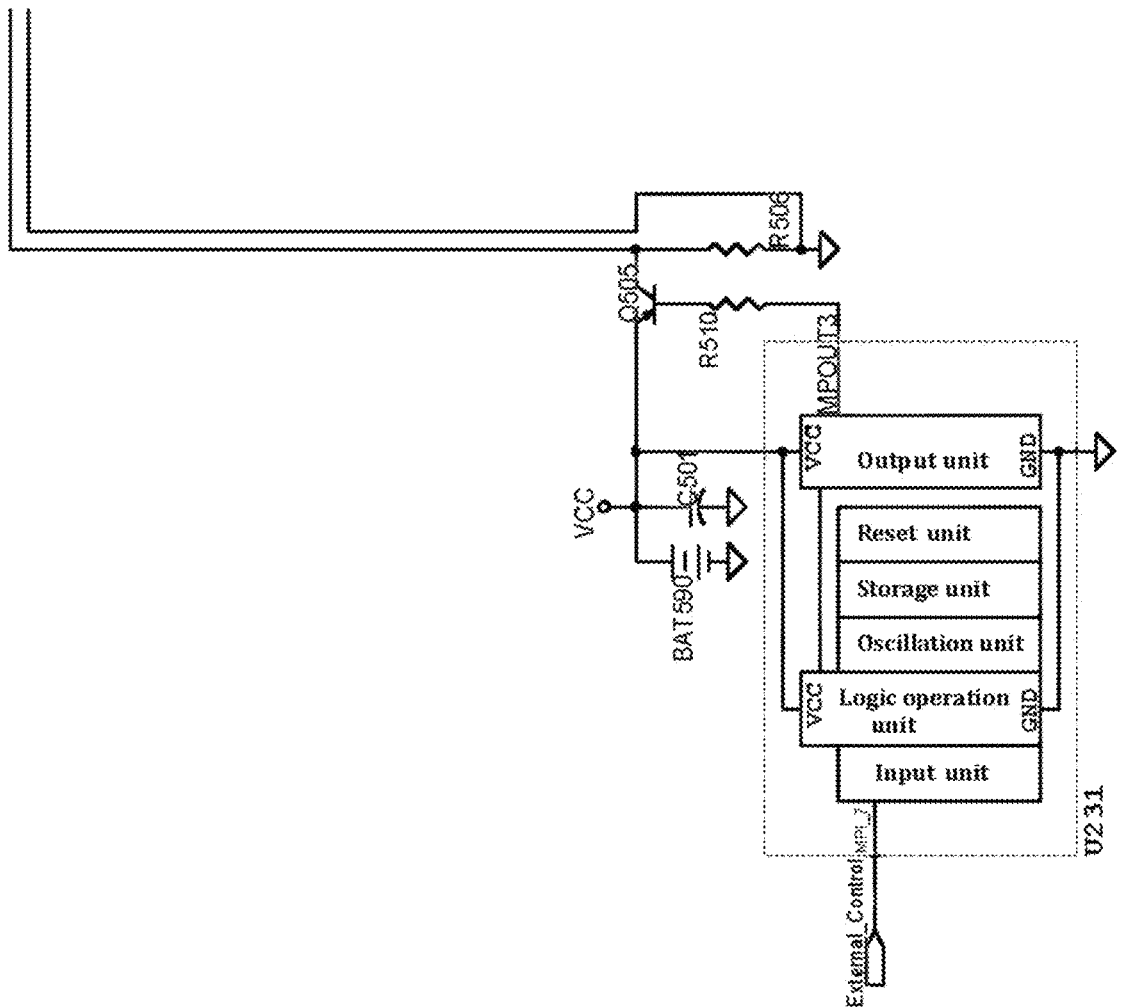
Fig.17b(3)

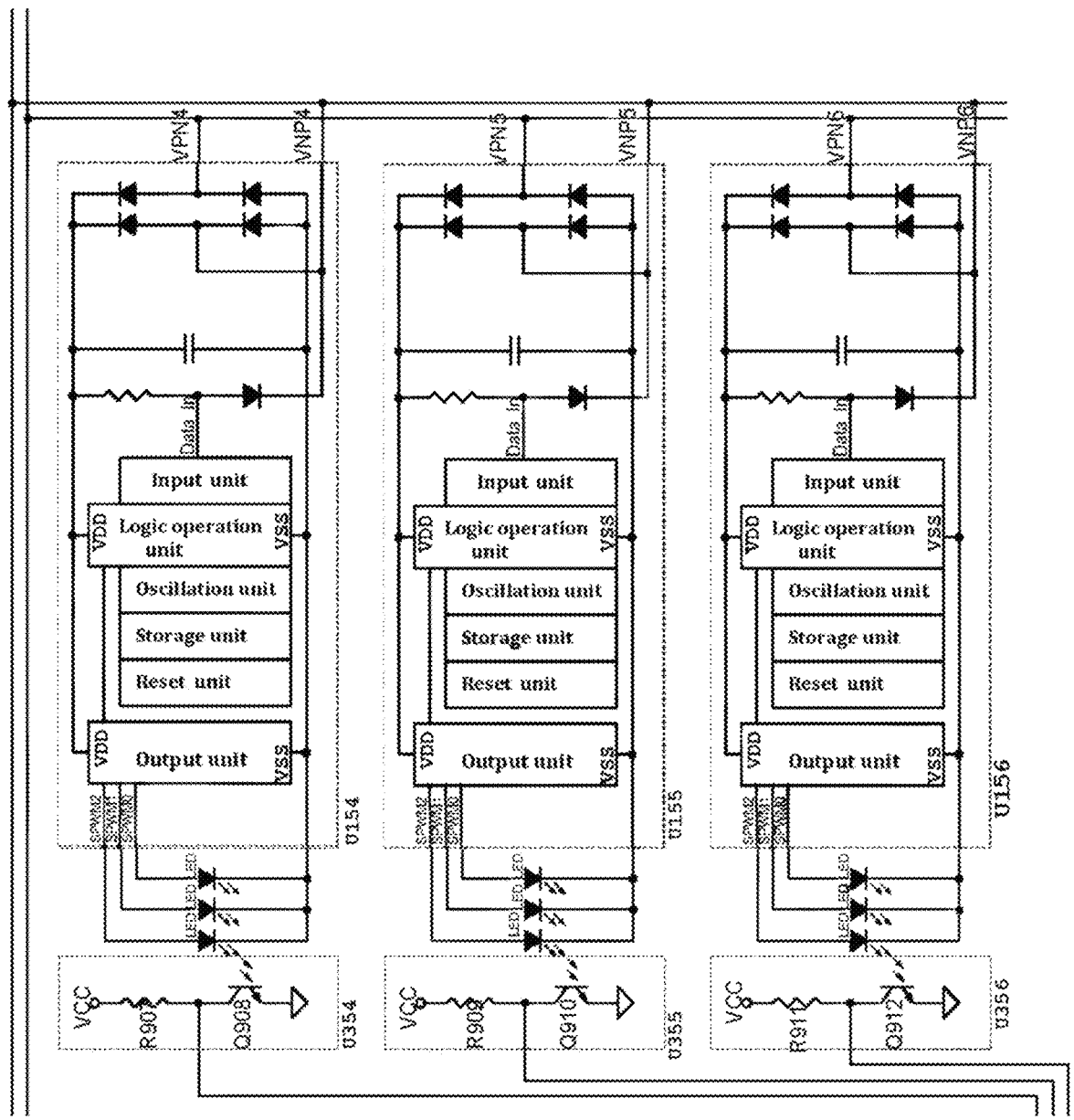
Fig.19a(1)

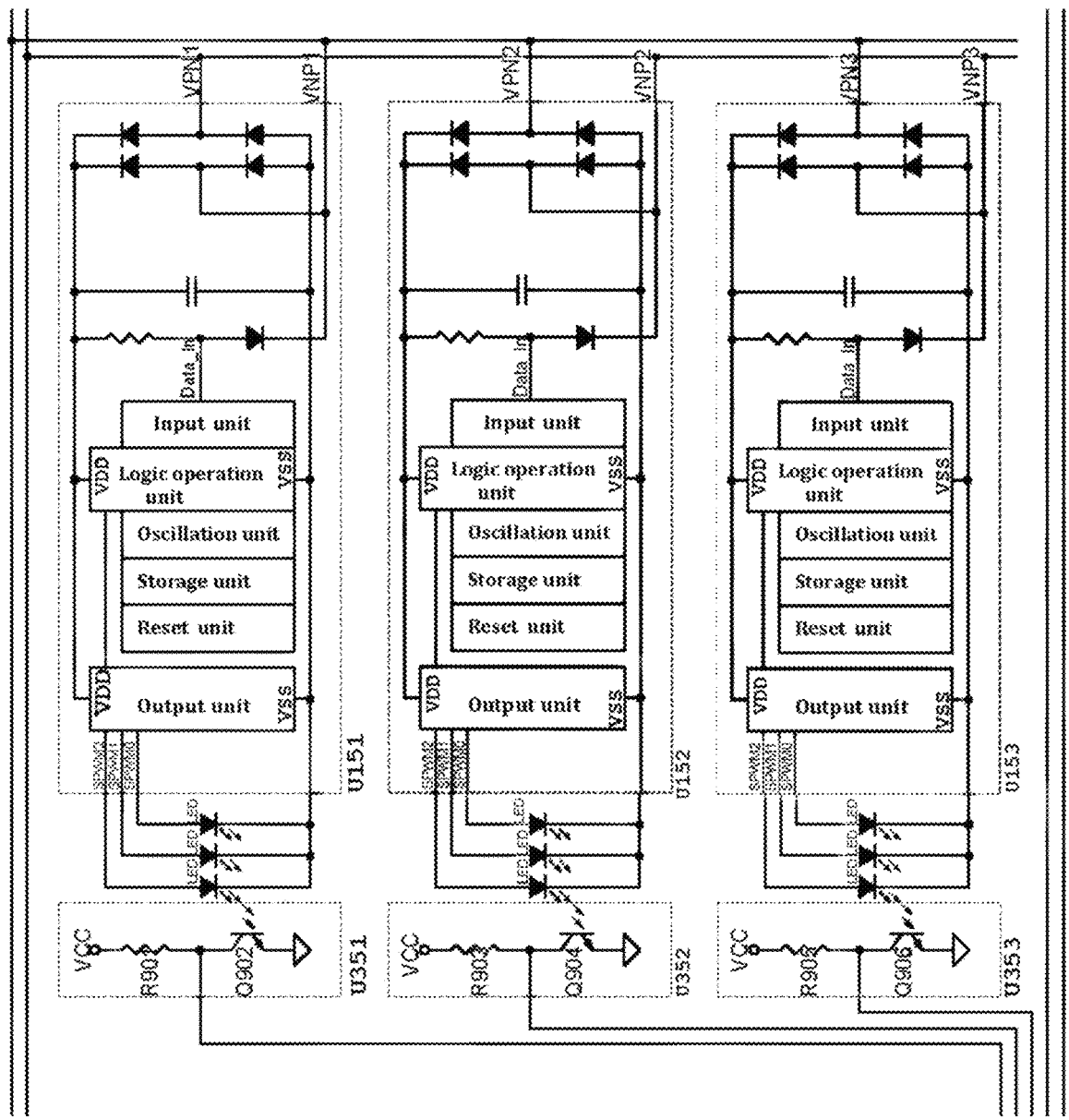
Fig.19a(2)

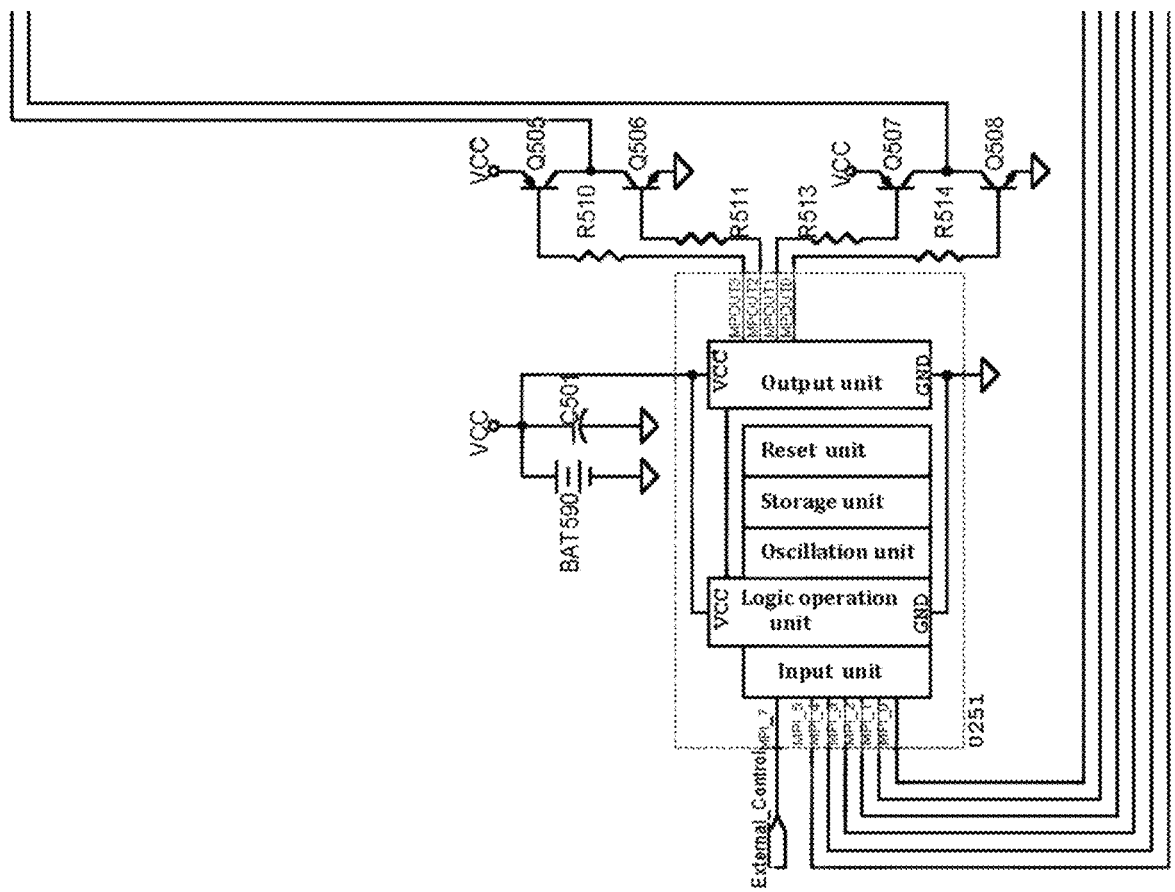
Fig.19a(3)

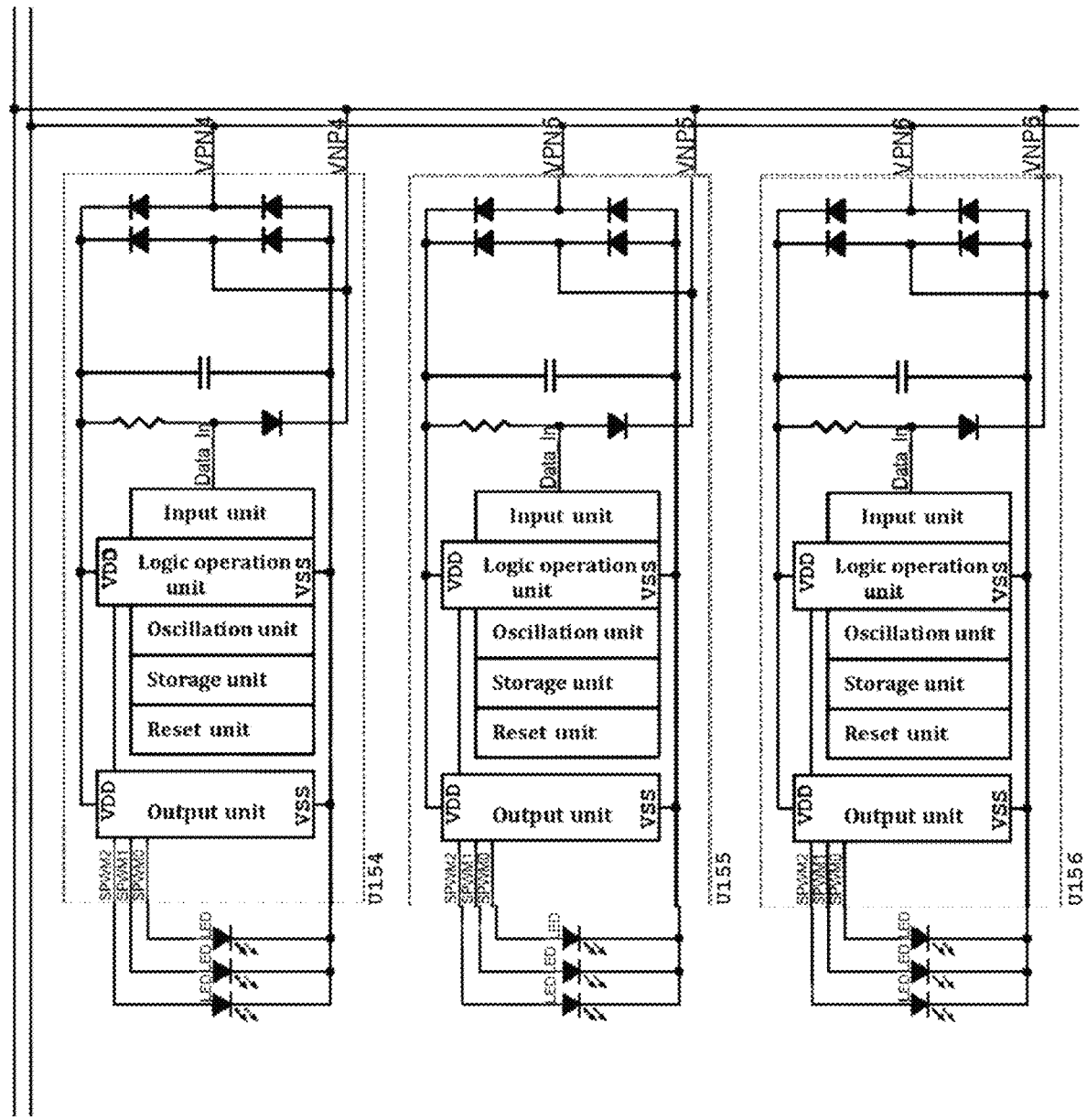
Fig.19b(1)

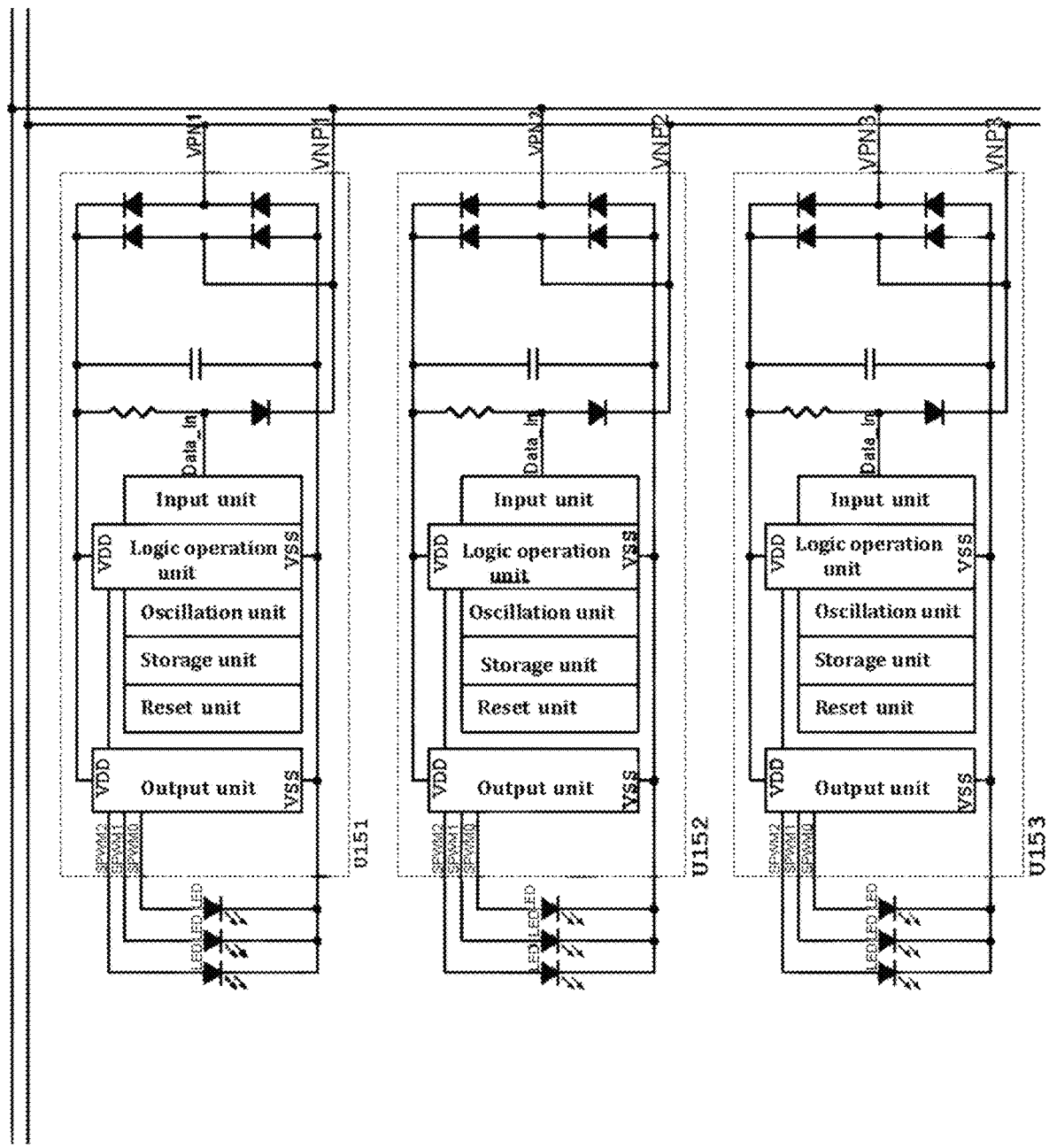
Fig.19b(2)

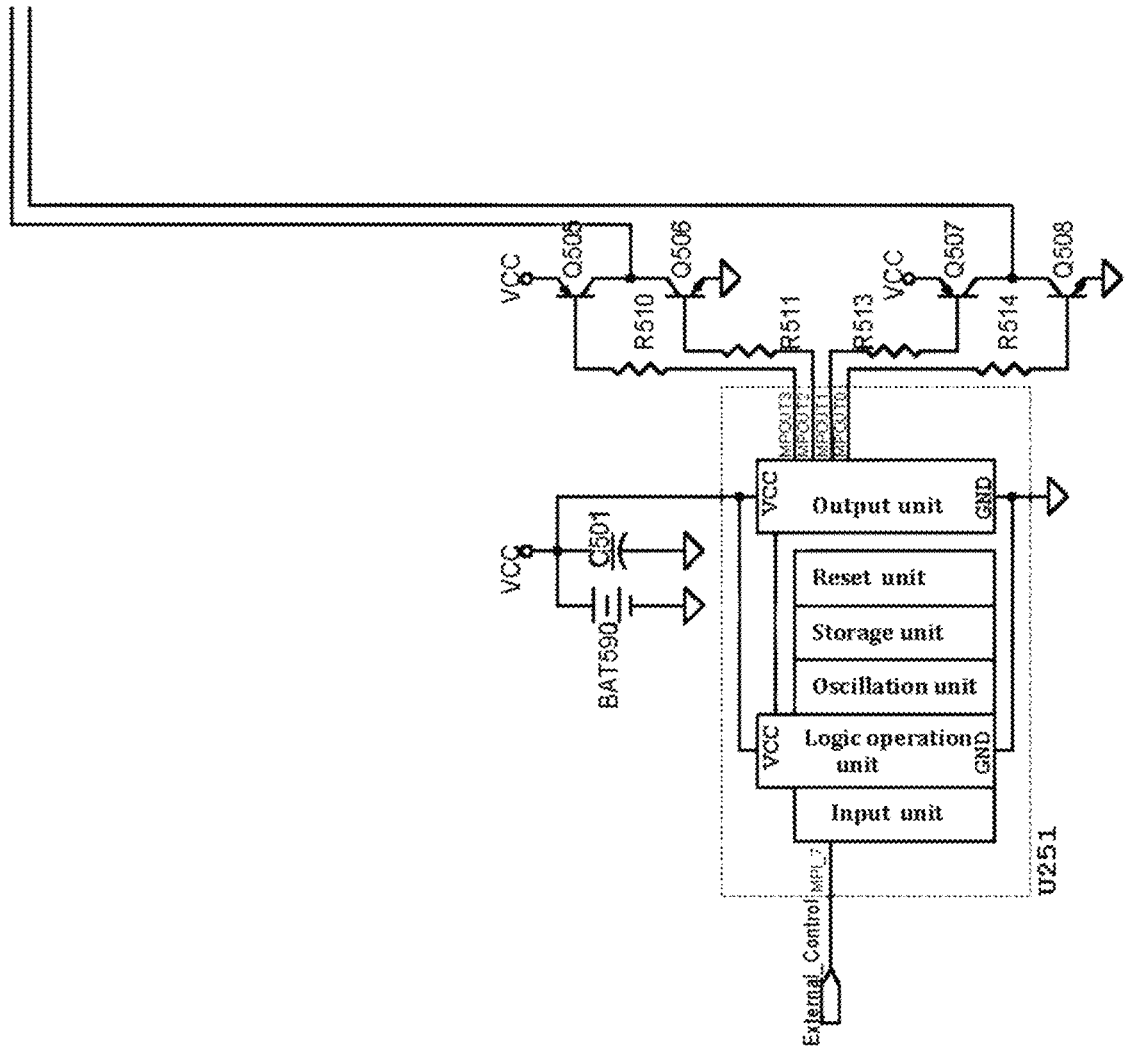
Fig.19b(3)

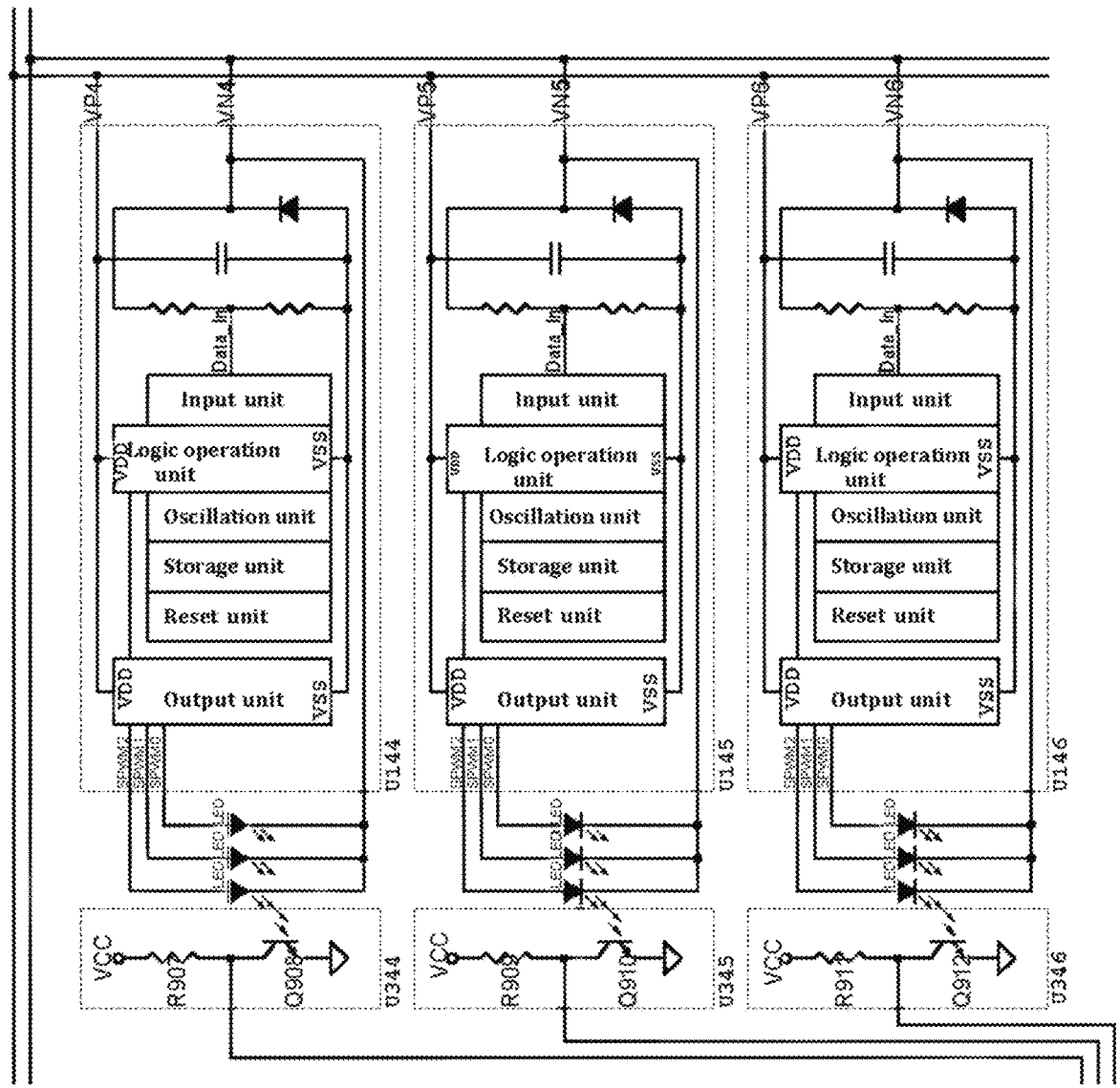
Fig.21a(1)

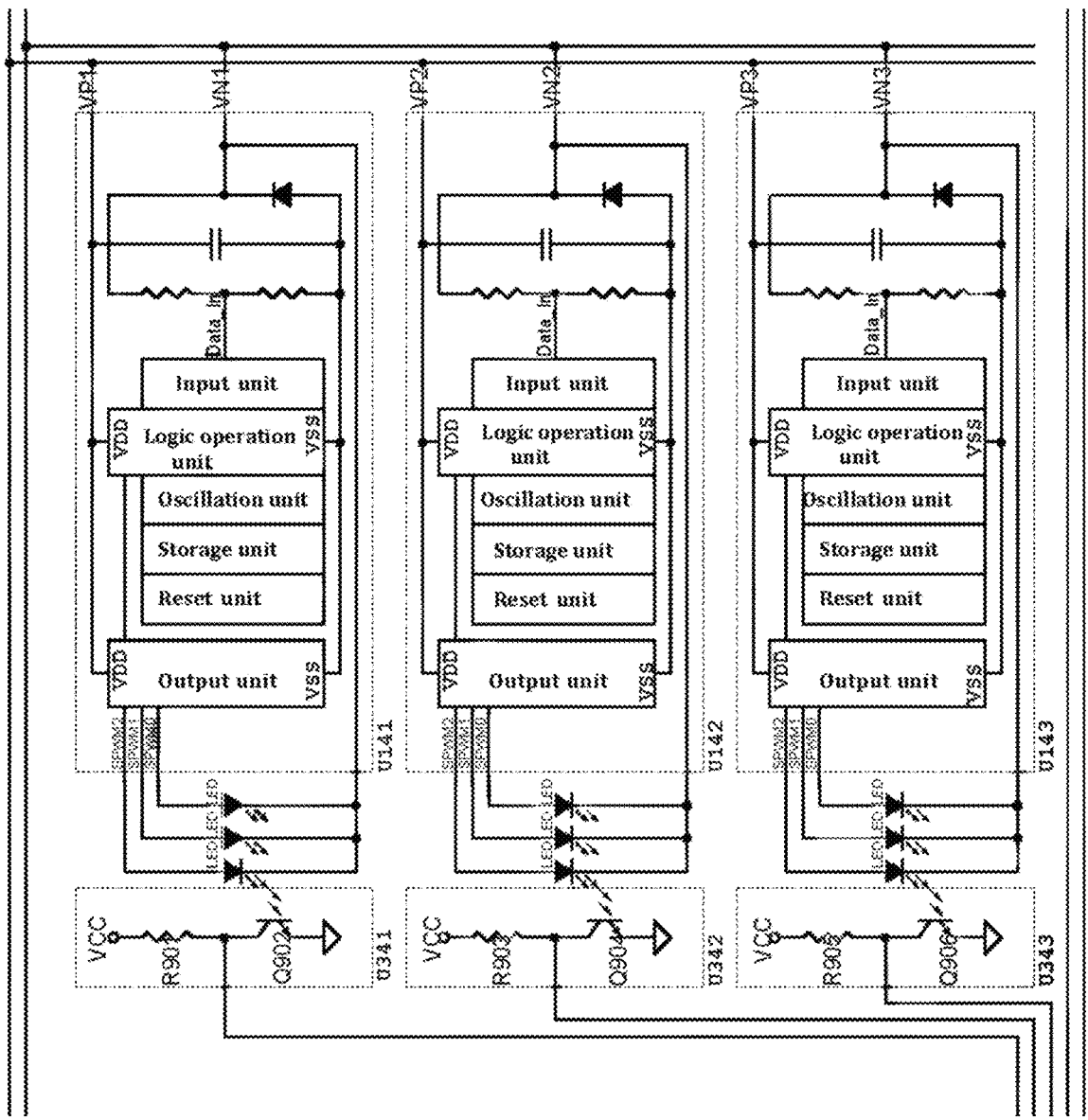
Fig.21a(2)

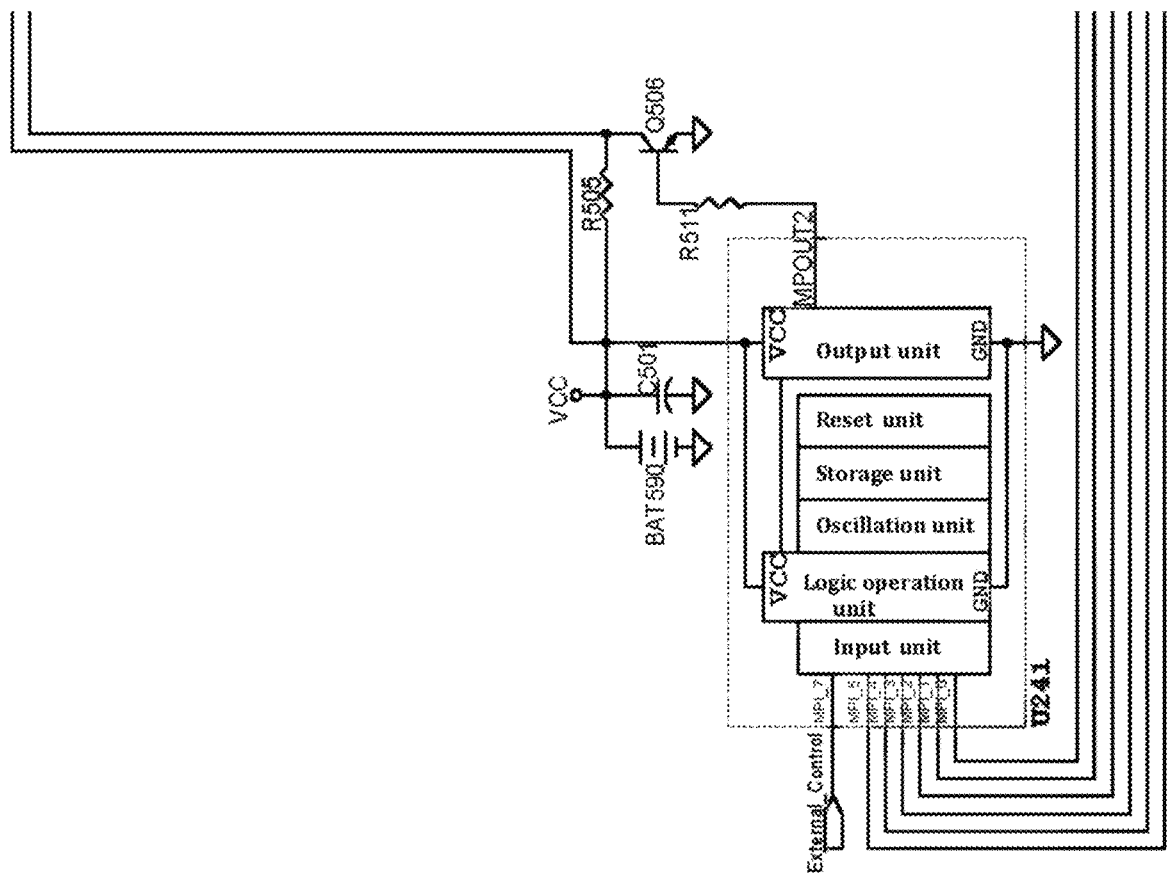
Fig.21a(3)

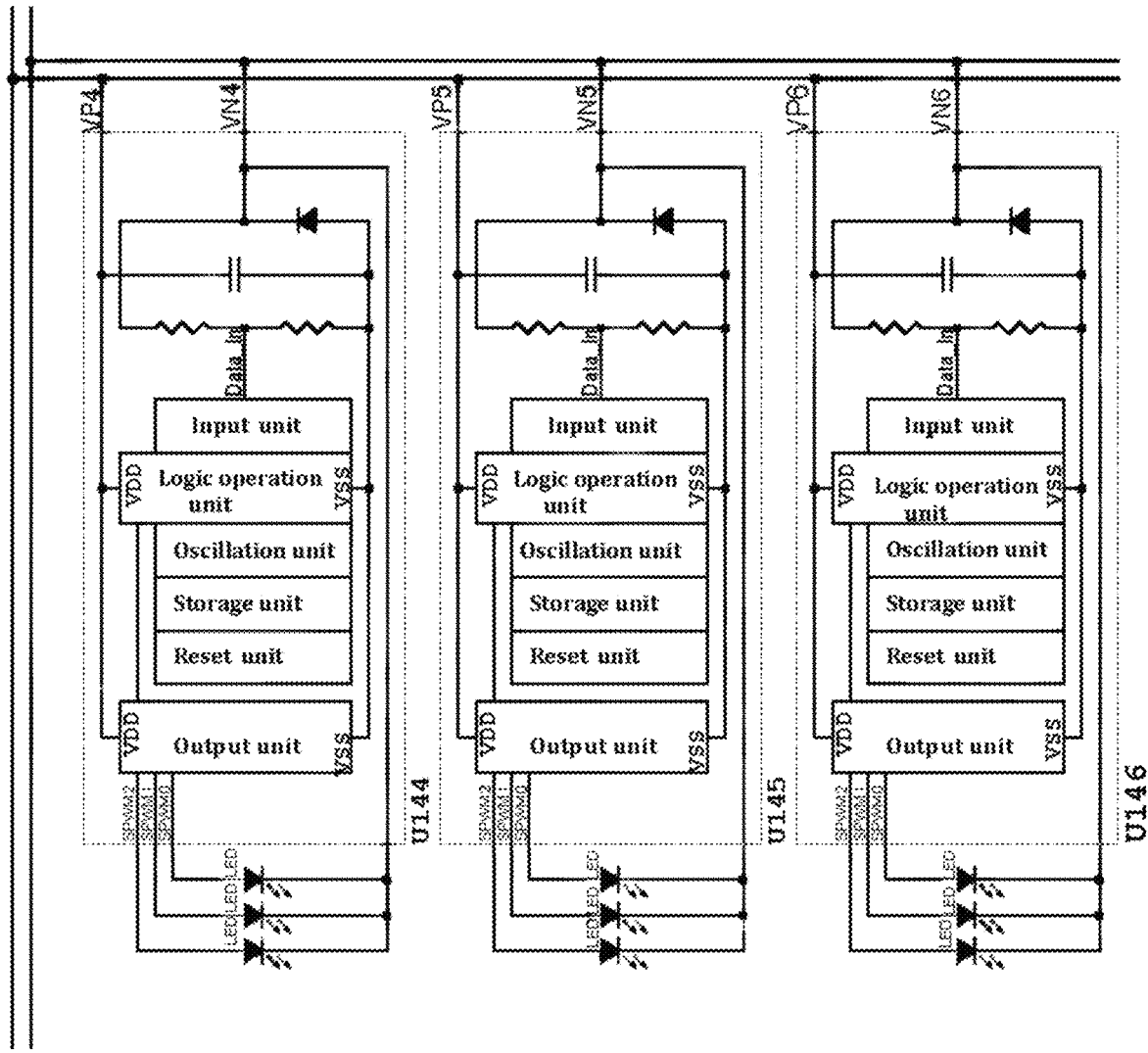
Fig.21b(1)

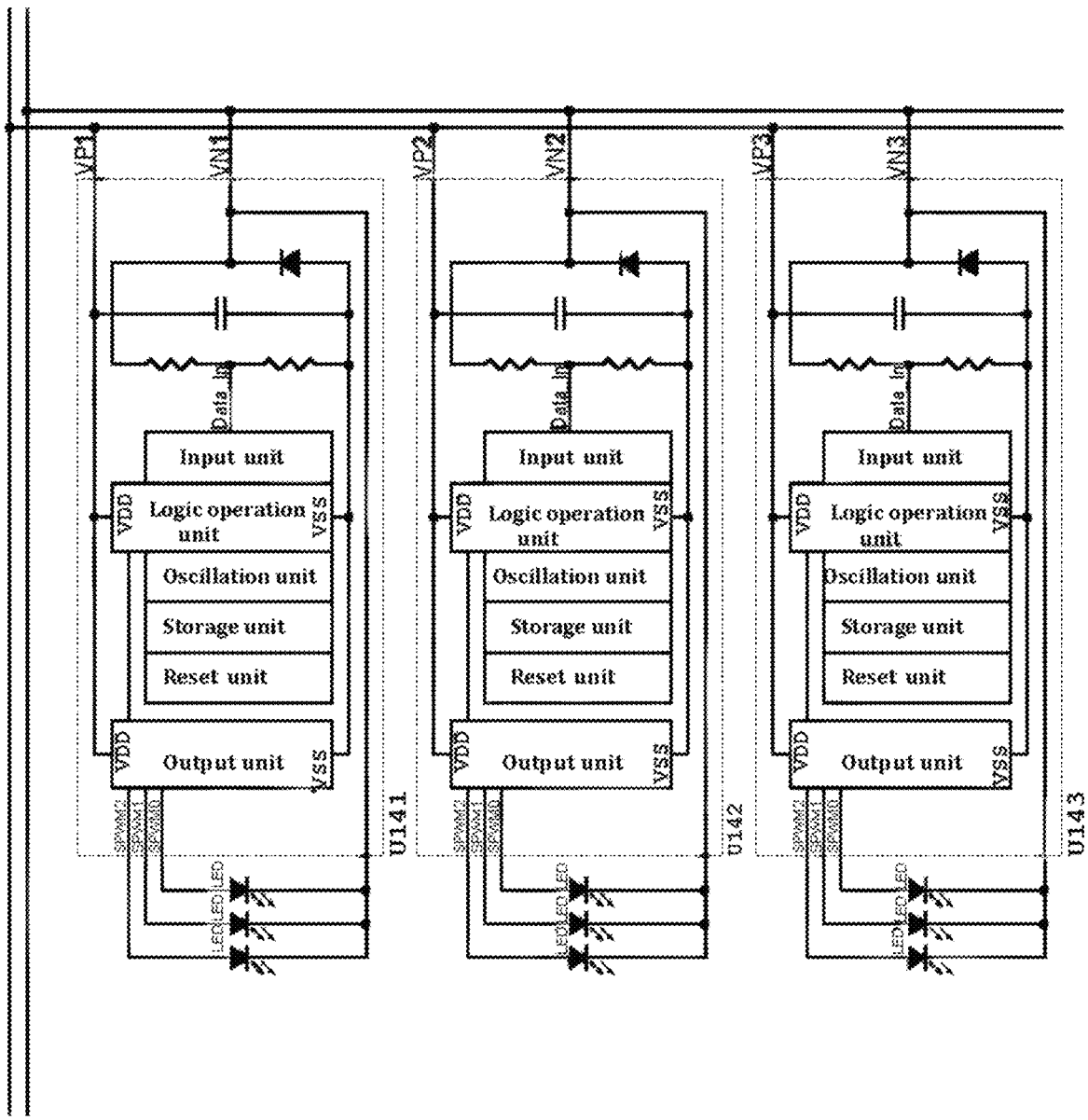
Fig.21b(2)

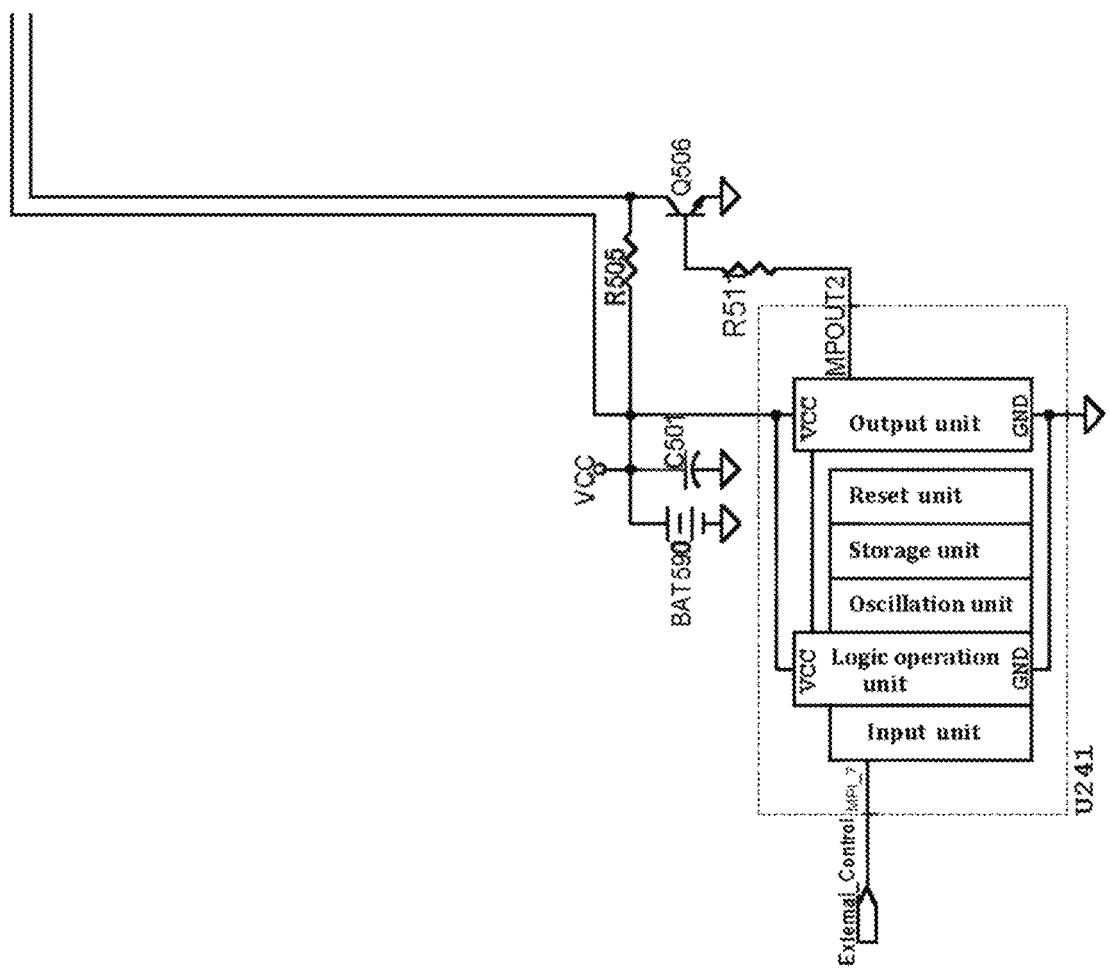
Fig.21b(3)

METHOD AND SYSTEM FOR CONTROLLING AN ELECTRONIC DEVICE HAVING SMART IDENTIFICATION FUNCTION

CROSS-REFERENCE TO RELATED APPLICATIONS

This application is a national stage application under 35 U.S.C. 371 of PCT Application No. PCT/CN2017/098338 having an international filing date of 21 Aug. 2017, the entire disclosure of which is herein incorporated by reference.

TECHNICAL FIELD

The present disclosure relates to the technical field of electronic system, in particular, relates to an electronic system requiring one-to-many control, and a method for controlling the same.

BACKGROUND

In an electronic system having multiple electronic devices, the multiple electronic devices are disposed in the same communication network and controlled by a master device so as to coordinate with other electronic devices to complete a certain task.

In the prior art, for an electronic system having multiple electronic devices, each of which requires an ID code (unique identification code) address at factory that has to be strictly paired with an assigned position of the electronic device in the system. When using this method, following problems may occur:

1. Errors related to ID code address settings may easily occur during mass production of electronic devices;

2. Errors of position settings may easily occur during installation of electronic devices;

3. If the aforementioned problem 1 or 2 occurs, it is difficult for the shipped or installed electronic devices to be returned back to the factory for repairing and therefore, defects are difficult to be eliminated.

4. Although defect rate may be significantly decreased in a strictly controlled environment, massive manpower and material resources are still required during manufacture. Therefore, automatic mass production is not available due to the lack of practicality.

Take the existing two-wire dot-control/independent control (controlling LEDs independently) LED light string as an example, each LED electronic device possesses a corresponding relation of the ID code address of the electronic device and its position in the LED light string. For example, if 25 LED electronic devices are set on a single LED light string, 25 LED electronic devices with 25 ID code addresses need to be produced in advance. During the assembly and manufacture of light string, the ID code address of each LED electronic device has to be accurately paired with the assigned position in the LED light string. Therefore, when trying to produce such kind of two-wire independent-control LED light string in a mass scale, it is easily occurred that the LED electronic device is installed at a wrong position in a LED light string, or the mixing of LED electronic devices may lead to a problem that the LED electronic devices having the same ID code address are repeatedly disposed on the same LED light string resulting in defects that the LED light string cannot work normally. After the LED electronic devices are manufactured and assembled into a LED light string, it is difficult for the LED electronic devices to be returned back to factory for repairing, during which an incorrect position of the electronic device is changed. Therefore, defects of such kind of independent-control LED light string during mass production is difficult to avoid.

Although under the strictly controlled laboratory environment, a small amount of samples demonstrating the same effect as the present disclosure can be made with caution by persons skilled in the art according to the existing technical solutions, automatic mass production is still not available due to the lack of practicality.

SUMMARY

To partly solve the above technical problems, the first aspect of the present disclosure is to provide a method for controlling an electronic device, having a smart identification function. The method may partly overcome the technical problems that occur during the mass production, installation and testing of the products and increase the manufacturing efficiency, easily realizing an independent/group control function for electronic devices.

The second aspect of the present disclosure is to provide a system for controlling an electronic device, to implement the above method.

The following technical solutions are provided according to the present disclosure.

A method for controlling an electronic device, having a smart identification function, including steps of:

S1, outputting, by a master device, an access signal to an electronic device;

S2, receiving, by the electronic device, the access signal, and outputting, by the electronic device, a corresponding action signal according to the access signal;

S3, detecting, by the master device, the action signal which is outputted by the electronic device, and identifying, by the master device, sequence information and/or position information of the electronic device according to the action signal.

Preferably, the step S1 is specifically: outputting, by the master device, the access signal containing unique identification code information and control instruction information to a plurality of electronic devices each having a corresponding unique identification code; the step S2 is specifically: outputting, by one of the electronic devices which corresponds to the unique identification code information, the action signal according to the control instruction information.

Preferably, the step S1 specifically includes sub-steps of:

S11, indexing the unique identification code for each of the electronic devices by a logic operation unit of the master device using a searching algorithm;

S12, broadcasting, by an output unit of the master device, the access signal containing unique identification code information and control instruction information to the electronic devices;

the step S2 specifically includes sub-steps of:

S21, outputting, by an output element which is driven by an output unit of one of the electronic devices which corresponds to the unique identification code information, a corresponding action signal according to the control instruction information;

or,

S22, transmitting, by one of the electronic devices which corresponds to the unique identification code information, the unique identification code information or operation results in a storage unit of the one of the electronic devices to an output unit of the one of the electronic devices to drive an output element to output a corresponding action signal according to the control instruction information;

the step S3 specifically includes sub-steps of:

S31, detecting, by the master device using a testing device, the action signal outputted by the one of the electronic devices, and converting the action signal into an electrical signal to be transmitted back to a master processing circuit for confirmation;

S32, based on a sequence of a sensing element for the action signal or a position coordinate of the action signal detected by the testing device, recording, by the master processing circuit of the master device, the sequence and/or coordinate of the corresponding electronic device, and including the sequence and/or coordinate into an electronic device information record table;

S33, repeatedly executing the above operation procedure from step 1 to step 3 until the searching algorithm in a logic operation unit of the master device is completed, and obtaining an electronic device information record table which includes the sequence and/or coordinate information of the electronic devices.

Preferably, the method further includes a step of:

S4, storing the obtained electronic device information record table in a storage unit of the master device.

Preferably, the method further includes a step of:

S5, transmitting, by the master processing circuit, control signals to control a plurality of electronic devices to perform independent actions or group actions according to the electronic device information record table in the storage unit.

As a first preferred embodiment of the present disclosure, the step S5, in which direct indexing control is used, specifically includes sub-steps of:

S51, according to the electronic device information record table in the storage unit, transmitting, by the master processing circuit, the control signals each containing unique identification code information and control instruction information one by one to control the electronic devices to perform actions;

or, according to the electronic device information record table in the storage unit, transmitting, by the master processing circuit, control signals each containing unique identification code information, arithmetic information and control instruction information to the electronic devices; performing, by the logic operation unit in each of the electronic devices, logic operations on the received unique identification code information according to the received arithmetic information, and one of the electronic devices which matches the logic operation result being responsible for executing the received control instruction information; and subsequently, when the master processing circuit transmits control signals containing only control instruction information to the electronic devices, performing, by the logic operation unit in each of the electronic devices, logic operations based on the previous arithmetic information and logic operation result, and executing, by one of the electronic devices which matches the logic operation result, the received control instruction information, enabling the electronic devices to be controlled to perform independent or group actions.

As a second preferred embodiment of the present disclosure, the step S5, in which quick indexing control is used, specifically includes sub-steps of:

S52, according to the electronic device information record table in the storage unit, transmitting, by the master processing circuit, correlated signals each containing unique identification code information and corresponding quick indexing code information to the electronic devices, and writing the quick indexing code into the storage unit of one of the electronic devices corresponding to the unique identification code;

S53, transmitting, by the master processing circuit, control signals each containing the quick indexing information and control instruction information one by one to control the electronic devices to perform actions;

or, transmitting, by the master processing circuit, control signals each containing the quick indexing code information, arithmetic information and control instruction information to the electronic devices, and performing, by the logic operation unit in each of the electronic devices, logic operations on the received quick indexing code information according to the received arithmetic information, and one of the electronic devices which matches the logic operation result being responsible for executing the received control instruction information; and subsequently, when the master processing circuit transmits control signals containing only control instruction information to the electronic devices, performing, by the logic operation unit in each of the electronic devices, logic operations based on the previous arithmetic information and logic operation result; and executing, by one of the electronic devices which matches the logic operation result, the received control instruction information, enabling the electronic devices to be controlled to perform independent or group actions.

Preferably, the step S52 further includes sub-steps of:

S521, outputting, by the master processing circuit, the access signal containing the quick indexing code information and control instruction information to the electronic device, and detecting, by the testing device, an output action signal from the electronic device, ensuring that the quick indexing code is accurately written into the corresponding electronic device.

Preferably, the method further includes a step of:

S61, matching and assembling a plurality of electronic devices with a new master device for identifying and controlling the plurality of electronic devices.

Preferably, the step S61 specifically includes sub-steps of:

S611, matching and assembling a plurality of electronic devices with a new master device, copying the electronic device information record table to a storage unit of the new master device, and the new master device controlling the plurality of electronic devices according to the electronic device information record table;

or,

S612, setting the new master device as an electronic device mode and connecting the new master device to the original master device, and writing the electronic device information record table from the original master device into the storage unit of the new master device, and the new master device controlling a plurality of electronic devices according to the electronic device information record table;

or,

S613, matching the new master device with a plurality of electronic devices and re-executing step S1 to step S4, such that the new master device obtains the electronic device information record table which contains sequence and/or position information of a plurality of electronic devices.

Preferably, the method further includes a step of:

S62, matching and assembling a plurality of electronic devices with a new master device, and the new master device identifying and controlling the plurality of electronic devices.

Preferably, the step 62 specifically includes sub-step:

S64, matching and assembling a plurality of electronic devices with a new master device, and the new master device directly controlling the plurality of electronic devices according to the quick indexing codes of the plurality of electronic devices.

A system for controlling an electronic device, having a smart identification function, including:

an electronic device;

a master device which communicates with the electronic device and is configured to transmit an access signal containing control instruction information to the electronic device, and detect an action signal responded by the electronic device, and identify sequence information and/or position information of the electronic device according to the action signal.

Preferably, the system includes a plurality of electronic devices each having a corresponding unique identification code; and the access signal contains unique identification code information and control instruction information, and one of the electronic devices which corresponds to the unique identification code information is configured to output the action signal according to the control instruction information, and the master device is configured to identify the sequence information and/or position information of the one of electronic devices according to the action signal.

Preferably, the electronic device includes a signal processing circuit and an output element, the signal processing circuit is configured to receive and process the access signal from the master device, and drives the output element to output the corresponding action signal according to the access signal; and the output element is configured to output the detectable action signal; the master device includes a master processing circuit configured to output the access signal to the electronic device, and a testing device corresponding to the output element of the electronic device and configured to detect the detectable action signal outputted by the output element of the electronic device and to convert the action signal into an electrical signal to be transmitted back to the master processing circuit.

Preferably, the signal processing circuit includes an input unit, a logic operation unit and an output unit; and the access signal is outputted to the output element via the input unit, the logic operation unit and the output unit successively; the master processing circuit comprises an input unit, a logic operation unit connecting to the input unit and an output unit connecting to the logic operation unit, the output unit is configured to transmit the access signal to the electronic device, and the input unit is configured to receive the electrical signal transmitted back by the testing device.

Preferably, the signal processing circuit further includes a storage unit connecting to the logic operation unit, an oscillation unit configured to provide a clock oscillation frequency which is required for the operation of the electronic device, and a reset unit configured to control the reset and restart of the electronic device; the master processing circuit further includes a storage unit connecting to the logic operation unit, an oscillation unit configured to provide a clock oscillation frequency which is required for the operation of the master device, and a reset unit configured to control the reset and restart of the master device.

Preferably, the output element is an output element for light wave, electromagnetic wave, sound wave/ultrasonic wave or mechanical vibration wave, and correspondingly, the testing device is a testing device for light wave, electromagnetic wave, sound wave/ultrasonic wave or mechanical vibration wave.

Preferably, the master device further includes a wireless radiofrequency transmitting unit or an infrared transmitting unit, and the access signal outputted by the master device is transmitted to the electronic device by the wireless radiofrequency transmitting unit or the infrared transmitting unit; the electronic device further includes a wireless radiofrequency receiving unit or an infrared receiving unit, and the electronic device receives the access signal by the wireless radiofrequency receiving unit or the infrared receiving unit.

Preferably, the output element is a LED, and correspondingly, the testing device is a camera configured to acquire the action signal outputted by the LED.

Preferably, the master device further includes a driving circuit, by which the output unit transmits the access signal to the electronic device; and the electronic device further includes a power-supply interface and a rectifying unit, and the access signal is inputted into the signal processing circuit after being transmitted through the rectifying unit via the power-supply interface.

Preferably, the plurality of electronic devices are connected successively in series or in parallel, and correspondingly, the master device includes a plurality of testing devices each configured to detect the action signal outputted by the output element of each electronic device, and an output of each of the plurality of testing devices is connected to an input of the master processing circuit.

Preferably, the plurality of electronic devices are connected successively in series, and a zener diode is parallel connected in reverse between a positive electrode and a negative electrode of an output of the rectifying unit or at the power-supply interface of the electronic device.

Preferably, the electronic devices may be LED lights, LDO, LVD, charging management IC, wireless radio frequency module, voice IC, MCU, memory, sensor, servo, servo motor and other chips and devices with fewer pins; and the electronic devices may also be LED light bulb, LED light bead, LED light string, LED light strip, LED light belt, copper-wire LED light, copper-string LED light, LED net light, LED curtain light, LED stars light, LED light tube, LED scoreboard, LED indicator board, LED advertising board, LED display screen, LED monitor and other LED light products used for decoration, illumination, emergency, caution, instruction, command, displaying information and etc. The electronic devices may also be remote control, game console, game controller, digital pen, graphics tablet, mouse, light gun, light saber, flashing stick, cheering stick, baton, flashlight, massager, wireless walkie-talkie and other hand-held electronic devices; and the electronic devices may also be watches, bracelets, gloves, necklaces, chokers, glasses, helmets, badges, armbands, belts, waistcoat, vests, backpacks, headphones, shoes with LCD/LED and other wearable electronic devices; and the electronic devices may also be mobile phone, tablet device, dancing machine, game console, music doorbell, navigator, ordering machine, interphone, building intercom, door lock, smart lock, passive infrared sensor for human body (PIR), door & window sensor, temperature and humidity sensor, smoke alarm, alarm, wireless switch, security device, monitor, video camera, telecommunications switch, wireless router, electronic building blocks, electronic toy, electronic education equipment, electronic instrument, stereo, stage lights, landscape lights, decorative lights, TV wall, traffic sign, massage chair, robot, animal and plant detector, 3D motion monitors, scheduling system of public transportation facilities, scheduling system for taxi, scheduling system for logistics, car-park management, aerial camera, unmanned aerial vehicle, drones group, shared bicycle, shared car, music fountain, Internet of Things and other systematic devices.

Obviously, the electronic devices are not limited to the aforementioned, and further includes semi-finished products of PACKAGE(SMD)/PCBA/COB modules and other electronic products which are not listed here one by one.

Preferably, the electronic device is a LED light bead, and the LED light bead includes a housing and a power-supply interface which extends to exterior of the housing, and the power-supply interface includes a negative electrode pin and a positive electrode pin, and the housing is internally provided with a negative electrode support and a positive electrode support, and the negative electrode support is provided with the signal processing circuit, and the positive electrode support is provided with the LED serving as output element.

The benefits of the present disclosure are as follows.

The present disclosure reasonably adopts the matching configuration of the master device and the electronic devices in combination with a method for identification of smart electronic devices, effectively overcoming the technical problem that for an electronic system which is provided with a plurality of electronic devices, errors and inconvenient operations during the mass processing, manufacturing, installation, testing and use of electronic devices may easily occur; the present disclosure greatly increases the efficiency of production, installation and testing, easily realizing an independent/group control function for electronic devices and demonstrating superb economic and social benefits.

Besides, quick indexing of the electronic devices by the master device is realized in the present disclosure with a quick indexing algorithm, therefore significantly reducing the time of the master device indexing and accessing the electronic devices, and improving the control efficiency of the system.

The present disclosure can be widely used in various control systems for electronic products.

BRIEF DESCRIPTION OF THE DRAWINGS

Further descriptions for particular embodiments of the present disclosure are given below with reference to drawings, in which:

FIGS. 5a(1), 5a(2) and 5a(3) are schematic diagrams of an electronic device control system having a smart identification function according to the embodiment 2B of the present disclosure;

FIGS. 5b(1), 5b(2) and 5b(3) are schematic diagrams of the electronic device control system having a smart identification function with testing devices removed according to the embodiment 2B of the present disclosure;

FIGS. 8a(1), 8a(2) and 8a(3) are schematic diagrams of an electronic device control system having a smart identification function according to the embodiment 2C of the present disclosure;

FIGS. 8b(1), 8b(2) and 8b(3) are schematic diagrams of the electronic device control system having a smart identification function with testing devices removed according to the embodiment 2C of the present disclosure;

FIGS. 11a(1), 11a(2) and 11a(3) are schematic diagrams of an electronic device control system having a smart identification function according to the embodiment 2D of the present disclosure;

FIGS. 11b(1), 11b(2) and 11b(3) are schematic diagrams of the electronic device control system having a smart identification function with testing devices removed according to the embodiment 2D of the present disclosure;

FIGS. 14a(1), 14a(2) and 14a(3) are schematic diagrams of an electronic device control system having a smart identification function according to the embodiment 2E of the present disclosure;

FIGS. 14b(1), 14b(2) and 14b(3) are schematic diagrams of the electronic device control system having a smart identification function with testing devices removed according to the embodiment 2E of the present disclosure;

FIGS. 17a(1), 17a(2) and 17a(3) are schematic diagrams of an electronic device control system having a smart identification function according to the embodiment 2F of the present disclosure;

FIGS. 17b(1), 17b(2) and 17b(3) are schematic diagrams of the electronic device control system having a smart identification function with testing devices removed according to the embodiment 2F of the present disclosure;

FIGS. 19a(1), 19a(2) and 19a(3) are schematic diagrams of an electronic device control system having a smart identification function according to the embodiment 2G of the present disclosure;

FIGS. 19b(1), 19b(2) and 19b(3) are schematic diagrams of the electronic device control system having a smart identification function with testing devices removed according to the embodiment 2G of the present disclosure;

FIGS. 21a(1), 21a(2) and 21a(3) are schematic diagrams of an electronic device control system having a smart identification function according to the embodiment 2H of the present disclosure;

FIGS. 21b(1), 21b(2) and 21b(3) are schematic diagrams of the electronic device control system having a smart identification function with testing devices removed according to the embodiment 2H of the present disclosure;

DETAILED DESCRIPTION

It should be noted that the embodiments in the present application and the features in the embodiments may be combined with each other under the circumstances of causing no conflicts.

The basic idea of the disclosure is as follows.

1. A master device outputs an access signal to an electronic device;

2. The electronic device receives the access signal and outputs a corresponding action signal according to the access signal;

3. The master device detects the action signal which is outputted by the electronic device, and identifies sequence information and/or position information of the electronic device according to the action signal.

To facilitate understanding, in the embodiments listed in the present disclosure, the signal connection mode between the testing device and the master processing circuit is usually illustrated by parallel connection, a person skilled in the art can also easily change the parallel connection between the testing device and the master processing circuit into other types of connection (such as series connection, wireless RF/IR connection or the like). Equivalent variations of such kind should be included in the scope of claims in the present disclosure.

Multiple embodiments are described in details below to illustrate the implementing principle and process.

In the below embodiments, an installation step should be implemented at the early stage: setting the master device and the electronic devices properly (the electronic devices are connected to the master device by wired or wireless connection, the output element which is connected to the output unit of the electronic devices is located in the accessible range of a testing device, such that the testing device may detect the action signals of the output elements of the electronic devices).

Embodiment 1A

A method for controlling electronic devices, having a smart identification function, is applied to an electronic device control system having a master device and multiple electronic devices. The master device indexes and controls multiple electronic devices by direct indexing control.

Figures 1, 2:
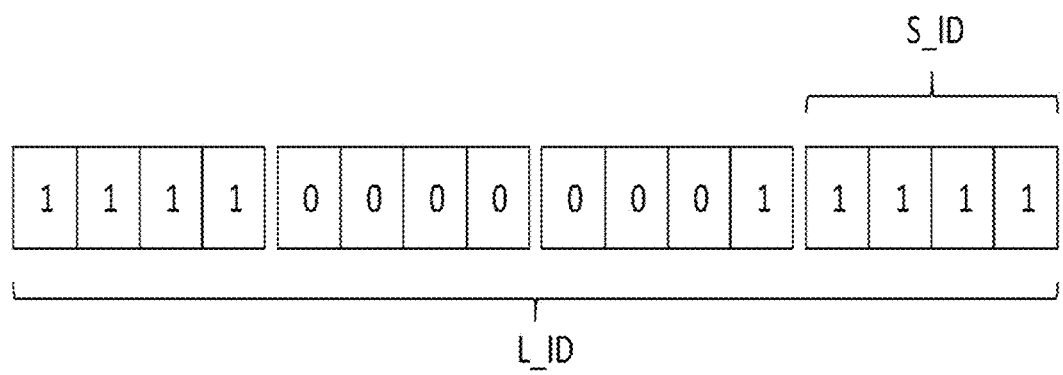
FIG. 1 is a coding example of the unique identification code L_ID according to the embodiment 1A of the present disclosure.
FIG. 2 is a diagram for comparison of the unique identification code L_ID to the quick indexing code S_ID according to the embodiment 1B of the present disclosure.

In the present embodiment, at least one unique identification code L_ID is written into the storage unit of each electronic device in advance, the unique identification code L_ID of each electronic device differs from the one of the other electronic devices. The unique identification code L_ID is a numerical value which is coded by Rolling-Code, Series-Code or Multi-Code or other coding means, and is written into the storage unit of each of the electronic devices in advance. For the unique identification code L_ID which is written in advance in the storage unit of each of the electronic devices, the numerical value of such code does not repeat within a certain mass production range. (For example, for the electronic device unique identification code L_ID within a certain mass production range, the numerical value ranges from 0h to FFFFh). An example of the unique identification code L_ID is shown in FIG. 1, the unique identification code L_ID consists of 16-bits binary values. FIG. 1 shows the unique identification codes ID_F001h and ID_F002h, which are respectively stored in the storage unit of two different electronic devices.

It should be noted that the testing device according to the present embodiment may be a testing device for light wave, electromagnetic wave, sound wave/ultrasonic wave or mechanical vibration wave and so on, and the master processing circuit defines a sequence or location coordinates of the testing device in advance. The storage unit of the master device may adopt a readable/writable storage device of Flash or MTP or EEPROM or OTP (EPROM) or SRAM or DRAM or Register or any combination of the aforementioned. The storage unit of the electronic device may adopt a readable/writable storage device of Flash or MTP or EEPROM or OTP (EPROM) or Mask-ROM or Laser-Fuse or Metal-Fuse or Poly-Fuse or SRAM or DRAM or Register or any combination of the aforementioned.

In the present embodiment, a process for smart identification of the electronic devices by the master device includes the following steps:

1A-1. Indexing a numerical value of an unique identification code L_ID for each of the electronic devices by a logic operation unit of the master device using a searching algorithm (for example, Dichotomous Search, or Incremental Algorithm, or Declining Algorithm);

1A-2. broadcasting, by an output unit of the master device, an access signal which includes unique identification code information and control instruction information to the electronic devices;

1A-3. After one of the electronic devices which corresponds to the unique identification code information receives the effective access signal, outputting a corresponding action signal (light wave, electromagnetic wave, sound wave/ultrasonic wave or mechanical vibration wave, or the like) by an output element which is driven by an output unit of the one of electronic devices according to the control instruction information; or transmitting, by one of the electronic devices which corresponds to the unique identification code information, the unique identification code information or operation results in a storage unit of the one of the electronic devices to an output unit of the one of the electronic devices to drive an output element to output a corresponding action signal according to the control instruction information;

1A-4. detecting, by a testing device, the action signal outputted by the one of the electronic devices, and converting the action signal into an electrical signal to be transmitted back to a master processing circuit for confirmation; and based on a sequence of a sensing element for the action signal detected by the testing device or a position coordinate of the action signal detected by the testing device, recording, by the master processing circuit of the master device, the sequence and/or coordinate of the corresponding electronic device, and including the sequence and/or coordinate into an electronic device information record table. The operation procedure from step 1A-1 to step 1A-4 is repeatedly executed until the searching algorithm in the logic operation unit of the master device is completed, obtaining an electronic device information record table which includes sequence and/or coordinate information of multiple electronic devices. Further, the electronic device information record table includes the corresponding relations between the unique identification code information of the electronic devices and the sequence and/or coordinate information of the electronic devices;

1A-5. Storing the obtained electronic device information record table in the storage unit of the master device, to complete the process for smart identification of electronic devices by the master device.

The present embodiment further includes an operation process, and specifically including the following steps:

1A-6. Removing the testing device after the process for smart identification of electronic devices is completed, and transmitting, by the master processing circuit, control signals each including unique identification code information and control instruction information one by one to control actions of the electronic devices. For example, for N electronic devices, the master processing circuit transmits control signals (in a format of L_ID1+Data1, L_ID2+Data2, L_ID3+Data3 . . . L_IDN+DataN), and L_IDN represents the unique identification code information of the Nth electronic device, and DataN represents the control instruction information of the Nth electronic device.

1A-7. When an electronic device group which consists of multiple electronic devices needs to be assembled and matched with a new master device, the electronic device information record table needs to be copied into a storage unit of the new master device.

For example, the following three ways may be adopted to achieve the copying of the electronic device information record table into the storage unit of the new master device:

(1). Copy the electronic device information record table into the storage unit of a new master device through an I/O interface of a new master processing circuit.

(2). A circuit integrating an input unit and a power supply may be added to the new master processing circuit, so that the power-supply interface of the master processing circuit may serve as a signal input interface, and the new master processing circuit is set as an electronic device mode, and the electronic device information record table is written into the storage unit of the new master processing circuit (under the electronic device mode) by the original master device.

(3) The new master device is matched with multiple electronic devices, re-executing the process for smart identification of multiple electronic devices, so that the new master device may obtain the electronic device information record table about multiple electronic devices.

Embodiment 1B

A method for controlling electronic devices, having a smart identification function, is applied to an electronic device control system having a master device and multiple electronic devices. The master device indexes and controls the electronic devices by quick indexing control.

The difference between the present embodiment and embodiment 1A is: a control method of quick indexing is adopted to realize quick indexing and control of the electronic devices by the master device.

It should be noted that the quick indexing code S_ID according to the present embodiment may be configured as shorter than the unique identification code L_ID, and the numerical values of the quick indexing code S_ID may directly match with the position of the electronic devices, therefore significantly reducing the time of the master device indexing and accessing the electronic devices, and improving the control efficiency of the system. For example, the quick indexing code S_ID may be a sequential number of each electronic device recorded in the electronic device information record table or an assigned number of each electronic device in an electronic device group which consists of multiple electronic devices, and quick indexing codes S_ID of multiple electronic devices are written into an electronic device which may identify its location and its sequence or position relations with other electronic devices in the electronic device group with the quick indexing code S_ID. A comparison between the unique identification code L_ID and the quick indexing code S_ID is shown in FIG. 2. The unique identification code L_ID of the FIG. 2 consists of 16-bits binary values and the quick indexing code S_ID consists of 4-bits binary values, which facilitates quick indexing of the system.

In the present embodiment, steps 1B-1 to 1B-5 of the smart identification process that the master device conducts to the electronic devices are the same as steps 1A-1 to 1A-5 described in embodiment 1A and therefore, steps 1 B-1 to 1 B-5 are not described here.

The present embodiment further includes a process of quick indexing and control, and in particular, including the following steps:

1B-6. The testing device may be removed after the master device performs the smart identification process on the electronic devices. According to the electronic device information record table in the storage unit, a correlated signal which includes unique identification code information and corresponding quick indexing code information is transmitted by the master processing circuit to the electronic devices, and the quick indexing code is written into the storage unit of one of the electronic devices which corresponds to the unique identification code (Generally, an action as such would be performed when the power of the system is reset).

Subsequently, the master processing circuit is altered to index the quick indexing codes S_ID of the electronic devices, effectively improving the indexing and control efficiency of the electronic device system.

1B-7. Transmitting, by the master processing circuit, control signals which include quick indexing code information and control instruction information one by one to control the actions of electronic devices according to the quick indexing codes S_ID in the storage unit. For example, for N electronic devices, the master processing circuit transmits control signals (in a format of S_ID1+Data1, S_ID2+

Data2, S_ID3+Data3 ... S_IDN+DataN), S_IDN represents the quick indexing code information of the Nth electronic device, and DataN represents the control instruction information of the Nth electronic device.

Or,

Transmitting, by the master processing circuit, control signals which include the quick indexing code information, arithmetic information and control instruction information to the electronic devices, and logic operation on the received quick indexing code information is performed by the logic operation unit in each of the electronic devices according to the received arithmetic information; and one of the electronic devices which matches the logic operation result is responsible for executing the received control instruction information. When the master processing circuit subsequently transmits the control signals which only include control instruction information to the electronic devices, all the logic operations are performed by the logic operation units in the electronic devices based on the previous arithmetic information and logic operation results. The electronic device which matches the logic operation result is responsible for executing the received control instruction information, and the control of independent or group actions of a plurality of electronic devices is realized.

Specifically, after the master processing circuit transmits the control signals (in a format of S_ID1+arithmetic information+Data1, Data2, Data3, DataN) to the electronic devices, the electronic device which matches the quick indexing information S_ID1 executes control instruction Data1, and the electronic device performs logic operation on the quick indexing code information S_ID1 by the logic operation unit according to the arithmetic information (arithmetic information in the present embodiment may be an Incremental Algorithm, or a Declining Algorithm or other mathematics/logic operation). In this way, the previous quick indexing code information is converted into the quick indexing code information S_ID2 (logic operation result) of the next electronic device, and the electronic device which matches the quick indexing code information S_ID2 executes control instruction Data2. The rest can be done in the same manner, such that the control of multiple electronic devices performing independent or group actions may be realized, therefore effectively shortening the period of transmitting control signals and achieving the goal of the master device performing independent or group control on the electronic devices.

1B-8. When the electronic device group consists of multiple electronic devices needs to be matched and assembled with a new master device, the following four ways may be adopted to manage the identification or control of the new master device to the electronic device group:

(1). Copy the electronic device information record table into the storage unit of a new master device through an I/O interface of a new master processing circuit.

(2). A circuit integrating an input unit and a power supply may be added to the new master processing circuit, so that the power-supply interface of the master processing circuit may serve as a signal input interface, and the new master processing circuit is set as electronic device mode, and the electronic device information record table is written into the storage unit of the new master processing circuit (under the electronic device mode) by the original master device.

(3). The new master device is matched with multiple electronic devices, re-executing the process for smart identification of multiple electronic devices, so that the new master device may obtain the electronic device information record table about multiple electronic devices.

(4). If the corresponding quick indexing code S_ID has been written into a storage unit of the electronic device by the original master device according to the sequence and/or coordinate position of the products demands, when matching the electronic device group with a new master device, the new master device may directly access the quick indexing code S_ID of the electronic device group without copying the electronic device information record table into the storage unit of the new master device.

Embodiment 2A

An electronic device control system having a smart identification function, including a master device and a plurality of electronic devices, and the electronic devices are LED cheering sticks, the output elements are 3 LEDs, the testing device is a camera, the access signal outputted by the master device is transmitted to the electronic devices by wireless radio frequency transmission.

To facilitate illustration and understanding, an electronic device group which is made of 3 LED cheering sticks is taken as an example in the present embodiment to describe a detailed implementing process for smart identification on the electronic device group by the master device. In practical use, the application can be further applied to more electronic devices.

Figure 3A:
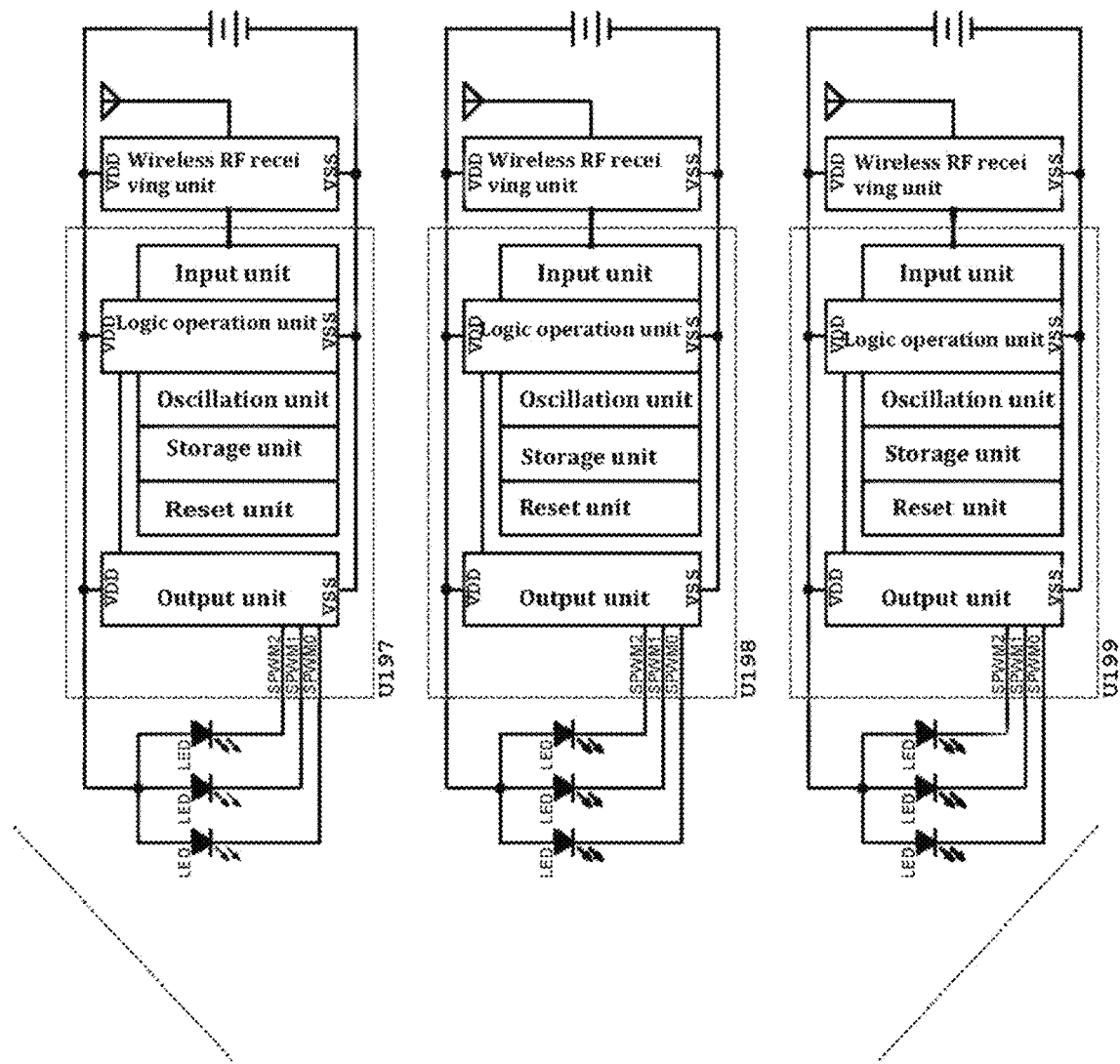
FIGS. 3a and 3b are schematic diagrams of an electronic device control system having a smart identification function according to the embodiment 2A of the present disclosure.
Figure 3B:
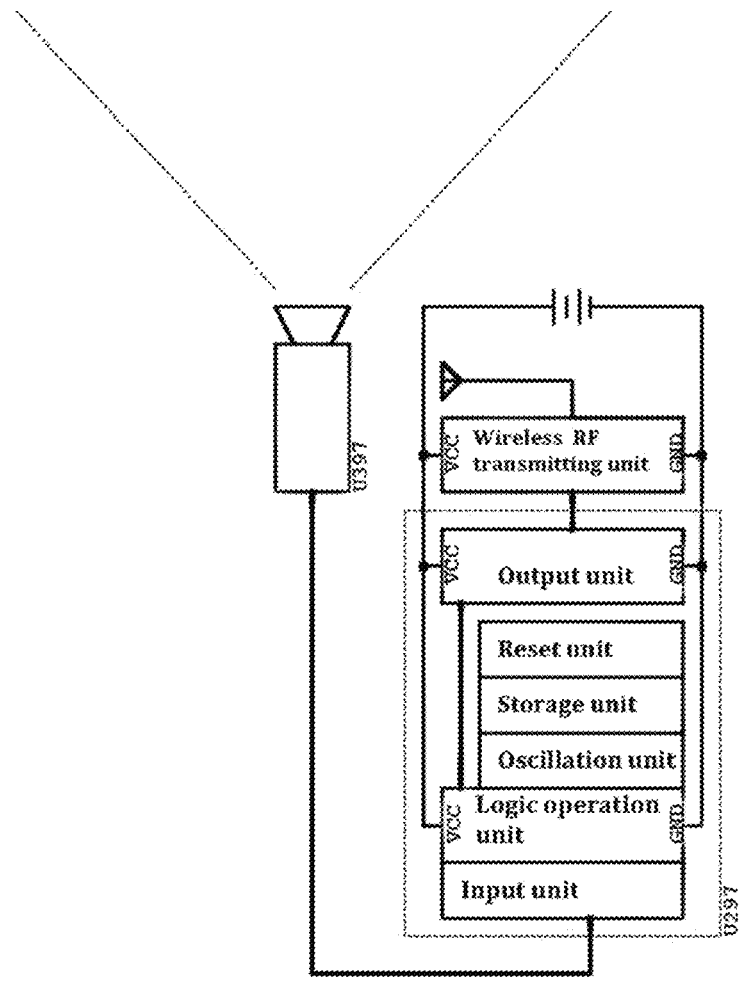

As shown in FIGS. 3a and 3b, the master device includes a master processing circuit U297 and a camera U397 serving as a testing device, each of the 3 electronic devices is a LED cheering stick and respectively includes a signal processing circuit U197, U198, U199.

Description of the components of the master device: the master device includes the master processing circuit U297, the camera U397, the wireless radio frequency transmitting unit and a power supply (battery).

The master processing circuit U297 includes an input unit, a logic operation unit, a storage unit, an oscillation unit, a reset unit and an output unit, and the input unit is connected to the logic operation unit, the logic operation unit is connected to the output unit, the access signal/control signal outputted by the output unit is transmitted to the electronic devices through the wireless radio frequency transmitting unit, and the input unit is used to receive the electrical signal which is transmitted back by the camera U397. An integrated IC chip (RISC/6502/51 single-chip microcomputer, ARM or FPGA and etc.) may be adopted to serve as the master processing circuit U297.

Description of the components of the LED cheering stick (electronic device): the LED cheering stick includes a signal processing circuit U197, U198, U199, a wireless radio frequency receiving unit, a power supply (battery) and 3 LEDs serving as the output elements.

In the LED cheering stick, the wireless radio frequency transmitting unit and the wireless radio frequency receiving unit may be replaced by other types of wireless transceiver units, such as an IR transceiver unit which is within the scope of the embodiment described here.

Each signal processing circuit U197, U198, 199 includes a logic operation unit, a storage unit, a reset unit, an output unit, an input unit, an oscillation unit (which is used to provide a clock oscillation frequency required for the operation of the electronic devices), and the output SPWM0, SPWM1, SPWM2 of the output unit drives the 3 LEDs to output the action signal. An integrated IC chip (RISC/6502/51 single-chip microcomputer, ARM or FPGA and etc.) may be adopted to serve as the signal processing circuit U197, U198, U199.

Installation settings for the system at early stage:

1. At least one unique identification code L_ID is written into the storage unit of each LED cheering stick (electronic device) in advance, the unique identification code L_ID of each LED cheering stick (electronic device) differs from that of other LED cheering sticks (electronic device).

2. Set the master device and the LED cheering stick properly: the output of the camera U397 is connected to the input of the master processing circuit U297, the LED which is connected to the output unit of the LED cheering stick is located within the accessible range of the camera, such that the camera may detect the action signal outputted by the LED.

The camera U397 is used to photograph the electronic device group, and then the photographic image is converted into an electrical signal and subsequently transmitted back to the master processing circuit to form a two-dimensional coordinate graph.

Figure 4A:
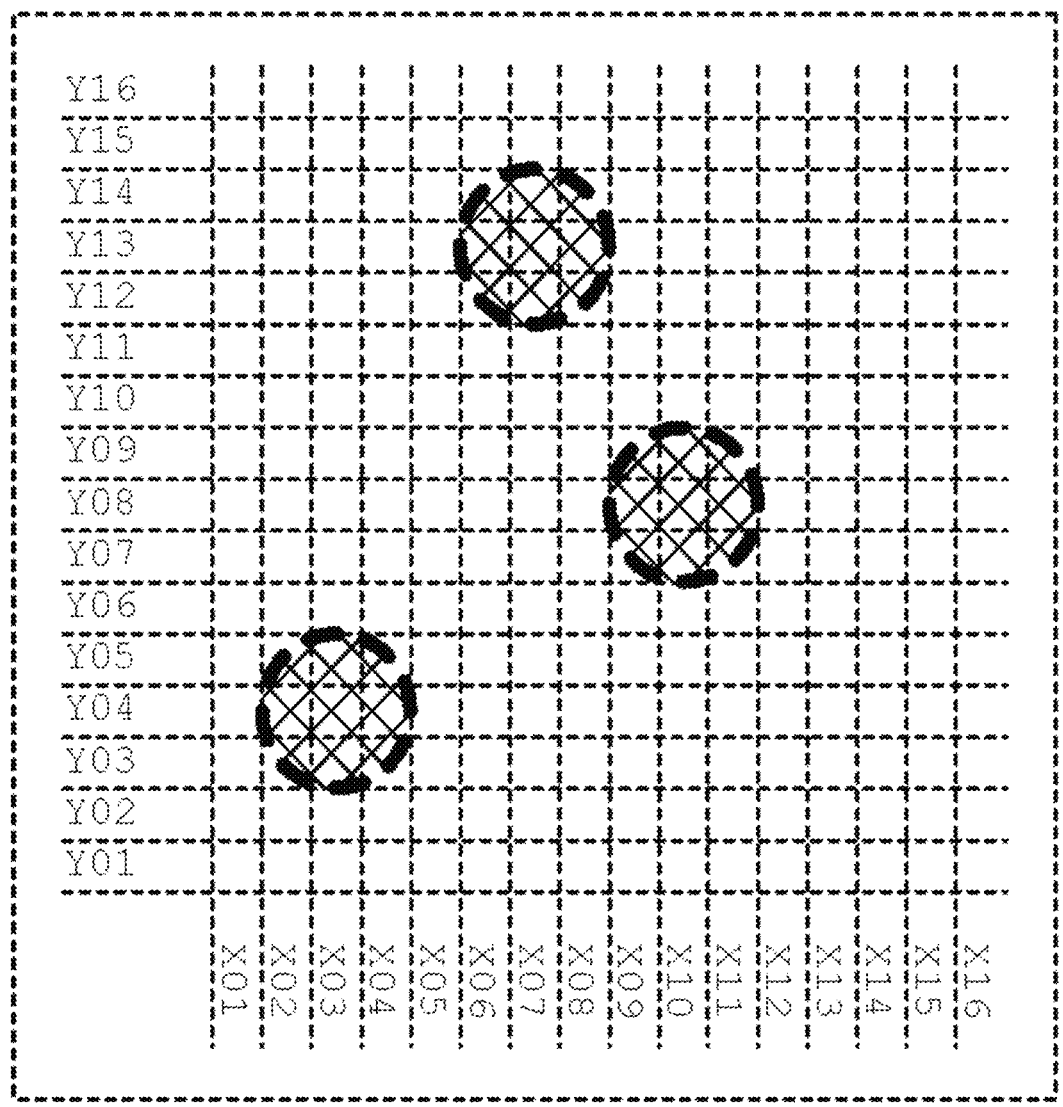
FIG. 4a, 4b, 4c, 4d respectively shows the 2-dimensional coordinate graphs which are respectively formed based on the images acquired by the camera at different times by the master processing circuit according to the embodiment 2A of the present disclosure.
Figure 4B:
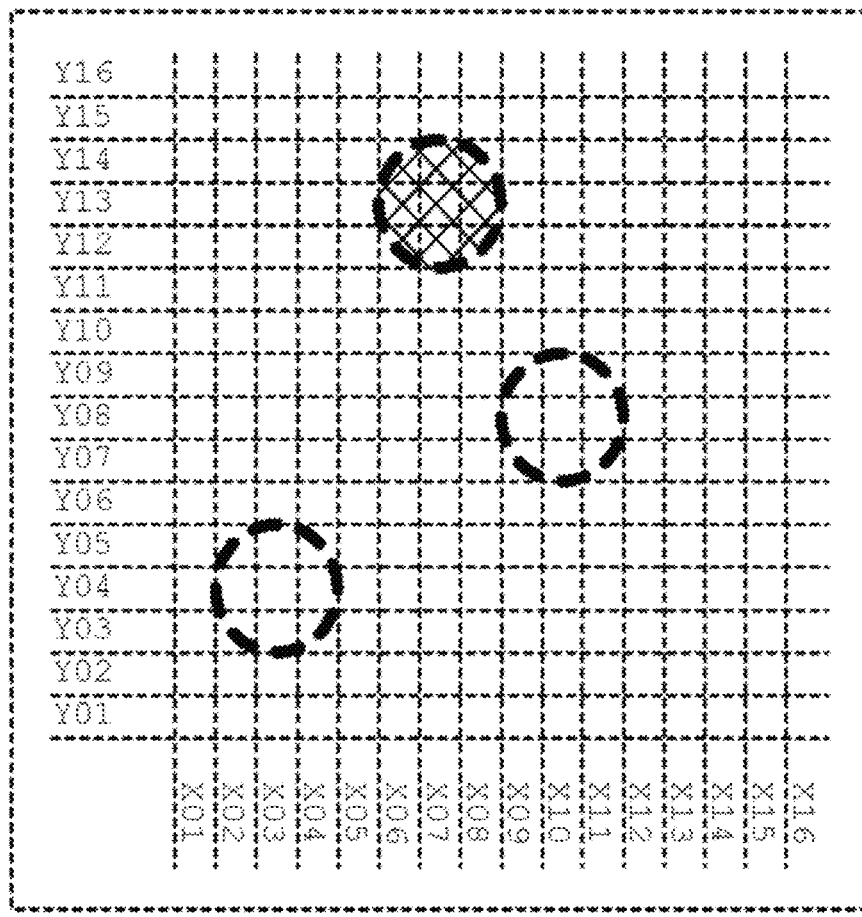
Figure 4C:
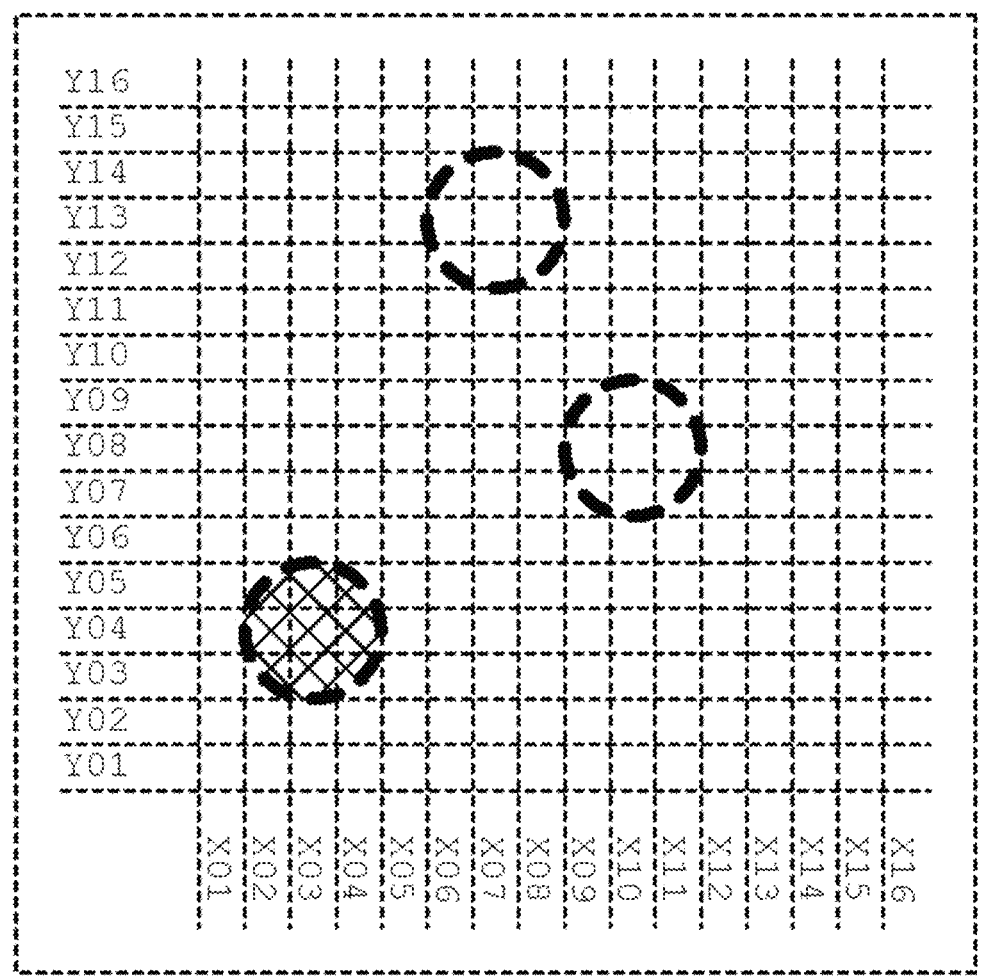
Figure 4D:
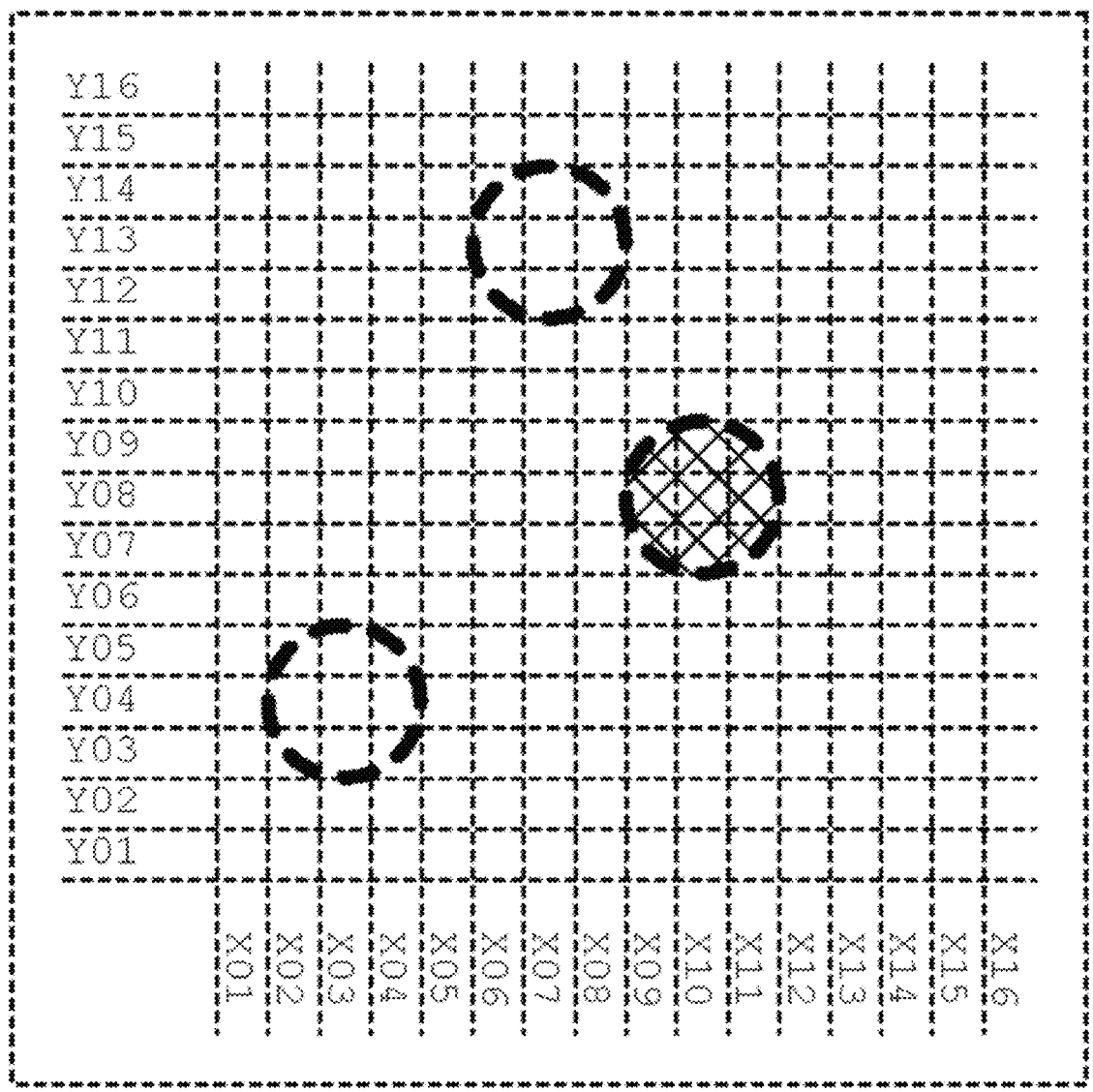
Figure 4E:
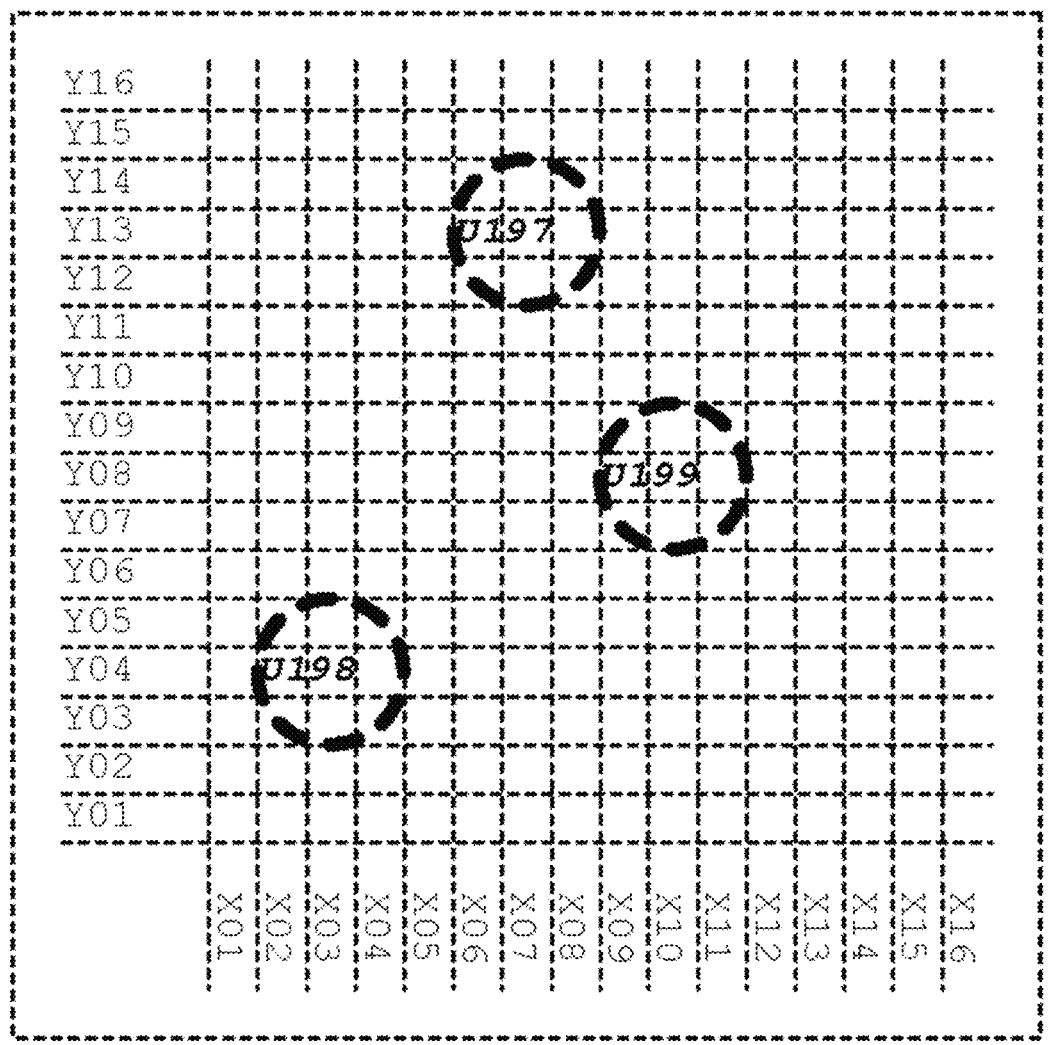
FIG. 4e is a schematic diagram showing the coordinates where 3 electronic devices are located, obtained by the master processing circuit according to the embodiment 2A of the present disclosure.

At first, the master processing circuit cannot identify the exact location of each electronic device, the two-dimensional coordinate graph which is formed by the master processing circuit based on the image acquired by the camera U397 is shown in FIG. 4*a*. Access signal may be transmitted by the master device to access the electronic device group, so that the 3 electronic devices may respectively output an action signal (which is outputted by the LED). Each of the 3 electronic devices respectively outputs a corresponding action signal according to the access signal, and the two-dimensional coordinate graphs shown in FIG. 4*b*, FIG. 4*c*, FIG. 4*d* are respectively formed by the master processing circuit based on the images acquired three times by the camera U397, so that the coordinates of the three electronic devices are acquired and shown in FIG. 4*e*.

The electronic device with signal processing circuit U197 is located at the two-dimensional coordinate (X07, Y13);

The electronic device with signal processing circuit U198 is located at the two-dimensional coordinate (X03, Y04);

The electronic device with signal processing circuit U199 is located at the two-dimensional coordinate (X10, Y08).

The acquired electronic device information record table is then stored in the storage unit of the master device, and the process for smart identification of the electronic device group is completed.

Subsequently, the master device may access the electronic device group according to the electronic device information record table, so as to manage the control of individual electronic device action or electronic device group action.

Besides, as supplement to the present embodiment, multiple cameras may be adopted as the testing device to photograph multiple electronic devices from multiple angles, and multiple sets of two-dimensional coordinates acquired by the multiple cameras may be combined to form a three-dimensional image so as to identify the position of each electronic device in a three-dimensional coordinate system.

In the prior art, the LED cheering stick (electronic device) must be placed at the correct position in a show venue, or the RFID technology is used to install a tag reader on the LED cheering stick (electronic device), and seats in the show venue are set with tags thereon. Every user is required to put the tag reader of the LED cheering stick (electronic device) close to the tag on the seat in the show venue to perform tag identification and locating after they are permitted into the show venue with the LED cheering stick (electronic device). The advantage of the present embodiment is: only an one-way wireless radio frequency transmitting/receiving unit or an one-way infrared transmitting/receiving unit is required between the master device and the LED cheering stick (electronic device), so that the cost of laying a RFID circuit may be saved, and cumbersome processes such as manual verification and seats matching are avoided, resulting in cost-saving and convenient operation.

Embodiment 2B

A system for controlling electronic devices, having a smart identification function, including a master device and a plurality of electronic devices, is described here. The output element is LED, the testing device is a testing device for light wave, and the access signal outputted by the master device is inputted into the signal processing circuit via the interface Data_In of the input unit of the electronic device, and the master device is connected to the three-wire parallel-connected LED light string which is made of multiple electronic devices.

A schematic diagram of the present embodiment is shown in FIGS. 5*a*(1), 5*a*(2) and 5*a*(3). The system according to the present embodiment can work with the method illustrated in embodiment 1A or 1B to perform the application of individual control or group control of the three-wire parallel-connected LED light string.

Description of components of the master device: the master device includes a master processing circuit U291 and multiple testing devices U391, U392, U393, U394, U395, and U396. The outputs of the testing devices are successively connected to the inputs MPI_0, MPI_1, MPI_2, MPI_3, MPI_4, MPI_5 of the input unit of the master device. Each testing device respectively includes a phototransistor Q902, Q904, Q906, Q908, Q910, Q912 which serves as a sensing element, and an external bias resistor R901, R903, R905, R907, R909, R911, and the external bias resistor is used to provide a working bias voltage for the corresponding phototransistor. For example, if a pull-up or pull-down resistor is provided within the input unit of the master device, the external bias resistor may be omitted.

The master processing circuit U291 includes an input unit, a logic operation unit, a storage unit, an oscillation unit, a reset unit and an output unit; and the input unit is connected to the logic operation unit, the logic operation unit is connected to the output unit; and the output unit is used to output the access signal to the electronic devices, and the input unit is used to receive the electrical signal transmitted back from the testing device U391, U392, U393, U394, U395, U396. An integrated IC chip (RISC/6502/51 single-chip microcomputer, ARM or FPGA and etc.) may be adopted to serve as the master processing circuit U291.

The phototransistor is provided corresponding to the LED of the electronic device, each phototransistor Q902, Q904, Q906, Q908, Q910, Q912 is used to detect the detectable light wave signal outputted by the LED of the electronic device and converts the light wave signal into an electrical signal which is then transmitted back to the input MPI_0, MPI_1, MPI_2, MPI_3, MPI_4, MPI_5 of the input unit of the master processing circuit U291.

The power supply unit of the master device includes a power supply (battery) BAT590, a power supply terminal VCC and a filtering capacitor C501. The input MPI_7 of the input unit of the master processing circuit U291 is used to receive an external control instruction External_Control.

Description of the components of the electronic device: the electronic device includes the signal processing circuits U191, U192, U193, U194, U195, U196 and LEDs serving as output elements.

Each signal processing circuit U191, U192, U193, U194, U195, U196 includes a logic operation unit, a storage unit, a reset unit, an output unit, an input unit, and an oscillation unit (which is used to provide a clock oscillation frequency required for the operation of the electronic device); an integrated IC chip (RISC/6502/51 single-chip microcomputer, ARM or FPGA and etc.) may be adopted to serve as the signal processing circuit of the electronic device. The output unit of the signal processing circuit U191, U192, U193 uses the Sink Method to drive the LED and the output unit of the signal processing circuit U194, U195, U196 uses the Drive Method to drive the LED. In practical use, the Sink/Drive or the mix of both ways may be applied to drive the LED.

To facilitate description and understanding, 6 electronic devices are taken as an example for description in the present embodiment, and such application can be applied to more electronic devices and testing devices according to the three-wire parallel connection as described in the present embodiment.

With the electronic device group, the master device and the testing device all set properly, the master device may acquire an electronic device information record table from the inputs MPI_0, MPI_1, MPI_2, MPI_3, MPI_4, MPI_5 of the input unit according to the method described in embodiment 1A or 1B.

With testing devices U391, U392, U393, U394, U395 and U396 removed, a schematic diagram of the system described in the present embodiment is shown in FIGS. 5b(1), 5b(2) and 5b(3).

Figure 6A:
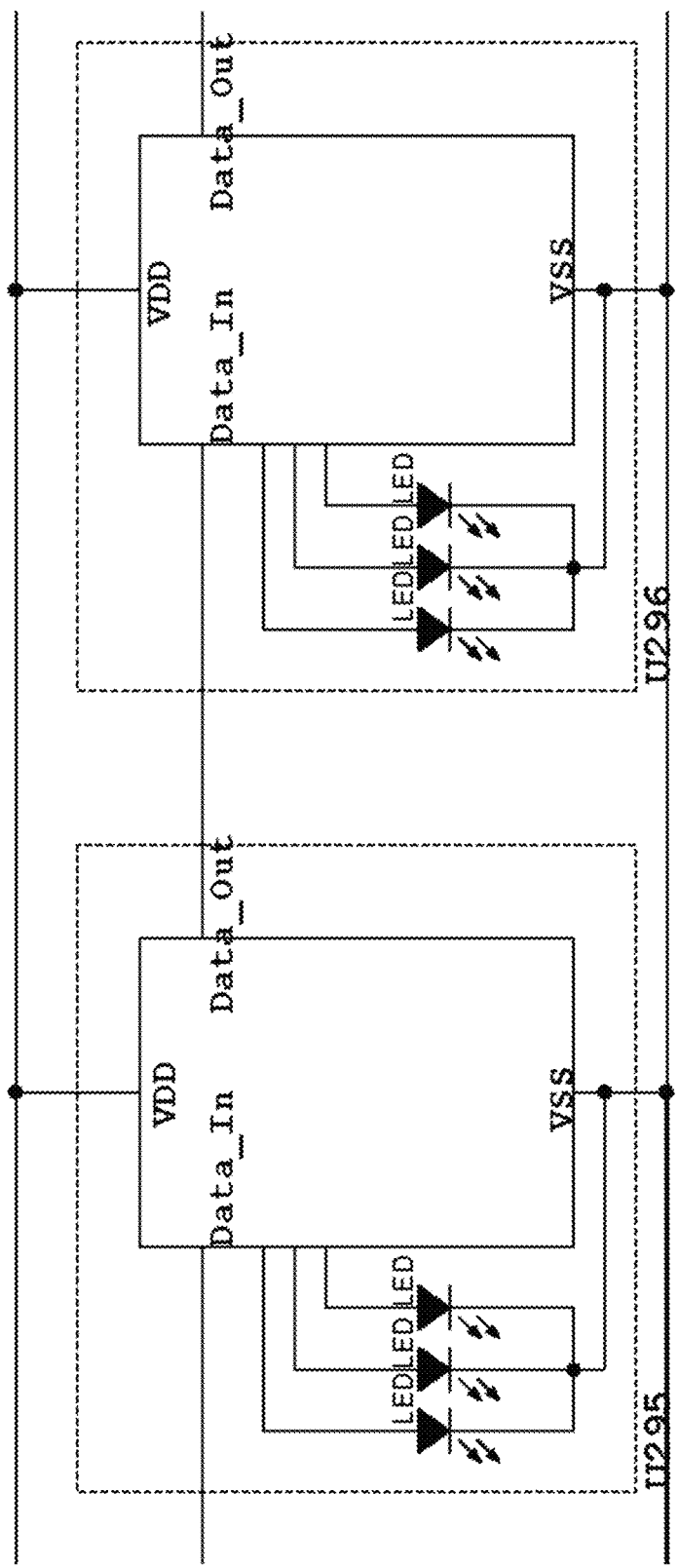
FIGS. 6a and 6b are schematic diagrams of wire connection of a traditional three-wire LED light string according to the embodiment 2B of the present disclosure.
Figure 6B:
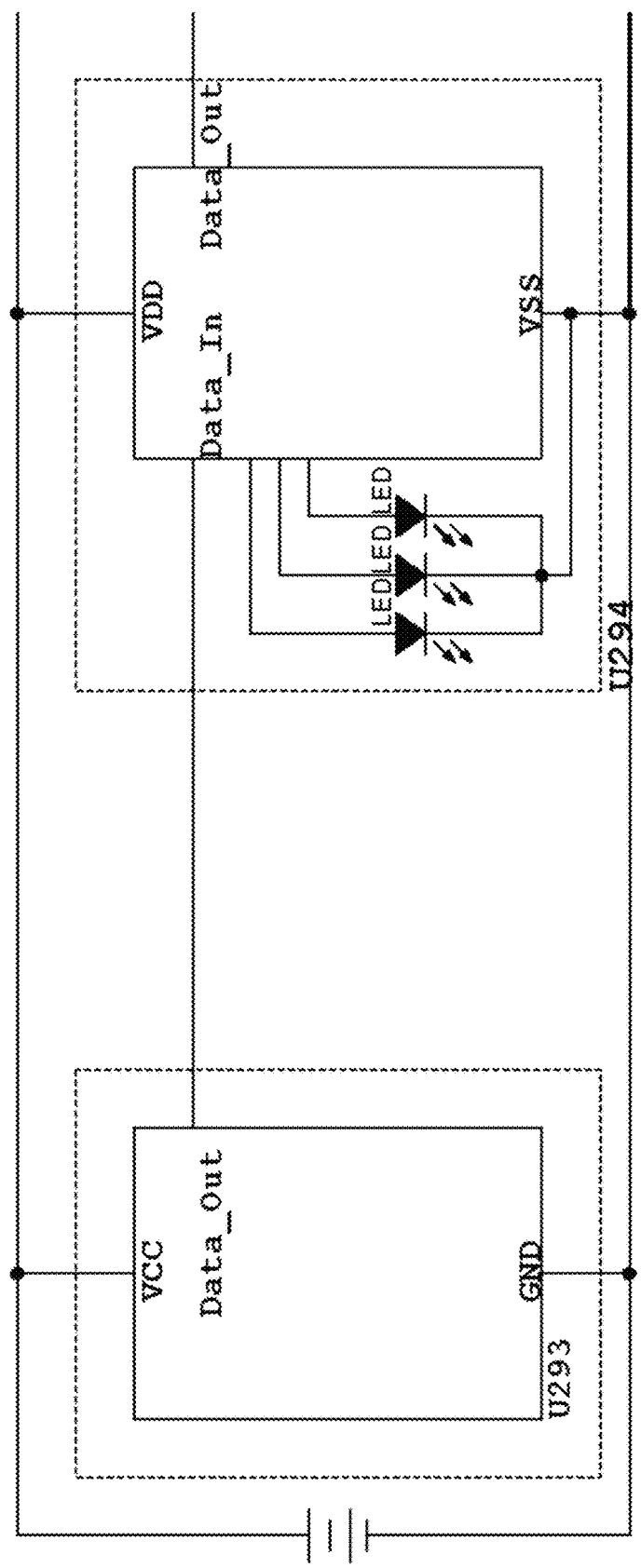
Figure 7A:
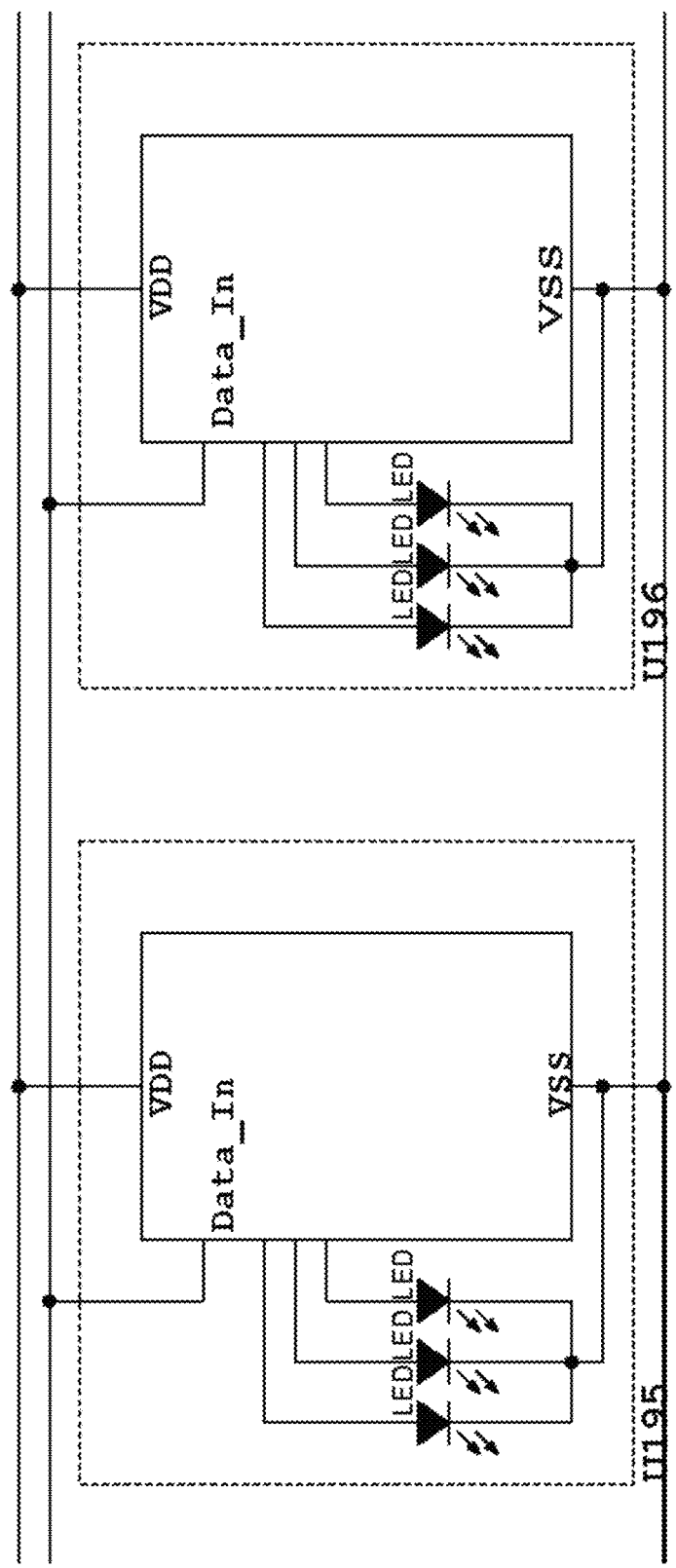
FIGS. 7a and 7b are schematic diagrams of wire connection of a parallel three-wire LED light string according to the embodiment 2B of the present disclosure.
Figure 7B:
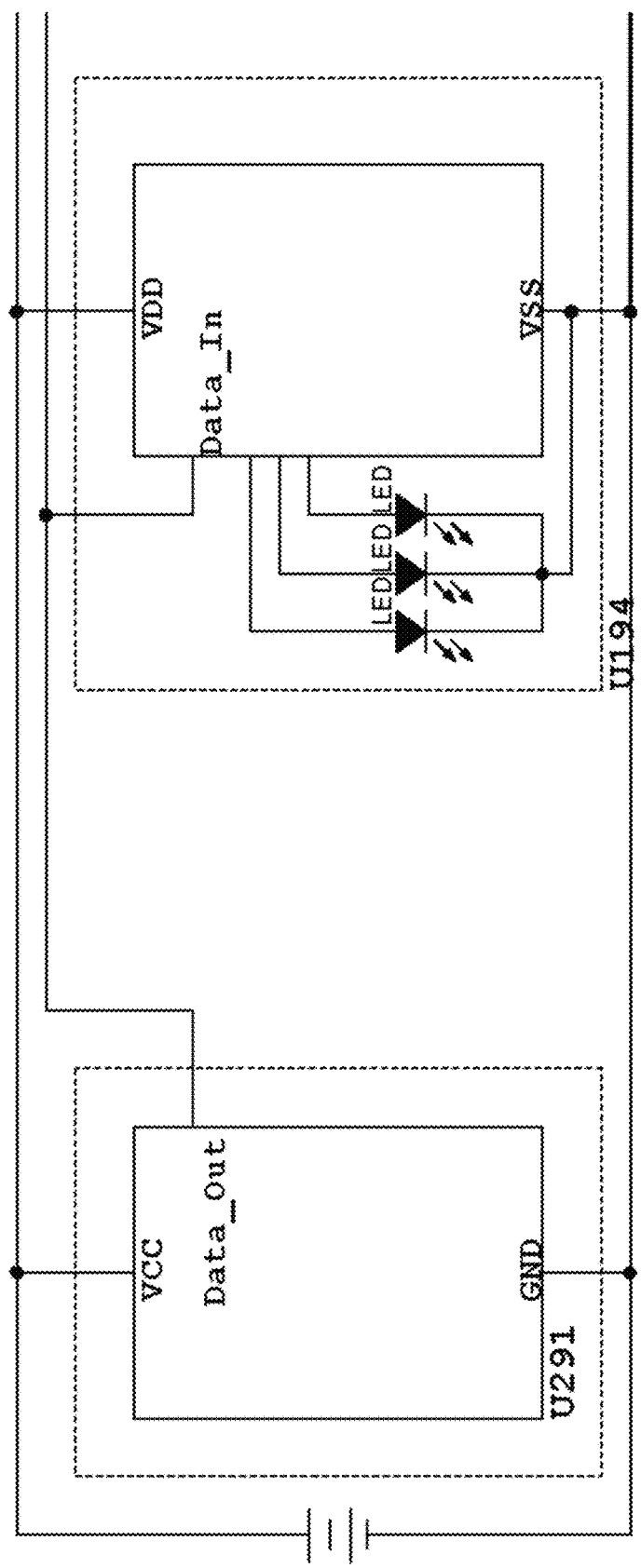

In comparison with the traditional three-wire LED light string (a schematic diagram of the traditional three-wire LED light string is shown in FIGS. 6a and 6b, the LED light string includes a master device U293 and electronic devices U294, U295 and U296, and each data interface (Data_In/Data_Out) of different electronic devices is connected in series by data cables), the three-wire parallel-connected LED light string (a schematic diagram of wire connection of the three-wire parallel-connected LED light string is shown in FIGS. 7a and 7b, and the LED light string includes a master device U291 and electronic devices U194, U195 and U196, and the data interfaces Data_In of the electronic devices are connected in parallel by data cables) in the present embodiment presents advantages as follows:

1. High efficiency of data transmission of the master device accessing electronic device group is presented, and the master device may broadcast to the electronic device group, and the electronic device group may form section-numbering or group-numbering (numbering according to certain sections/groups), perform logic operation and arithmetic operation on the received access signal. The master device accesses the numbered sections or numbered groups of the electronic devices.

2. The data interfaces Data_In/Data_Out of the traditional three-wire LED light string are connected in series, and even if accessing only an electronic device located at the end of the series line, it would require transmission of complete access signals to all the electronic devices connected in series. Assuming a traditional three-wire LED light string which consists of 100 electronic devices, access to the electronic device located at the end of the series line would only be completed after 100 sets of access signals are transmitted successively by the master device. However, adopting the three-wire parallel-connected LED light string of the present embodiment could make the master device directly access the electronic device which is located at the end of the series line with one set of access signal.

3. The data interfaces Data_In/Data_Out of the traditional three-wire LED light string are connected in series, and if the electronic device at any node fails to receive/transmit data signal, the electronic devices subsequent to such node would also fail to receive data signal. When adopting the three-wire parallel-connected LED light string of the present embodiment, operation of other electronic devices would be less likely to be affected by the abnormality of a certain electronic device.

4. For the three-wire parallel-connected LED light string of the present embodiment, there are 3 pins/interfaces for each electronic device, and correspondingly, they are power-supply interface VDD/VSS and data interface Data_In. For the traditional three-wire LED light string, there are 4 pins/interfaces for each electronic device, and correspondingly, they are power-supply interface VDD/VSS and data interface Data_In/Data_Out. Assuming a traditional three-wire LED light string consisting of 100 electronic devices, when adopting the solution of the traditional three-wire LED light string, there would be 400 pins and 399 connection nodes in the electronic devices on the LED light string (the data output interface Data_Out of the electronic device located at the end is not required to be connected); and if the solution of the three-wire parallel-connected LED light string according to the present embodiment is adopted, the total quantity of pins/interfaces and connection nodes in the electronic devices on the LED light string would both be decreased to 300. Therefore, a smaller quantity of the pins/interfaces according to the present embodiment may lead to a significantly reduced cost of manufacture and processing.

Embodiment 2C

A system for controlling electronic devices, having a smart identification function, including a master device and a plurality of electronic devices, is described here. The output element is LED, the testing device is a testing device for light wave, and the access signal outputted by the master device is inputted into the signal processing circuit after being transmitted through the rectifying unit via the power-supply interface of the electronic device, and the rectifying unit includes a positive half-wave rectifying circuit, and the master device is connected to the two-wire series-connected LED light string which consists of multiple electronic devices.

A schematic diagram of the present embodiment is shown in FIGS. 8a(1), 8a(2) and 8a(3). The master device accesses the electronic device group which is in series connection with the AC signal. The electronic devices use the Sink to drive LED. The system according to the present embodiment can work with the method illustrated in embodiment 1A or 1B to perform the application of individual control or group control of the two-wire series-connected LED light string.

In the present embodiment, the master device includes a master processing circuit U261 and testing devices U361, U362, U363, U364, U365 and U366, the output of each testing device is successively connected to the input MPI_0, MPI_1, MPI_2, MPI_3, MPI_4, MPI_5 of the input unit of the master device. Each testing device respectively includes a phototransistor Q902, Q904, Q906, Q908, Q910, Q912 serving as a sensing element and an external bias resistor R901, R903, R905, R907, R909, R911, and the external bias resistor is used to provide the working bias voltage for the corresponding phototransistor. If a pull-up or pull-down resistor is provided within the input unit of the master device, the external bias resistor may be omitted.

The six electronic devices respectively include a signal processing circuit U161, U162, U163, U164, U165, U166. Further, electronic devices respectively including signal processing circuits U161, U162, U163 form a series loop with a current limiting resistor R520a; and electronic devices respectively including signal processing circuits U164, U165, U166 form a series loop with a current limiting resistor R520b. More electronic devices can be applied to such application, in which the electronic devices are connected in series then in parallel.

With the electronic device group, the master device and the testing devices all set properly, the master device may acquire an electronic device information record table from the input MPI_0, MPI_1, MPI_2, MPI_3, MPI_4, MPI_5 of the input unit according to the method described in embodiment 1A or 1B.

With testing devices U361, U362, U363, U364, U365, U366 removed, a schematic diagram of the system according to the present embodiment is shown in FIGS. 8b(1), 8b(2) and 8b(3).

The main differences between the present embodiment and embodiment 2B are shown as follows.

1. Two-wire output driving circuit.

Two-wire output driving circuit includes the driving circuit U501 and the driving circuit U502.

The driving circuit U501 is used to enhance the output driving capacity of the output unit of the master device and includes triodes Q515, Q505, Q506 and resistors R517, R509, R510, R511. The input of the driving circuit U501 is connected to the outputs MPOUT3, MPOUT2 of the output unit of the master device, and the output of the driving circuit U501 is connected to the positive input VP1/VP4 of the power supply of the electronic device which is located at the beginning of the series electronic device line.

The driving circuit U502 is used to enhance the output driving capacity of the output unit of the master device and includes triodes Q516, Q507, Q508 and resistors R518, R512, R513, R514, R519. The input of the driving circuit U502 is connected to the outputs MPOUT1, MPOUT0 of the output unit of the master device, and the output of the driving circuit U502 is connected to the negative input VN3/VN6 of the power supply of the electronic device which is located at the end of the series electronic devices line.

2. The signal processing circuit of each of the electronic devices is provided with a rectifying unit.

Figure 9:
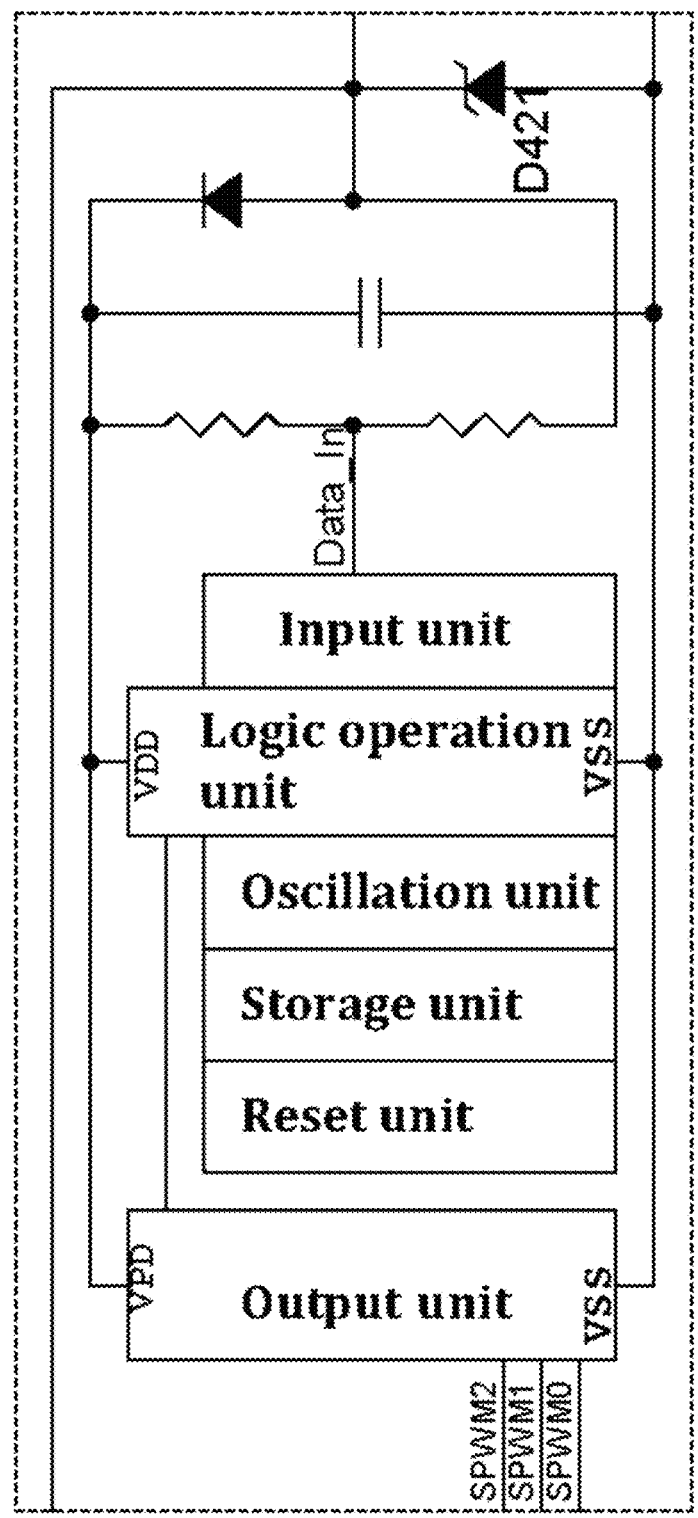
FIG. 9 is a schematic diagram of a signal processing circuit according to the embodiment 2C of the present disclosure.

The signal processing circuit of each electronic device includes a rectifying unit, the rectifying unit in the present embodiment adopts a positive half-wave rectifying circuit which is shown in FIG. 9. The rectifying unit is connected between the power-supply interface and the input unit of the electronic device. The signal input pin and the power supply input pin may be incorporated by the rectifying unit so as to save the pin/interface resources of the electronic devices. Besides, a zener diode D421 needs to be parallel connected in reverse at the power-supply interface of each electronic device to perform voltage stabilizing function if an electronic device is applied to the series connection according to the present embodiment.

Figure 10A:
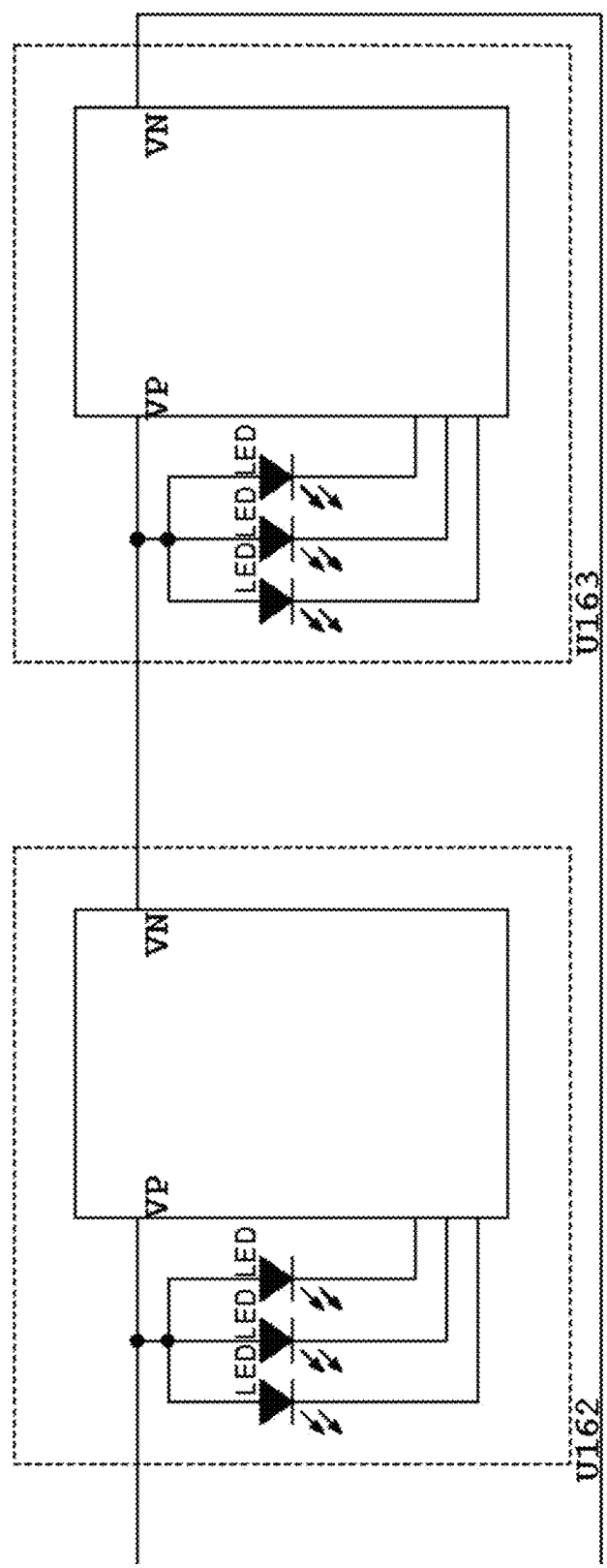
FIGS. 10a and 10b are schematic diagrams of wire connection according to the embodiment 2C of the present disclosure, with testing devices removed.
Figure 10B:
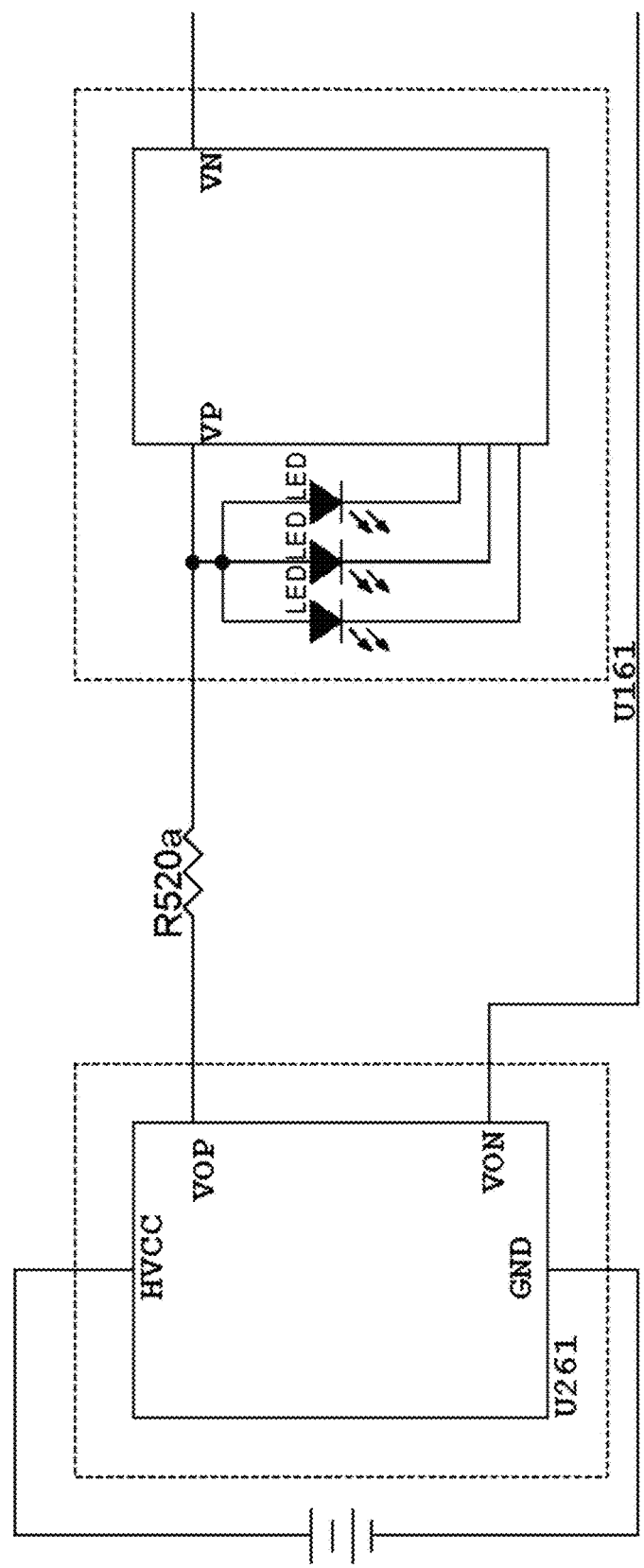

With testing devices removed, a schematic diagram of the wire connection of the positive half-wave rectifying two-wire series-connected LED light string of the present embodiment is shown in FIG. 10.

Embodiment 2D

A system for controlling electronic devices, having a smart identification function, including a master device and a plurality of electronic devices, is described here. The output element is LED, the testing device is a testing device for light wave, and the access signal outputted by the master device is inputted into the signal processing circuit after being transmitted through the rectifying unit via the power-supply interface of the electronic device, and the rectifying unit includes a full wave rectifying circuit, and the master device is connected to the two-wire series-connected LED light string which consists of multiple electronic devices.

A schematic diagram of the present embodiment is shown in FIGS. 11a(1), 11a(2) and 11a(3). The master device accesses the electronic device group which is in series connection using an AC signal. The electronic devices use the Drive Method to drive LEDs. The system according to the present embodiment can work with the method illustrated in embodiment 1A or 1B to perform the application of individual control or group control of the two-wire series-connected LED light string.

In the present embodiment, the master device includes a master processing circuit U281 and testing devices U381, U382, U383, U384, U385, and U386. The outputs of the testing devices are successively connected to the inputs MPI_0, MPI_1, MPI_2, MPI_3, MPI_4, MPI_5 of the input unit of the master device. Each testing device respectively includes a phototransistor Q902, Q904, Q906, Q908, Q910, Q912 which serves as a sensing element, and an external bias resistor R901, R903, R905, R907, R909, R911, and the external bias resistor is used to provide a working bias voltage for the corresponding phototransistor. If a pull-up or pull-down resistor is provided within the input unit of the master device, the external bias resistor may be omitted.

Figure 12:
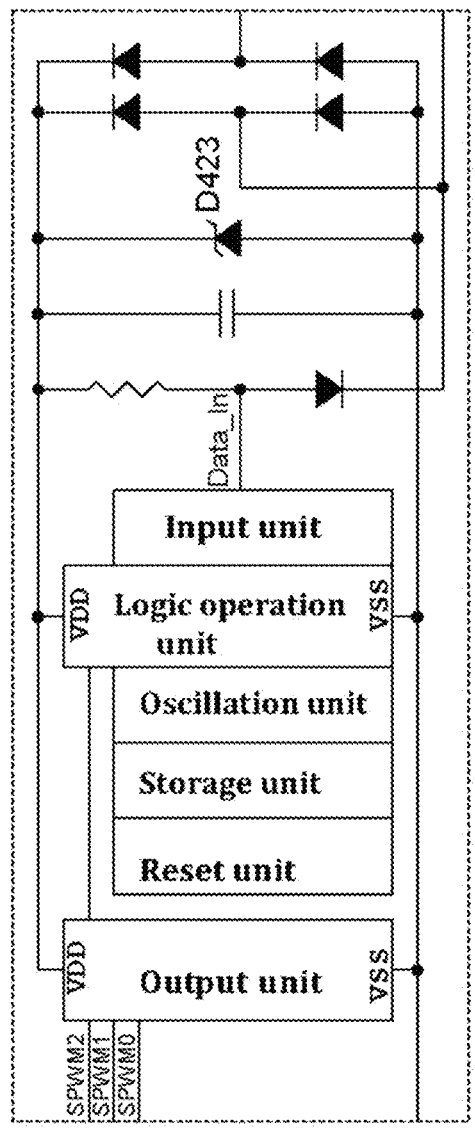
FIG. 12 is a schematic diagram of a signal processing circuit according to the embodiment 2D of the present disclosure.

The six electronic devices respectively include signal processing circuit U181, U182, U183, U184, U185, U186. Further, electronic devices respectively including signal processing circuits U181, U182, U183 form a series circuit with a current limiting resistor R520a; and electronic devices respectively including signal processing circuits U184, U185, U186 form a series circuit with a current limiting resistor R520b. More electronic devices can be applied to such application, in which the electronic devices are connected in series then in parallel. As shown in FIG. 12, a zener diode D423 needs to be parallel connected in reverse at the output of the rectifying unit of each electronic device to perform voltage stabilizing function if the electronic device is connected in series as described in the present embodiment.

With the electronic device group, the master device and the testing devices all set properly, the master device may acquire an electronic device information record table from the inputs MPI_0, MPI_1, MPI_2, MPI_3, MPI_4, MPI_5 of the input unit according to the method described in embodiment 1A or 1B.

The difference between the present embodiment and embodiment 2C mainly includes: the rectifying unit according to the present embodiment adopts the full-wave rectifying circuit with the matching access signal (For example, Manchester coded signal), and the electronic devices of the full-wave rectifying two-wire LED light string have an advantage that the pins of the power-supply interface may be either positive or negative, therefore providing convenience for assembly and manufacture.

With the testing devices U361, U362, U363, U364, U365 and U366 removed, a schematic diagram of the system according to the present embodiment is shown in FIGS. 11b(1), 11b(2) and 11b(3).

Figure 13A:
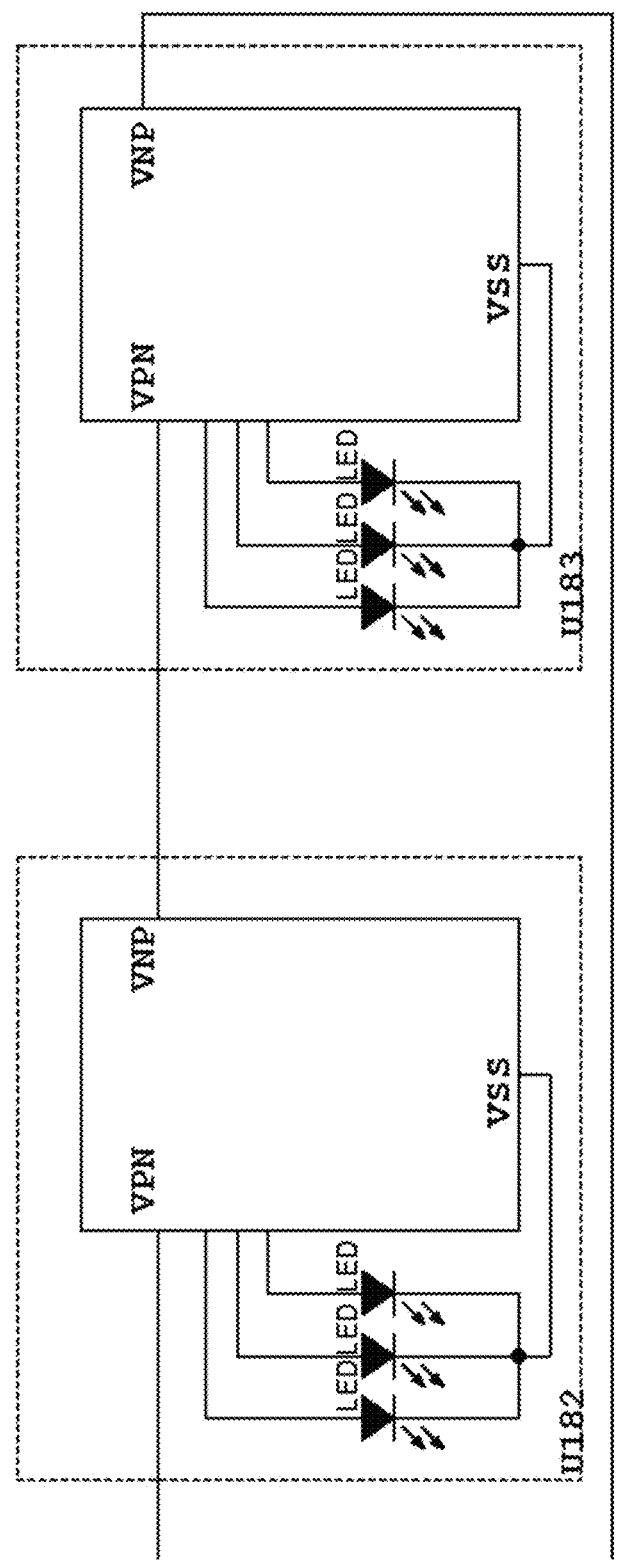
FIGS. 13a and 13b are schematic diagrams of wire connection according to embodiment 2D of the present disclosure, with testing devices removed.
Figure 13B:
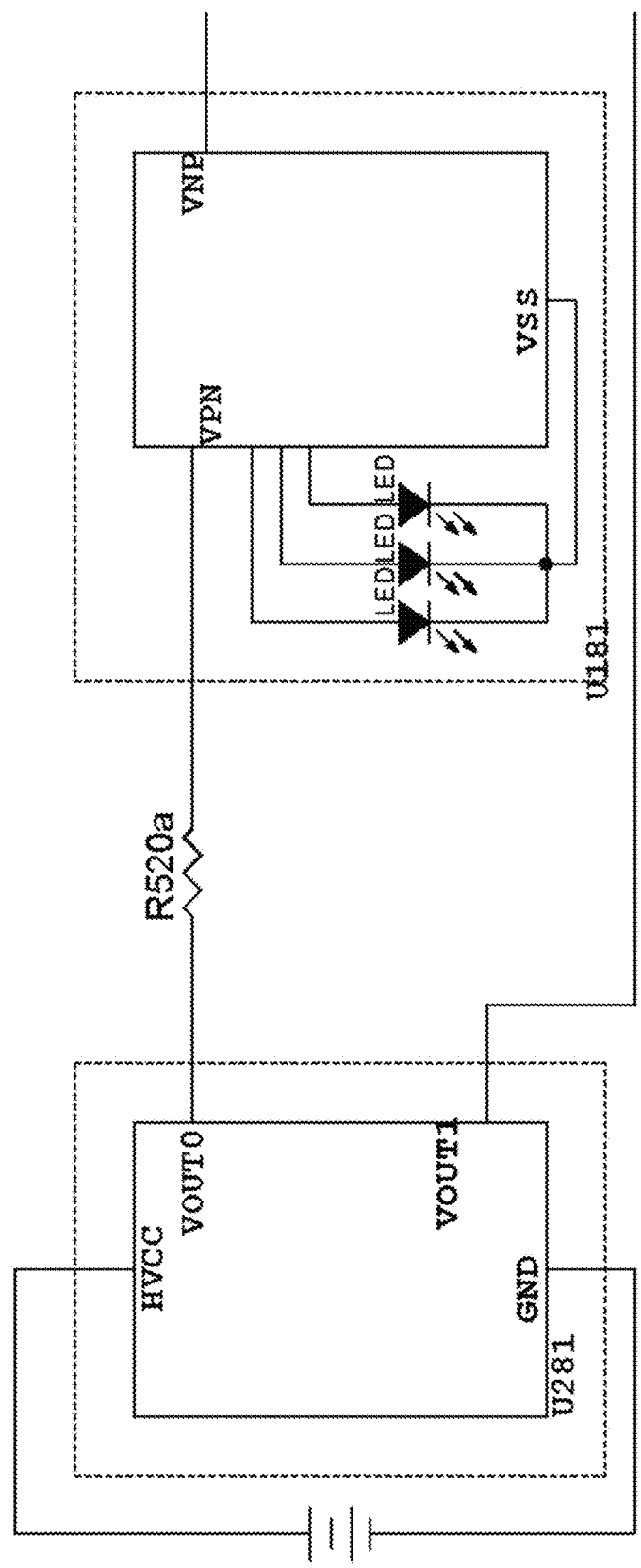

With the testing devices removed, a schematic diagram of the wire connection of the full-wave rectifying two-wire series-connected LED light string of the present embodiment is shown in FIGS. 13*a* and 13*b*.

Embodiment 2E

A system for controlling electronic devices, having a smart identification function, including a master device and a plurality of electronic devices, is described here. The output element is LED, the testing device is a testing device for light wave, and the access signal outputted by the master device is inputted into the signal processing circuit after being transmitted through the rectifying unit via the power-supply interface of the electronic device, and the rectifying unit includes a negative half-wave rectifying circuit, and the master device is connected to the two-wire series-connected LED light string which consists of multiple electronic devices.

A schematic diagram of the present embodiment is shown in FIGS. 14*a*(1), 14*a*(2) and 14*a*(3). The master device accesses the electronic device group which is in series connection using an AC signal. The electronic devices use the Drive Method to drive LEDs. The system according to the present embodiment can work with the method illustrated in embodiment 1A or 1B to perform the application of individual control or group control of the two-wire series-connected LED light string.

In the present embodiment, the master device includes a master processing circuit U271 and testing devices U371, U372, U373, U374, U375 and U376, the output of each testing device is successively connected to the input MPI_0, MPI_1, MPI_2, MPI_3, MPI_4, MPI_5 of the input unit of the master device. Each testing device respectively includes a phototransistor Q902, Q904, Q906, Q908, Q910, Q912 serving as a sensing element, and an external bias resistor R901, R903, R905, R907, R909, R911, and the external bias resistor is used to provide the working bias voltage for the corresponding phototransistor. If a pull-up or pull-down resistor is provided within the input unit of the master device, the external bias resistor may be omitted.

Figure 15:
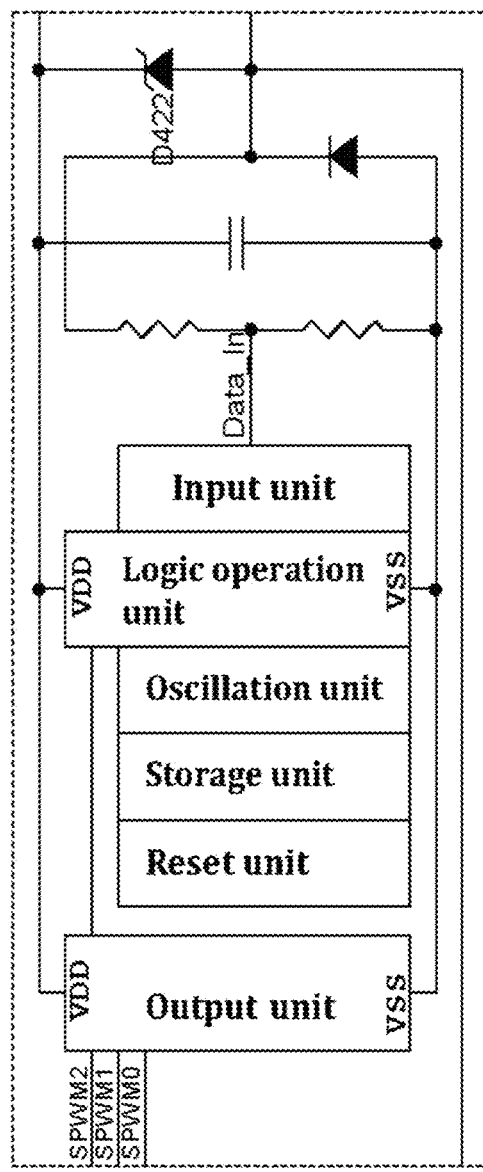
FIG. 15 is a schematic diagram of a signal processing circuit according to the embodiment 2E of the present disclosure.

The six electronic devices respectively include a signal processing circuit U171, U172, U173, U174, U175, U176. Further, electronic devices respectively including signal processing circuits U171, U172, U173 form a series circuit with a current limiting resistor R520*a*; and electronic devices respectively including signal processing circuits U174, U175, U176 form another series circuit with a current limiting resistor R520*b*. More electronic devices can be applied to such application, in which the electronic devices are connected in series then in parallel. As shown in FIG. 15, a zener diode D422 needs to be reversely connected in parallel at the power-supply interface of each electronic device to perform voltage stabilizing function if the electronic device is connected in series as described in the present embodiment.

With the electronic device group, the master device and the testing devices all set properly, the master device may acquire an electronic device information record table from the inputs MPI_0, MPI_1, MPI_2, MPI_3, MPI_4, MPI_5 of the input unit according to the method described in embodiment 1A or 1B.

The difference between the present embodiment and embodiment 2C mainly includes: the rectifying unit according to the present embodiment adopts the negative half-wave rectifying circuit.

With the testing devices U371, U372, U373, U374, U375 and U376 removed, a schematic diagram of the system according to the present embodiment is shown in FIGS. 14*b*(1), 14*b*(2) and 14*b*(3).

Figure 16A:
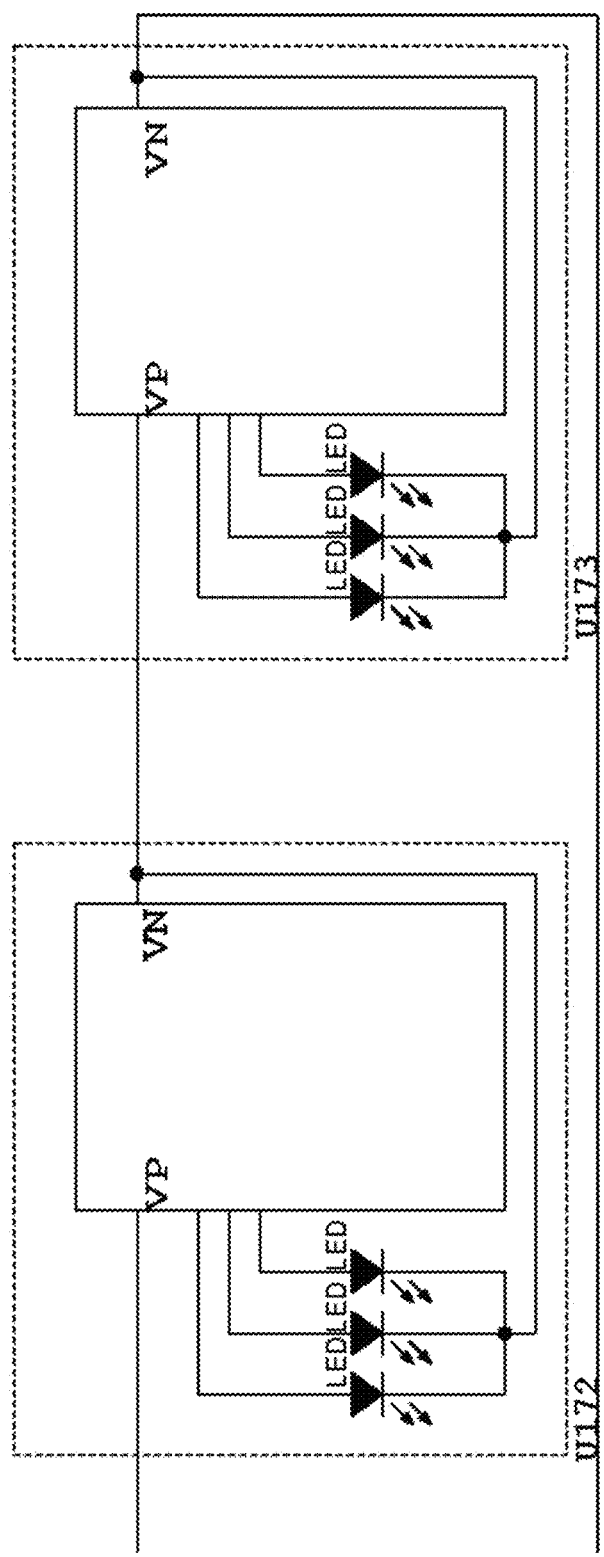
FIGS. 16a and 16b are schematic diagrams of wire connection according to the embodiment 2E of the present disclosure, with testing devices removed.
Figure 16B:
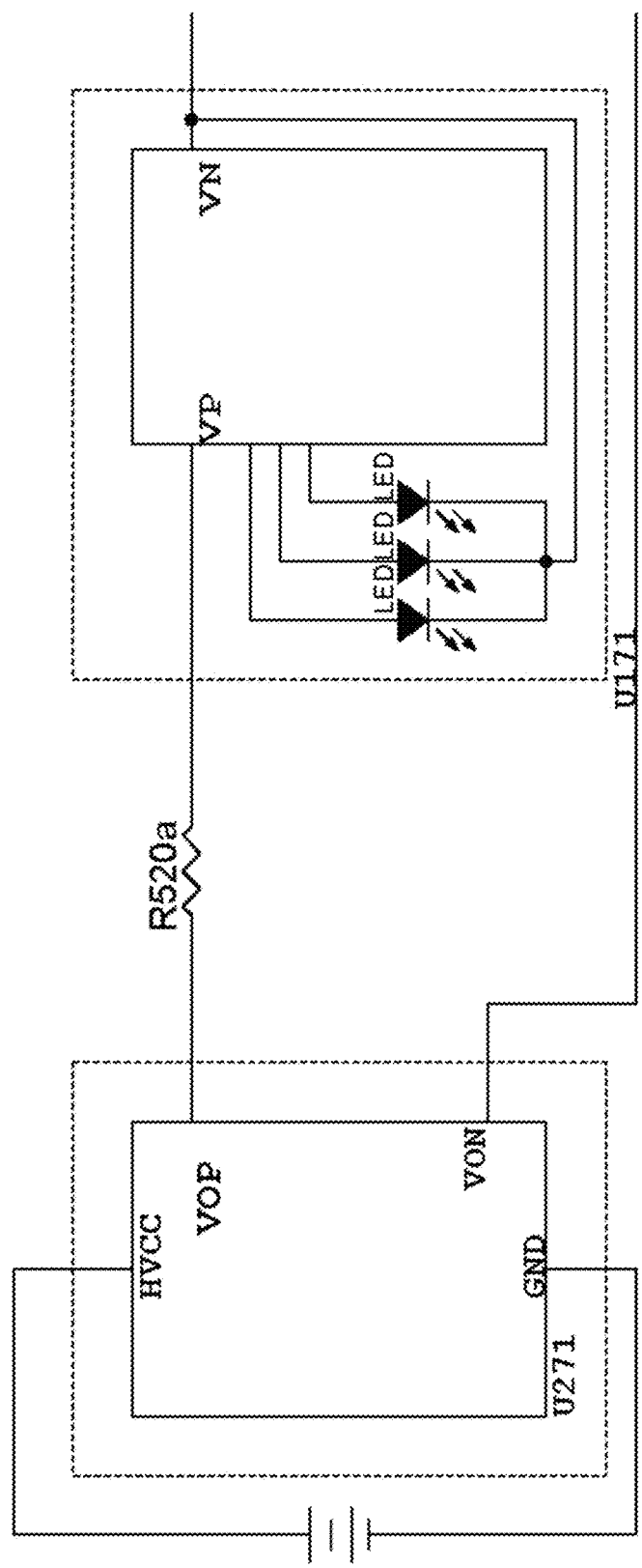

With the testing devices removed, a schematic diagram of the wire connection of the negative half-wave rectifying two-wire series-connected LED light string of the present embodiment is shown in FIGS. 16*a* and 16*b*.

Embodiment 2F

A system for controlling electronic devices, having a smart identification function, including a master device and a plurality of electronic devices, is described here. The output element is LED, the testing device is a testing device for light wave, and the access signal outputted by the master device is inputted into the signal processing circuit after being transmitted through the rectifying unit via the power-supply interface of the electronic device, and the rectifying unit includes a positive half-wave rectifying circuit, and the master device is connected to the two-wire parallel-connected LED light string which consists of multiple electronic devices.

A schematic diagram of the present embodiment is shown in FIGS. 17*a*(1), 17*a*(2) and 17*a*(3). The electronic devices use the Sink Method to drive LED. The system according to the present embodiment can work with the method illustrated in embodiment 1A or 1B to perform the application of individual control or group control of the two-wire parallel-connected LED light string.

In the present embodiment, the master device includes a master processing circuit U231 and testing devices U331, U332, U333, U334, U335 and U336, the output of each testing device is successively connected to the input MPI_0, MPI_1, MPI_2, MPI_3, MPI_4, MPI_5 of the input unit of the master device. Each testing device respectively includes a phototransistor Q902, Q904, Q906, Q908, Q910, Q912 serving as a sensing element, and an external bias resistor R901, R903, R905, R907, R909, R911, and the external bias resistor is used to provide the working bias voltage for the corresponding phototransistor. If a pull-up or pull-down resistor is provided within the input unit of the master device, the external bias resistor may be omitted.

The six electronic devices respectively include a signal processing circuit U131, U132, U133, U134, U135, U136. More electronic devices can be applied to such application, in which the electronic devices are connected in parallel.

With the electronic device group, the master device and the testing devices all set properly, the master device may acquire an electronic device information record table from the inputs MPI_0, MPI_1, MPI_2, MPI_3, MPI_4, MPI_5 of the input unit according to the method described in embodiment 1A or 1B.

The difference between the present embodiment and embodiment 2C mainly includes: the electronic device group according to the present embodiment is in parallel connection.

With the testing devices U331, U332, U333, U334, U335 and U336 removed, a schematic diagram of the system according to the present embodiment is shown in FIGS. 17*b*(1), 17*b*(2) and 17*b*(3).

Figure 18A:
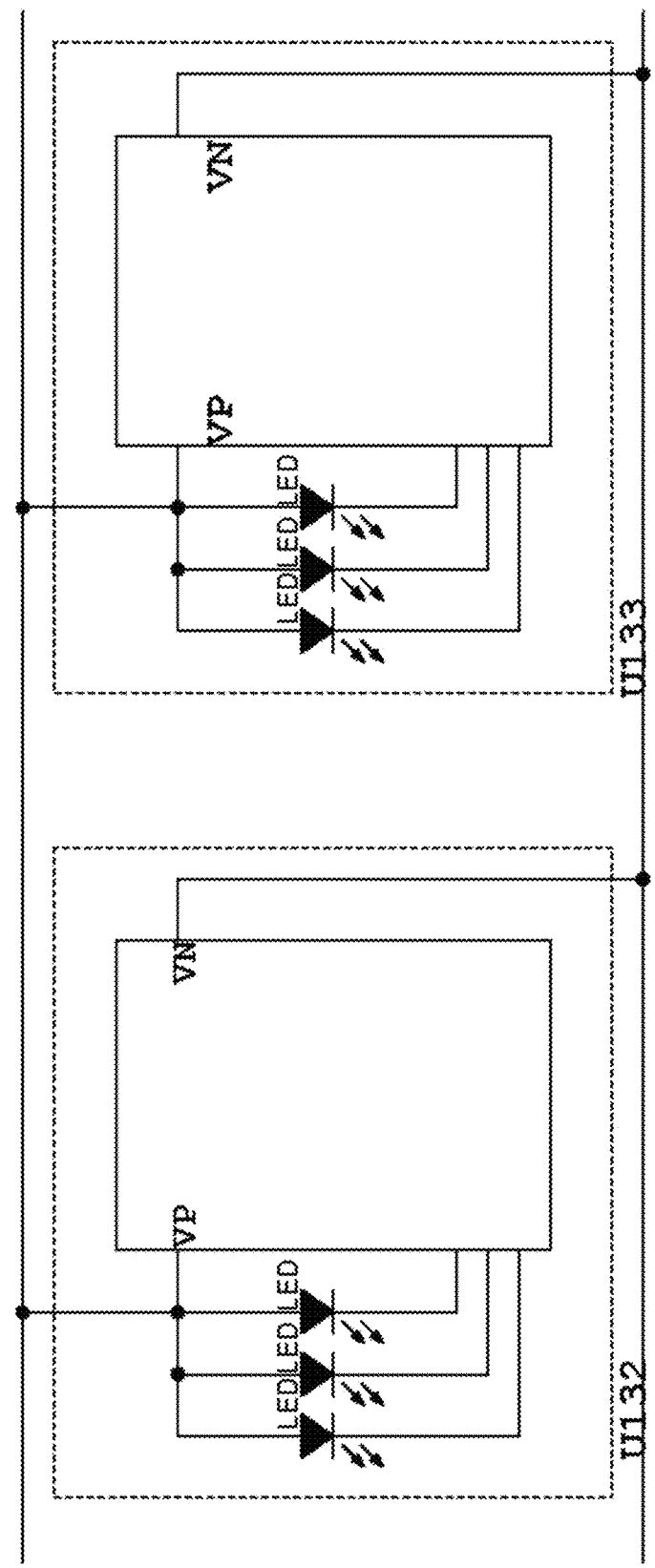
FIGS. 18a and 18b are schematic diagrams of wire connection according to the embodiment 2F of the present disclosure, with testing devices removed.
Figure 18B:
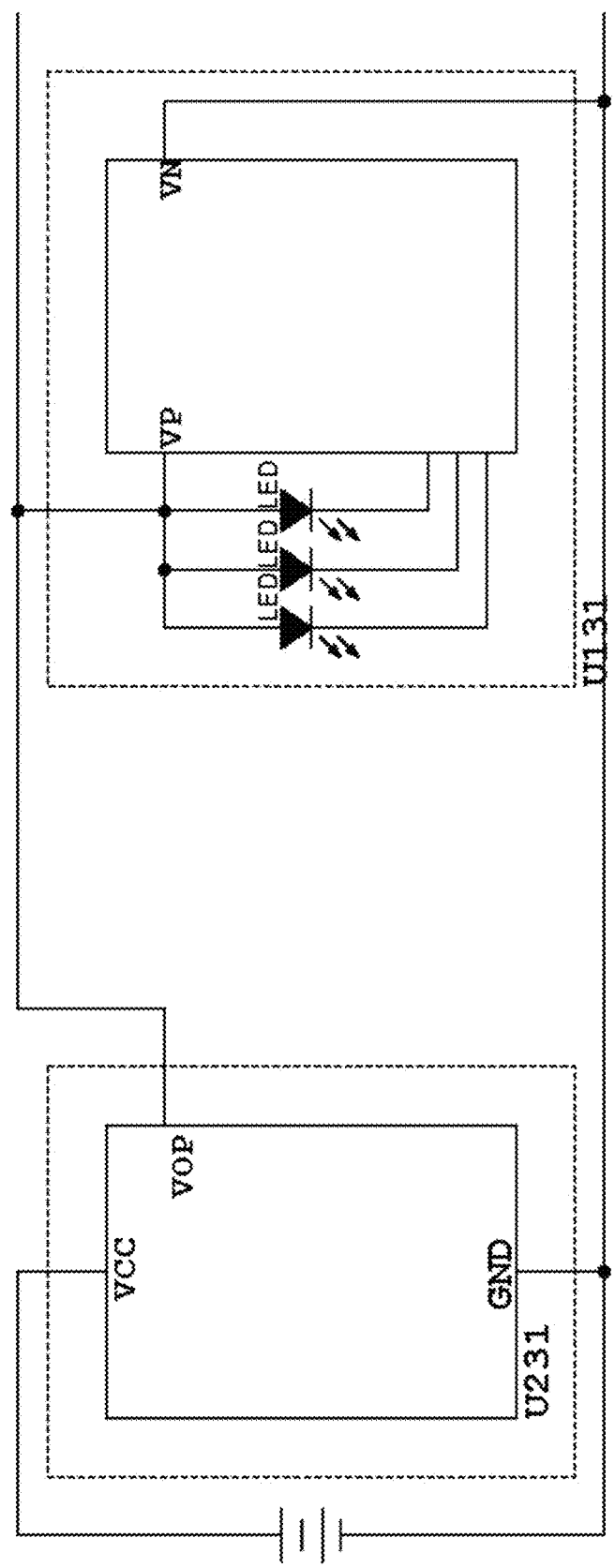

With the testing devices removed, a schematic diagram of the wire connection of the positive half-wave rectifying two-wire parallel-connected LED light string of the present embodiment is shown in FIGS. 18*a* and 18*b*.

Embodiment 2G

A system for controlling electronic devices, having a smart identification function, including a master device and a plurality of electronic devices, is described here. The output element is LED, the testing device is a testing device for light wave, and the access signal outputted by the master device is inputted into the signal processing circuit after being transmitted through the rectifying unit via the power-supply interface of the electronic device, and the rectifying unit includes a full-wave rectifying circuit, and the master device is connected to the two-wire parallel-connected LED light string which consists of multiple electronic devices.

The schematic diagram of the present embodiment is shown in FIGS. 19a(1), 19a(2) and 19a(3). The electronic devices use the Drive Method to drive LEDs. The system according to the present embodiment can work with the method illustrated in embodiment 1A or 1B to perform the application of individual control or group control of the two-wire parallel-connected LED light string.

In the present embodiment, the master device includes a master processing circuit U251 and testing devices U351, U352, U353, U354, U355 and U356, the output of each testing device is successively connected to the input MPI_0, MPI_1, MPI_2, MPI_3, MPI_4, MPI_5 of the input unit of the master device. Each testing device respectively includes a phototransistor Q902, Q904, Q906, Q908, Q910, Q912 serving as a sensing element and an external bias resistor R901, R903, R905, R907, R909, R911, and the external bias resistor is used to provide the working bias voltage for the corresponding phototransistor. If a pull-up or pull-down resistor is provided within the input unit of the master device, the external bias resistor may be omitted.

The six electronic devices respectively include a signal processing circuit U151, U152, U153, U154, U155, U156. More electronic devices can be applied to such application, in which the electronic devices are connected in parallel.

With the electronic device group, the master device and the testing devices all set properly, the master device may acquire an electronic device information record table from the inputs MPI_0, MPI_1, MPI_2, MPI_3, MPI_4, MPI_5 of the input unit according to the method described in embodiment 1A or 1B.

The difference between the present embodiment and embodiment 2F mainly includes: the rectifying unit according to the present embodiment adopts a full-wave rectifying circuit with the matching access signal (For example, Manchester coded signal), and the electronic devices of the full-wave rectifying two-wire LED light string presents the advantage that the pins of the power-supply interface may be either positive or negative, therefore providing convenience for assembly and manufacture.

With the testing devices U351, U352, U353, U354, U355, U356 removed, a schematic diagram of the system according to the present embodiment is shown in FIGS. 19b(1), 19b(2) and 19b(3).

Figure 20A:
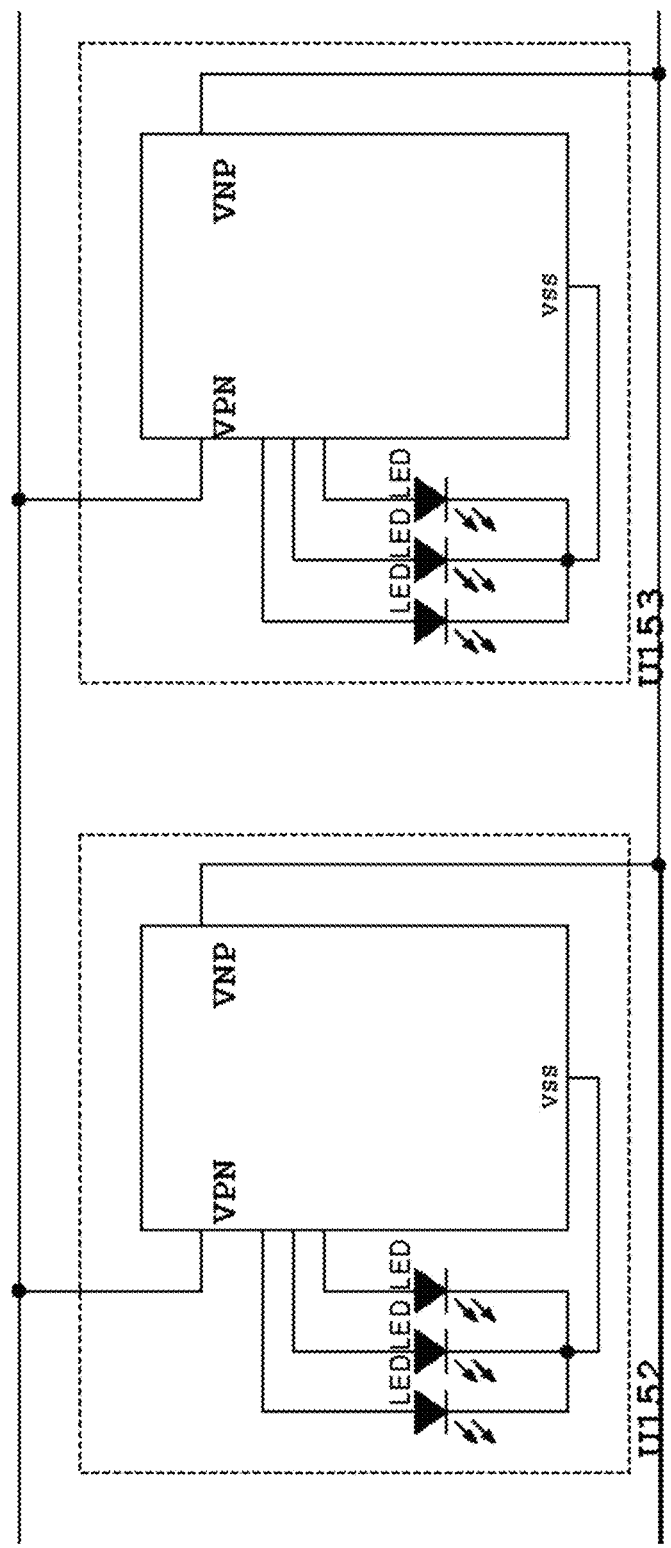
FIGS. 20a and 20b are schematic diagrams of wire connection according to the embodiment 2G of the present disclosure, with testing devices removed.
Figure 20B:
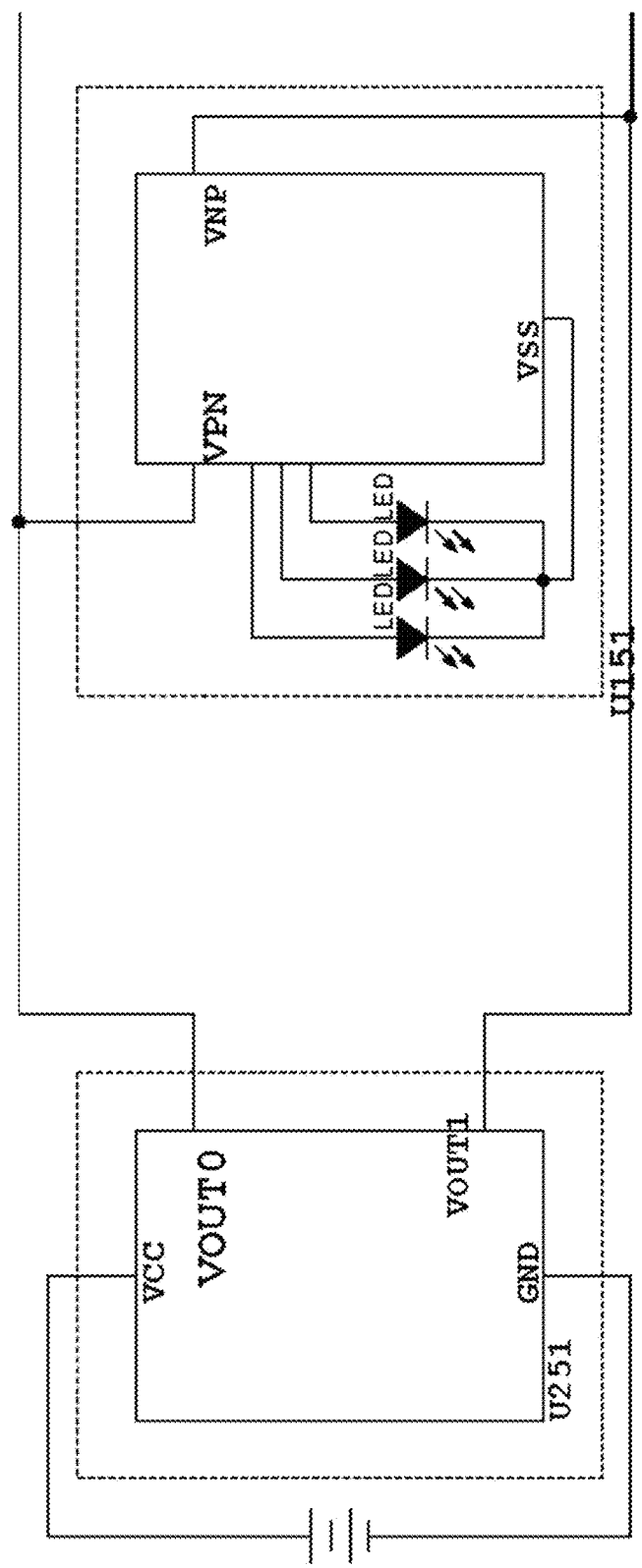

With the testing devices removed, a schematic diagram of the wire connection of the full-wave rectifying two-wire parallel-connected LED light string of the present embodiment is shown in FIGS. 20a and 20b.

Embodiment 2H

A system for controlling electronic devices, having a smart identification function, including a master device and a plurality of electronic devices, is described here. The output element is LED, the testing device is a testing device for light wave, and the access signal outputted by the master device is inputted into the signal processing circuit after being transmitted through the rectifying unit via the power-supply interface of the electronic device, and the rectifying unit includes a negative half-wave rectifying circuit, and the master device is connected to the two-wire parallel-connected LED light string which consists of multiple electronic devices.

A schematic diagram of the present embodiment is shown in FIGS. 21a(1), 21a(2) and 21a(3). The electronic devices use the Drive Method to drive LEDs. The system according to the present embodiment can work with the method illustrated in embodiment 1A or 1B to perform the application of individual control or group control of the two-wire parallel-connected LED light string.

In the present embodiment, the master device includes a master processing circuit U241 and testing devices U341, U342, U343, U344, U345 and U346, the output of each testing device is successively connected to the input MPI_0, MPI_1, MPI_2, MPI_3, MPI_4, MPI_5 of the input unit of the master device. Each testing device respectively includes a phototransistor Q902, Q904, Q906, Q908, Q910, Q912 which serves as a sensing element and an external bias resistor R901, R903, R905, R907, R909, R911, and the external bias resistor is used to provide the working bias voltage for the corresponding phototransistor. If a pull-up or pull-down resistor is provided within the input unit of the master device, the external bias resistor may be omitted.

The six electronic devices respectively include a signal processing circuit U141, U142, U143, U144, U145, U146. More electronic devices can be applied to such application, in which the electronic devices are connected in parallel.

With the electronic device group, the master device and the testing devices all set properly, the master device may acquire an electronic device information record table from the inputs MPI_0, MPI_1, MPI_2, MPI_3, MPI_4, MPI_5 of the input unit according to the method described in embodiment 1A or 1B.

The difference between the present embodiment and embodiment 2F mainly includes: the rectifying unit according to the present embodiment adopts the negative half-wave rectifying circuit.

With the testing devices U341, U342, U343, U344, U345 and U346 removed, a schematic diagram of the system according to the present embodiment is shown in FIGS. 21b(1), 21b(2) and 21b(3).

Figure 22A:
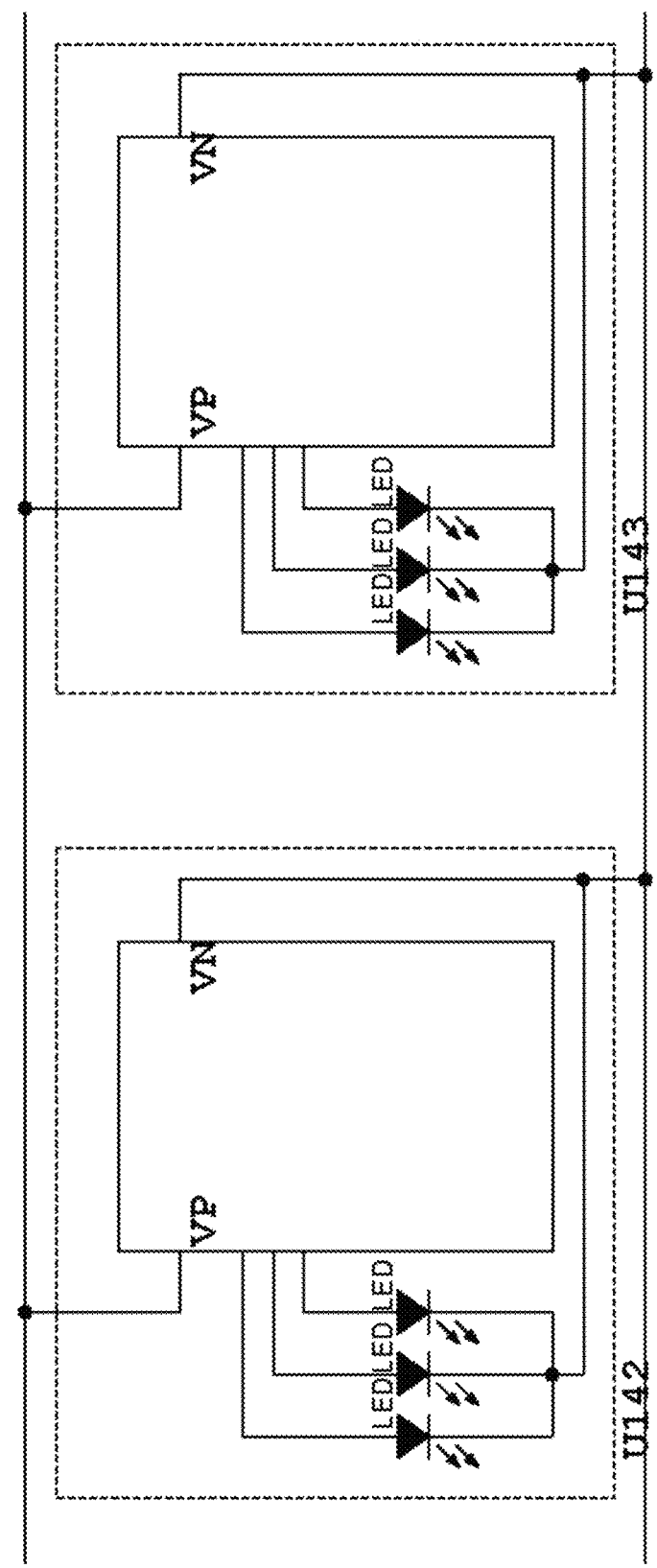
FIGS. 22a and 22b are schematic diagrams of wire connection according to the embodiment 2H of the present disclosure, with testing devices removed.
Figure 22B:
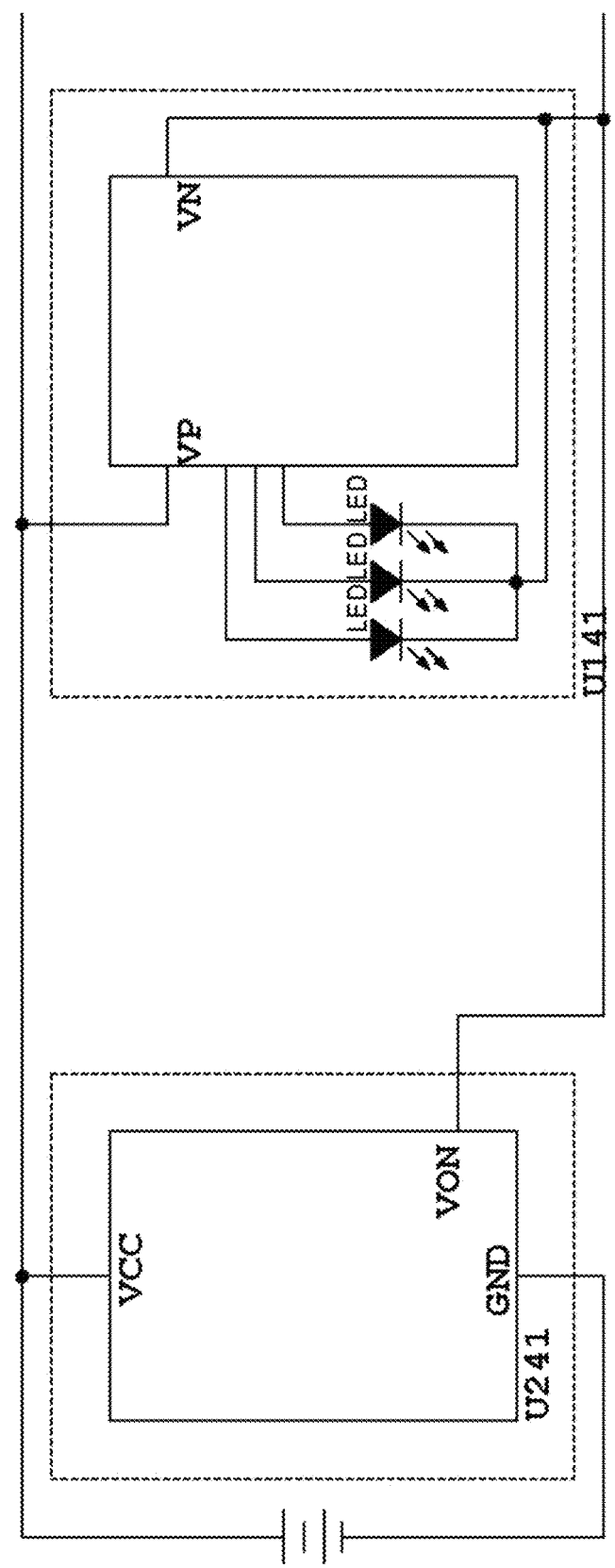

With the testing devices removed, a schematic diagram of the wire connection of the negative half-wave rectifying two-wire parallel-connected LED light string of the present embodiment is shown in FIGS. 22a and 22b.

Embodiment 3A

Figure 23:
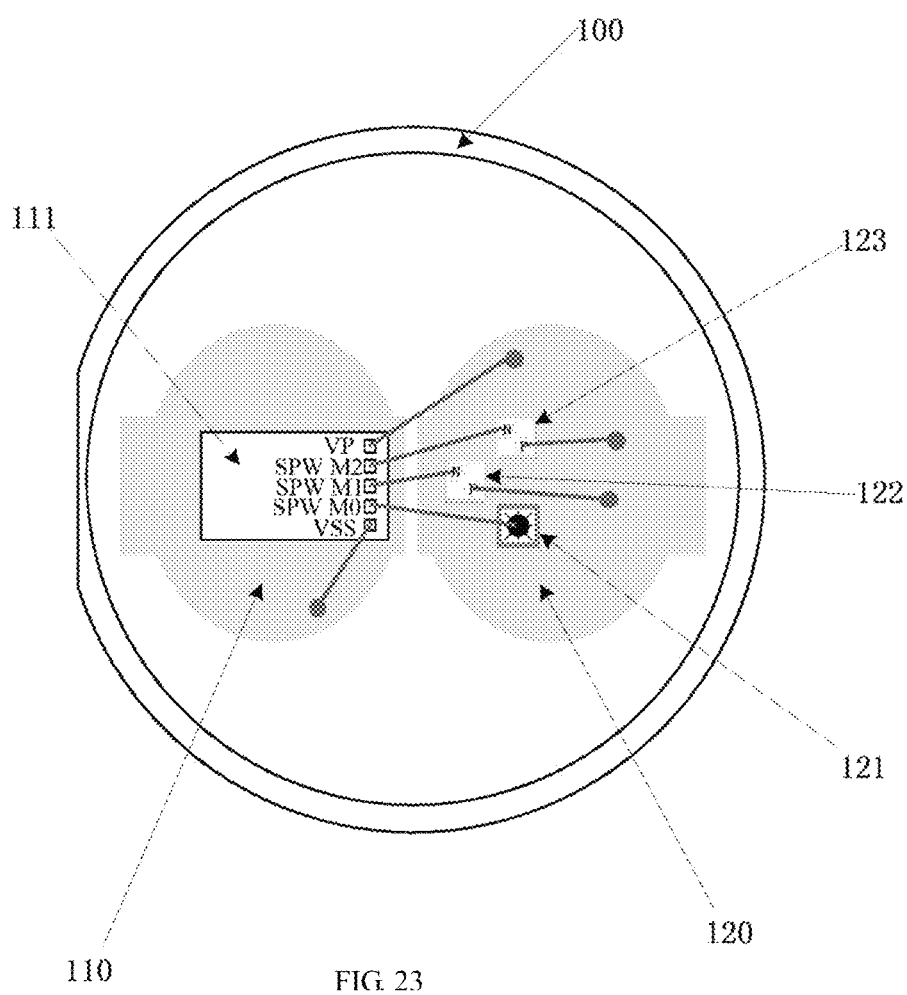
FIG. 23 is a perspective view from the top of the electronic device according to the embodiment 3A of the present disclosure.
Figure 24:
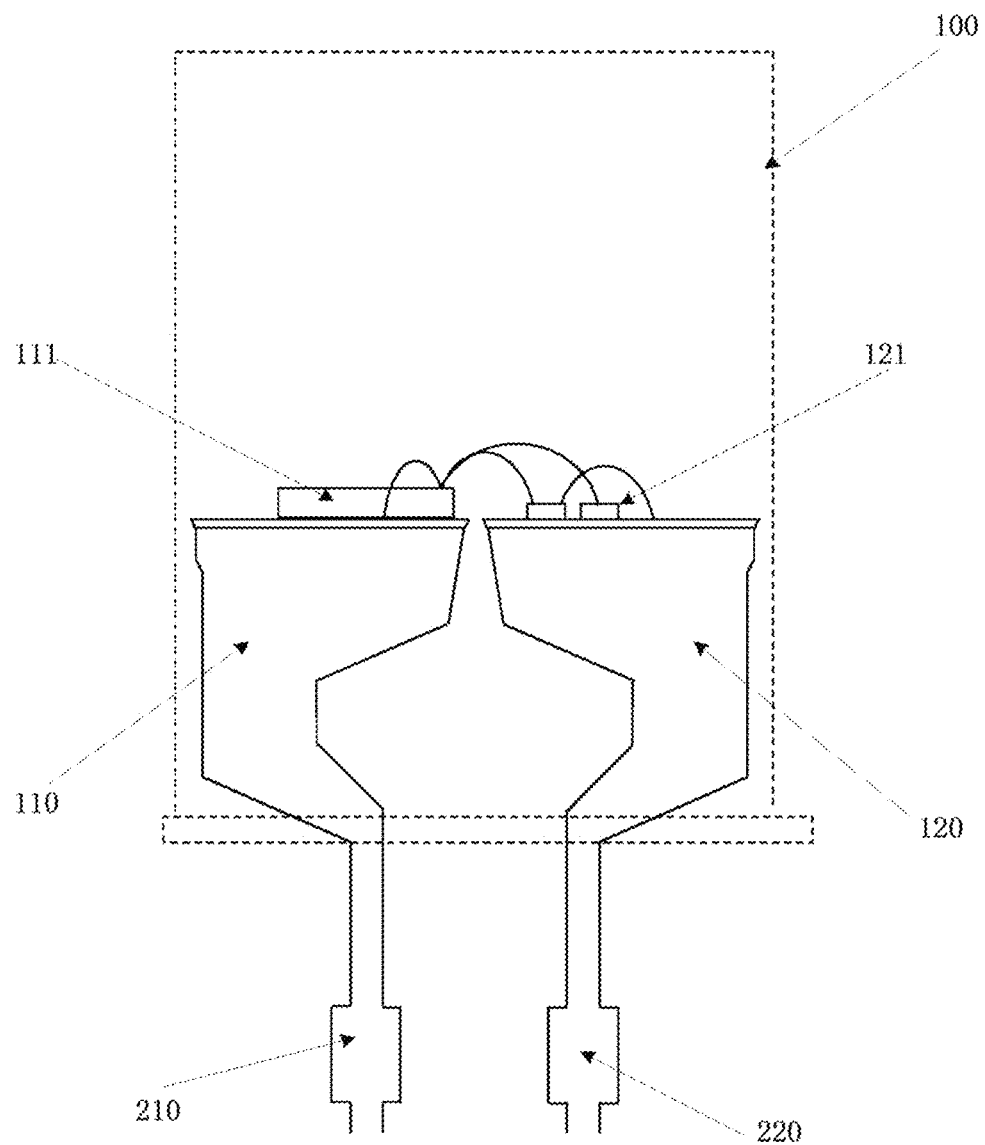
FIG. 24 is a perspective view from the side of the electronic device according to the embodiment 3A of the present disclosure.

In the present embodiment, the electronic device is DIP (dual in-line package) LED bead and has a structure shown in FIG. 23 and FIG. 24. In FIG. 23, the DIP LED bead includes a housing 100, a negative electrode support 110, a positive electrode support 120, a single-electrode LED 121, a dual-electrodes LED 122, a dual-electrodes LED 123, a signal processing circuit integrated IC chip 111, a negative electrode pin 210, a positive electrode pin 220. Further, the negative electrode support 110 and the negative electrode pin 210 are designed to be integrated and electrically connected; and the positive electrode support 120 and the positive electrode pin 220 are designed to be integrated and electrically connected. The positive terminal VP of the signal processing circuit integrated IC chip 111 is electrically connected to the positive electrode support 120, and the negative terminal VSS of the signal processing circuit integrated IC chip 111 is electrically connected to the negative electrode support 110. The negative terminal of the single-electrode LED 121 is electrically connected to the output SPWM0 of the signal processing circuit integrated IC chip 111, and the positive electrode of the single-electrode LED 121 is electrically connected to the positive electrode support 120 by affixing conducting resin at the bottom layer of single-electrode LED 121. The negative terminal N of the dual-electrodes LED 122 is electrically connected to the output SPWM1 of the signal processing circuit integrated IC chip 111, and the positive terminal P of the dual-electrodes LED 122 is connected to the positive electrode support 120; and the negative terminal N of the dual-electrodes LED 123 is electrically connected to the output SPWM2 of the signal processing circuit integrated IC chip 111, the positive terminal P of the dual-electrodes LED 123 is electrically connected to the positive electrode support 120.

In the present embodiment, the LED bead includes a housing and a power-supply interface which extends to exterior of the housing. The power-supply interface includes a negative electrode pin and a positive electrode pin. A negative electrode support and a positive electrode is arranged within the housing, and the negative electrode support is provided with a signal processing circuit, and the positive electrode support is provided with LEDs which serve as the output elements. The signal processing circuit adopts an integrated IC chip to realize its function.

In principle, LED may be driven in two ways: the Drive/Sink Method, and the Sink Method is suitable for the present embodiment. However, considering the convenience that the DIP LED bead may bring to its packaging, gathering LEDs on the positive electrode support 120 would perform a better light-mixing effect, and the signal processing circuit IC chip is placed on the negative electrode support 110, and placement would be arranged properly as shown in FIG. 23 and FIG. 24. Considering that for some LED bead supports only a large support for placement of the chip is provided, LED and the signal processing circuit IC chip may be placed on the large support. The electronic devices in the present embodiment can be applied to the technical solutions of electronic devices described as the half-wave rectifying two-wire LED light string in the embodiments 2C, 2E, 2F and 2H.

Embodiment 3B

Figure 25:
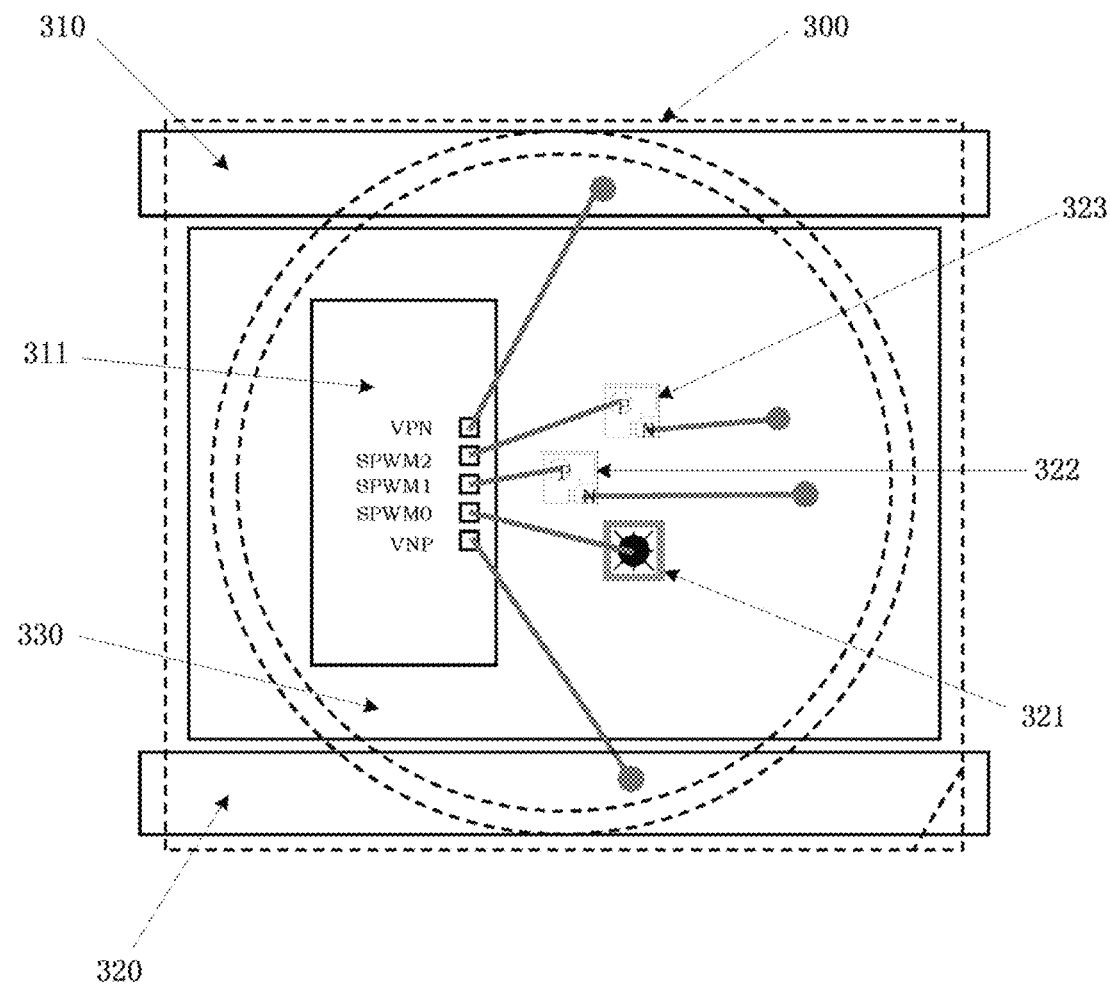
FIG. 25 is a perspective view from the top of the electronic device according to the embodiment 3B of the present disclosure.

In the present embodiment, the electronic device may be the SMD LED bead with a structure shown in FIG. 25. In FIG. 25, the SMD LED bead includes a housing 300, power-supply pins 310/320, ground reference 330, a single-electrode LED 321, a dual-electrodes LED 322, a dual-electrodes LED 323, a signal processing circuit integrated IC chip 311. The power-supply interfaces VPN/VNP of the signal processing circuit integrated IC chip 311 are electrically connected to the power-supply pins 310/320 respectively. Positive terminal of the single-electrode LED 321 is electrically connected to the output SPWM0 of the signal processing circuit integrated IC chip 311, and the negative terminal of the single-electrode LED 321 is electrically connected to the ground reference 330 by conductive resin affixed at the bottom layer; the positive terminal P of the dual-electrodes LED 322 is electrically connected to the output SPWM1 of the signal processing circuit integrated IC chip 311, the negative terminal N of the dual-electrodes LED 322 is electrically connected to the ground reference 330; the positive terminal P of the dual-electrodes LED 323 is electrically connected to the output SPWM2 of the signal processing circuit integrated IC chip 311, the negative terminal N of the dual-electrodes LED 323 is electrically connected to the ground reference 330.

In the present embodiment, the electronic devices use the Drive Method to drive LEDs and it is suitable for the technical solutions of electronic devices described as the full-wave rectifying two-wire LED light string in the embodiment 2D or 2G.

Embodiment 3C

Figure 26:
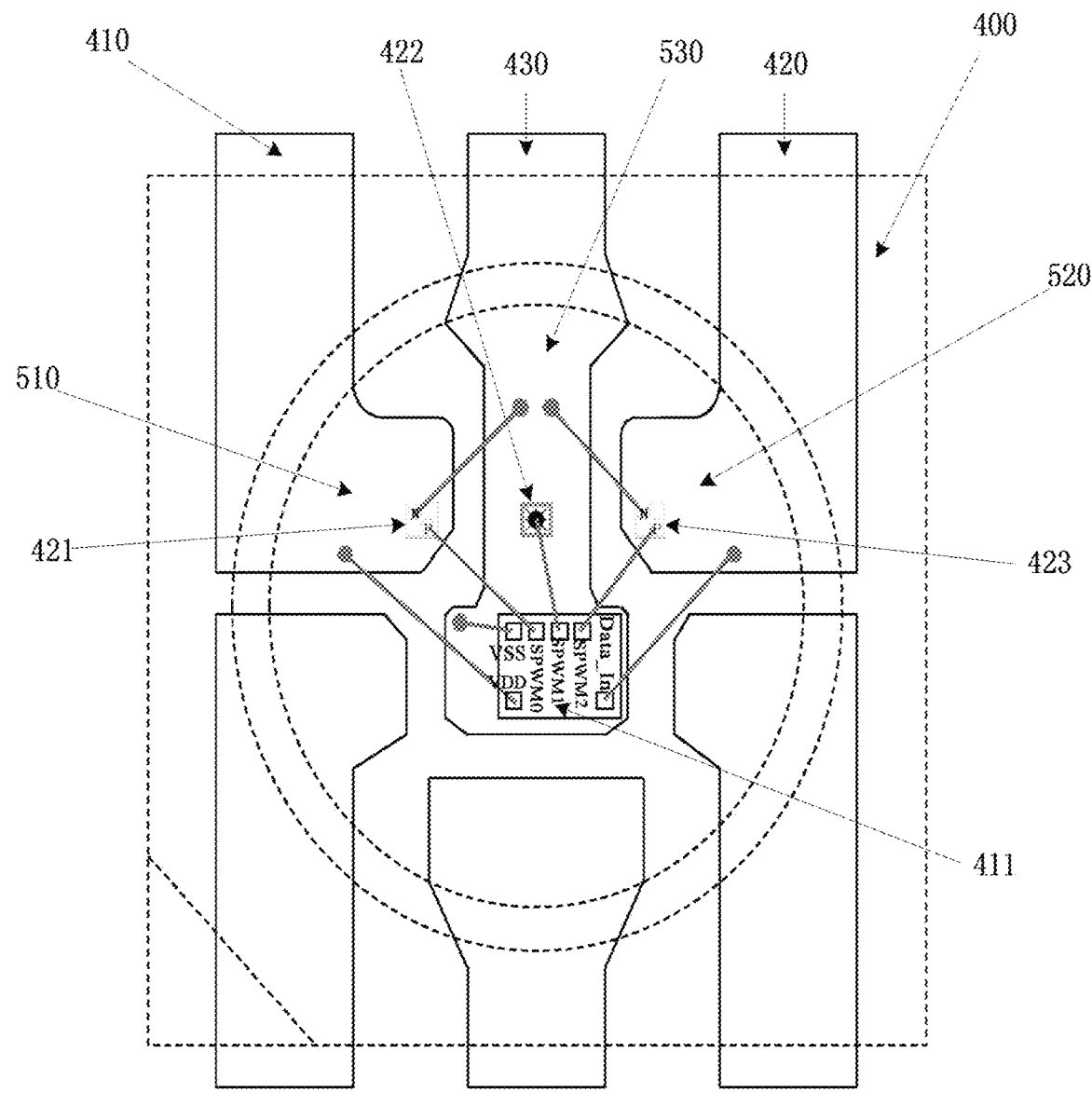
FIG. 26 is a perspective view from the top of a first type of SMD electronic devices according to the embodiment 3C of the present disclosure.
Figure 27:
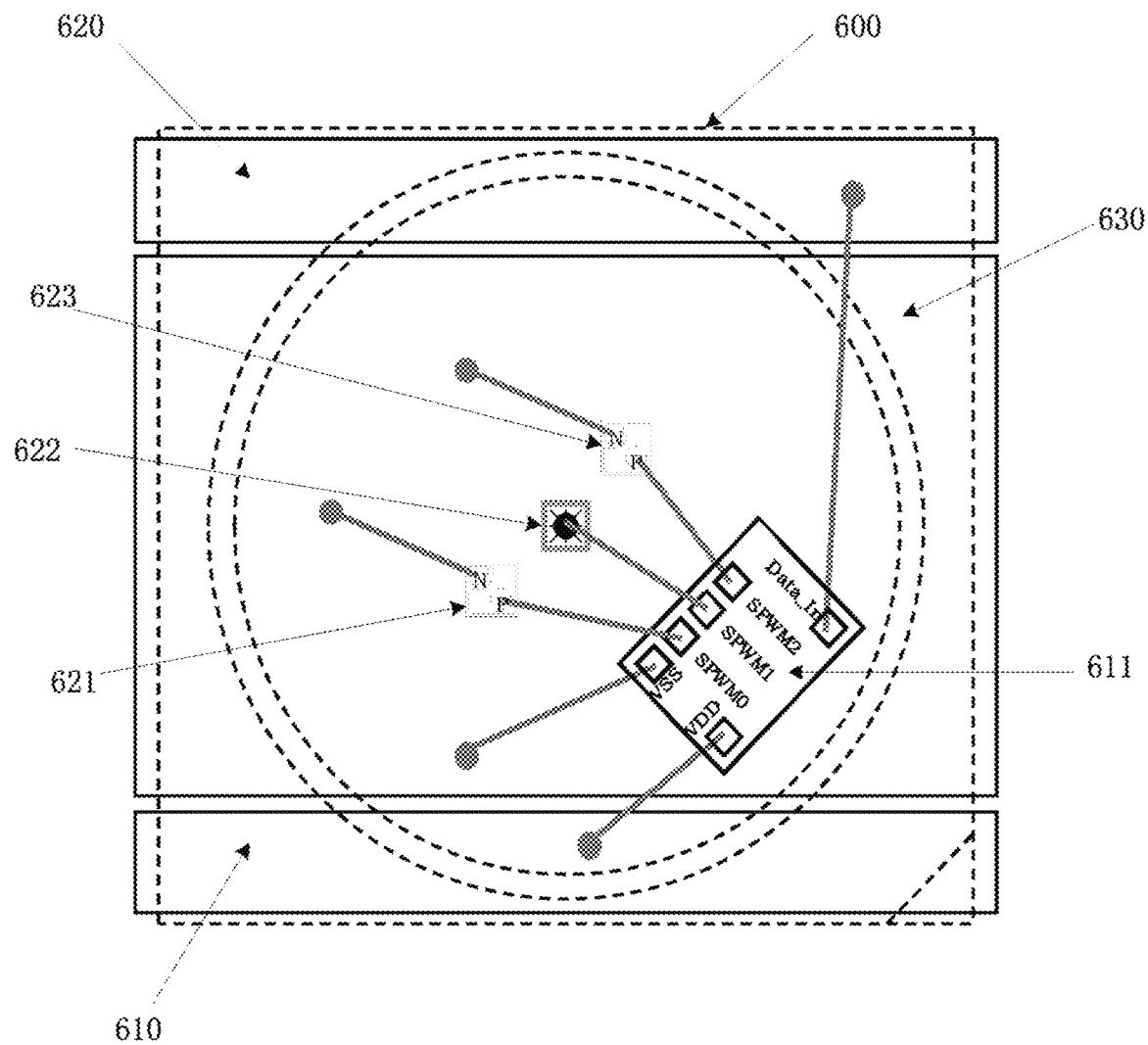
FIG. 27 is a perspective view from the top of a second type of SMD electronic devices according to the embodiment 3C of the present disclosure.

Structures of the other two types of SMD LED bead are described in the present embodiment and are respectively shown in FIG. 26 and FIG. 27. The difference between the present embodiment and the embodiment 3A is: a data input pin is added to the electronic device.

As shown in the FIG. 26, the SMD LED bead includes a housing 400, a power-supply positive electrode pin 410, a power-supply negative electrode pin 430, a data input pin 420, positive electrode conductive region 510, negative electrode conductive region 530, data conductive region 520, a dual-electrodes LED 421, a single-electrode LED 422, a dual-electrodes LED 423, a signal processing circuit integrated IC chip 411. The positive electrode conductive region 510 is provided with the dual-electrodes LED 421, the negative electrode conductive region 530 is provided with the single-electrode LED 422 and the signal processing circuit integrated IC chip 411, and the data conductive region 520 is provided with the dual-electrodes LED 423. The power-supply positive electrode pin 410 is electrically connected to the positive electrode conductive region 510, the power-supply negative electrode pin 430 is electrically connected to the negative electrode conductive region 530, and the data input pin 420 is electrically connected to the data conductive region 520. The positive terminal VDD of the signal processing circuit integrated IC chip 411 is electrically connected to the positive electrode conductive region 510, the negative terminal VSS of the signal processing circuit integrated IC chip 411 is electrically connected to the negative electrode conductive region 530, the data input Data_In of the signal processing circuit integrated IC chip 411 is electrically connected to the data conductive region 520. The positive terminal P of the dual-electrodes LED 421 is electrically connected to the output SPWM0 of the signal processing circuit integrated IC chip 411, and the negative terminal N of the dual-electrodes LED 421 is electrically connected to the negative electrode conductive region 530; the positive terminal of the single-electrode LED 422 is electrically connected to the output SPWM1 of the signal processing circuit integrated IC chip 411, and the negative terminal of the single-electrode LED 422 is electrically connected to the negative electrode conductive region 530 by conductive resin affixed at the bottom layer; the positive terminal P of the dual-electrodes LED 423 is electrically connected to the output SPWM2 of the signal processing circuit integrated IC chip 411, the negative terminal N of the dual-electrodes LED 423 is electrically connected to the negative electrode conductive region 530.

As shown in the FIG. 27, the SMD LED bead includes a housing 600, a power-supply positive electrode pin 610, a power-supply negative electrode pin 630, a data input pin 620, a dual-electrodes LED 621, a single-electrode LED 622, a dual-electrodes LED 623, a signal processing circuit integrated IC chip 611. The positive terminal VDD of the signal processing circuit integrated IC chip 611 is electrically connected to the power-supply positive electrode pin 610, the negative terminal VSS of the signal processing circuit integrated IC chip 611 is electrically connected to the power-supply negative electrode pin 630, the data input Data_In of the signal processing circuit integrated IC chip 611 is electrically connected to the data input pin 620. The positive terminal P of the dual-electrodes LED 621 is electrically connected to the output SPWM0 of the signal processing circuit integrated IC chip 611, the negative terminal N of the dual-electrodes LED 621 is electrically connected to the power-supply negative electrode pin 630; the positive terminal of the single-electrode LED 622 is electrically connected to the output SPWM1 of the signal processing circuit integrated IC chip 611, the negative terminal of the single-electrode LED 622 is electrically connected to the power-supply negative electrode pin 630 by conductive resin affixed at the bottom layer; the positive terminal P of the dual-electrodes LED 623 is electrically connected to the output SPWM2 of the signal processing circuit integrated IC chip 611, the negative terminal N of the dual-electrodes LED 623 is electrically connected to the power-supply negative electrode pin 630.

In the present embodiment, the electronic devices use the Drive Method to drive LEDs and it is suitable for the technical solution for electronic device described as the three-wire parallel-connected LED light string in the embodiment 2B.

Preferred embodiments of the disclosure are described above, but the disclosure is not limited thereto. Any modification or substitution may be made without departing from the principle of the disclosure and should all fall within the scope of protection as defined by the claims.

The invention claimed is:

1. A method for controlling an electronic device, having a smart identification function, comprising steps of:
   S1, outputting, by a master device, an access signal to the electronic device;
   S2, receiving, by the electronic device, the access signal, and outputting, by the electronic device, a corresponding action signal according to the access signal;
   S3, detecting, by the master device, the action signal which is outputted by the electronic device, and identifying, by the master device, sequence information and/or position information of the electronic device according to the action signal;
   wherein, the step S1 is specifically:
   outputting, by the master device, the access signal containing unique identification code information and control instruction information to a plurality of electronic devices each having a corresponding unique identification code;
   the step S2 is specifically:
   outputting, by one of the electronic devices which corresponds to the unique identification code information, the action signal according to the control instruction information;
   wherein the step S1 specifically comprises sub-steps of:
   S11, indexing the unique identification code for each of the electronic devices by a logic operation unit of the master device using a searching algorithm;
   S12, broadcasting, by an output unit of the master device, the access signal containing unique identification code information and control instruction information to the electronic devices;
   the step S2 specifically comprises sub-steps of:
   S21, outputting, by an output element which is driven by an output unit of the one of the electronic devices which corresponds to the unique identification code information, a corresponding action signal according to the control instruction information;
   or,
   S22, transmitting, by the one of the electronic devices which corresponds to the unique identification code information, the unique identification code information or operation results in a storage unit of the one of the electronic devices to an output unit of the one of the electronic devices to drive an output element to output a corresponding action signal according to the control instruction information;
   the step S3 specifically comprises sub-steps of:
   S31, detecting, by the master device using a testing device, the action signal outputted by the one of the electronic devices, and converting the action signal into an electrical signal to be transmitted back to a master processing circuit for confirmation;
   S32, based on a sequence of a sensing element for the action signal or a position coordinate of the action signal detected by the testing device, recording, by the master processing circuit of the master device, the sequence and/or coordinate of the corresponding electronic device, and including the sequence and/or coordinate into an electronic device information record table;
   S33, repeatedly executing the above operation procedure from step S1 to step S3 until the searching algorithm in a logic operation unit of the master device is completed, and obtaining an electronic device information record table which includes the sequence and/or coordinate information of the electronic devices.

2. The method as claimed in claim 1, further comprising a step of:
   S4, storing the obtained electronic device information record table in a storage unit of the master device.

3. The method as claimed in claim 2, further comprising a step of:
   S5, transmitting, by the master processing circuit, control signals to control a plurality of electronic devices to perform independent actions or group actions according to the electronic device information record table in the storage unit.

4. The method as claimed in claim 3, wherein the step S5, in which direct indexing control is used, specifically comprises sub-steps of:
   S51, according to the electronic device information record table in the storage unit, transmitting, by the master processing circuit, the control signals each containing unique identification code information and control instruction information one by one to control the electronic devices to perform actions;
   or,
   according to the electronic device information record table in the storage unit, transmitting, by the master processing circuit, control signals each containing unique identification code information, arithmetic information and control instruction information to the electronic devices; performing, by the logic operation unit in each of the electronic devices, logic operations on the received unique identification code information according to the received arithmetic information, and one of the electronic devices which matches the logic operation result being responsible for executing the received control instruction information; and subsequently, when the master processing circuit transmits control signals containing only control instruction information to the electronic devices, performing, by the logic operation unit in each of the electronic devices, logic operations based on the previous arithmetic information and logic operation result, and executing, by one of the electronic devices which matches the logic operation result, the received control instruction information, enabling the electronic devices to be controlled to perform independent or group actions.

5. The method as claimed in claim 3, wherein the step S5, in which quick indexing control is used, specifically comprises sub-steps of:

S52, according to the electronic device information record table in the storage unit, transmitting, by the master processing circuit, correlated signals each containing unique identification code information and corresponding quick indexing code information to the electronic devices, and writing the quick indexing code into the storage unit of one of the electronic devices corresponding to the unique identification code;

S53, transmitting, by the master processing circuit, control signals each containing the quick indexing information and control instruction information one by one to control the electronic devices to perform actions;

or, transmitting, by the master processing circuit, control signals each containing the quick indexing code information, arithmetic information and control instruction information to the electronic devices, and performing, by the logic operation unit in each of the electronic devices, logic operations on the received quick indexing code information according to the received arithmetic information, and one of the electronic devices which matches the logic operation result being responsible for executing the received control instruction information; and subsequently, when the master processing circuit transmits control signals containing only control instruction information to the electronic devices, performing, by the logic operation unit in each of the electronic devices, logic operations based on the previous arithmetic information and logic operation result; and executing, by one of the electronic devices which matches the logic operation result, the received control instruction information, enabling the electronic devices to be controlled to perform independent or group actions.

6. The method as claimed in claim 5, wherein the step S52 further comprises sub-steps of:

S521, outputting, by the master processing circuit, the access signal containing the quick indexing code information and control instruction information to the electronic device, and detecting, by the testing device, an output action signal from the electronic device, ensuring that the quick indexing code is accurately written into the corresponding electronic device.

7. The method as claimed in claim 4, further comprising a step of:

S61, matching and assembling a plurality of electronic devices with a new master device for identifying and controlling the plurality of electronic devices.

8. The method as claimed in claim 7, wherein the step S61 specifically comprises sub-steps of:

S611, matching and assembling a plurality of electronic devices with a new master device, copying the electronic device information record table to a storage unit of the new master device, and the new master device controlling the plurality of electronic devices according to the electronic device information record table;

or,

S612, setting the new master device as an electronic device mode and connecting the new master device to the original master device, and writing the electronic device information record table from the original master device into the storage unit of the new master device, and the new master device controlling a plurality of electronic devices according to the electronic device information record table;

or,

S613, matching the new master device with a plurality of electronic devices and re-executing step S1 to step S4, such that the new master device obtains the electronic device information record table which contains sequence and/or position information of a plurality of electronic devices.

9. The method as claimed in claim 5, further comprising a step of:

S62, matching and assembling a plurality of electronic devices with a new master device, and the new master device identifying and controlling the plurality of electronic devices.

10. The method as claimed in claim 9, wherein the step 62 specifically comprises a sub-step of:

S64, matching and assembling a plurality of electronic devices with a new master device, and the new master device directly controlling the plurality of electronic devices according to the quick indexing codes of the plurality of electronic devices.

11. A system for controlling an electronic device, having a smart identification function, comprising:

the electronic device;

a master device which communicates with the electronic device and is configured to transmit an access signal containing control instruction information to the electronic device, and detect an action signal responded by the electronic device, and identify sequence information and/or position information of the electronic device according to the action signal;

wherein the system comprises a plurality of electronic devices each having a corresponding unique identification code; and the access signal contains unique identification code information and control instruction information, and one of the electronic devices which corresponds to the unique identification code information is configured to output the action signal according to the control instruction information, and the master device is configured to identify the sequence information and/or position information of the one of electronic devices according to the action signal;

wherein, the electronic device comprises a signal processing circuit and an output element, the signal processing circuit is configured to receive and process the access signal from the master device, and drives the output element to output the corresponding action signal according to the access signal; and the output element is configured to output the detectable action signal;

the master device comprises a master processing circuit configured to output the access signal to the electronic device, and a testing device corresponding to the output element of the electronic device and configured to detect the detectable action signal outputted by the output element of the electronic device and to convert the action signal into an electrical signal to be transmitted back to the master processing circuit.

12. The system as claimed in claim 11, wherein the signal processing circuit comprises an input unit, a logic operation unit and an output unit; and the access signal is outputted to the output element via the input unit, the logic operation unit and the output unit successively;

the master processing circuit comprises an input unit, a logic operation unit connecting to the input unit and an output unit connecting to the logic operation unit, the output unit is configured to transmit the access signal to the electronic device, and the input unit is configured to receive the electrical signal transmitted back by the testing device.

13. The system as claimed in claim 12, wherein,
the signal processing circuit further comprises a storage unit connecting to the logic operation unit, an oscillation unit configured to provide a clock oscillation frequency which is required for the operation of the electronic device, and a reset unit configured to control the reset and restart of the electronic device;
the master processing circuit further comprises a storage unit connecting to the logic operation unit, an oscillation unit configured to provide a clock oscillation frequency which is required for the operation of the master device, and a reset unit configured to control the reset and restart of the master device.

14. The system as claimed in claim 11, wherein the output element is an output element for light wave, electromagnetic wave, sound wave/ultrasonic wave or mechanical vibration wave, and correspondingly, the testing device is a testing device for light wave, electromagnetic wave, sound wave/ultrasonic wave or mechanical vibration wave.

15. The system as claimed in claim 14, wherein the master device further comprises a wireless radiofrequency transmitting unit or an infrared transmitting unit, and the access signal outputted by the master device is transmitted to the electronic device by the wireless radiofrequency transmitting unit or the infrared transmitting unit;
and the electronic device further comprises a wireless radiofrequency receiving unit or an infrared receiving unit, and the electronic device receives the access signal by the wireless radiofrequency receiving unit or the infrared receiving unit.

16. The system as claimed in claim 14, wherein the output element is a LED, and correspondingly, the testing device is a camera configured to acquire the action signal outputted by the LED.

17. The system as claimed in claim 12, wherein,
the master device further comprises a driving circuit, by which the output unit transmits the access signal to the electronic device;
the electronic device further comprises a power-supply interface and a rectifying unit, wherein the access signal is inputted into the signal processing circuit after being transmitted through the rectifying unit via the power-supply interface.

18. The system as claimed in claim 17, wherein the plurality of electronic devices are connected successively in series or in parallel, and correspondingly, the master device comprises a plurality of testing devices each configured to detect the action signal outputted by the output element of each electronic device, and an output of each of the plurality of testing devices is connected to an input of the master processing circuit.

19. The system as claimed in claim 18, wherein the plurality of electronic devices are connected successively in series, and a zener diode is parallel connected in reverse between a positive electrode and a negative electrode of an output of the rectifying unit or at the power-supply interface of the electronic device.

20. The system as claimed in claim 11, wherein the electronic device is LED, LDO, LVD, charging management IC, wireless RF module, voice IC, MCU, memory, sensor, servo, servo motor, wearable electronic device, handheld smart electronic device, electronic measuring device or electronic toy.

21. The system as claimed in claim 20, wherein the electronic device is a LED light bead, and the LED light bead comprises a housing and a power-supply interface which extends to exterior of the housing, and the power-supply interface comprises a negative electrode pin and a positive electrode pin, the housing is internally provided with a negative electrode support and a positive electrode support, and the negative electrode support is provided with the signal processing circuit, and the positive electrode support is provided with the LED serving as the output element.

* * * * *